(12) United States Patent
Ninan et al.

(10) Patent No.: US 12,389,189 B2
(45) Date of Patent: Aug. 12, 2025

(54) HEAD TRACKING AND HRTF PREDICTION

(71) Applicant: Dolby Laboratories Licensing Corporation, San Francisco, CA (US)

(72) Inventors: Ajit Ninan, San Jose, CA (US); William Anthony Rozzi, Califon, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 259 days.

(21) Appl. No.: 18/163,270

(22) Filed: Feb. 1, 2023

(65) Prior Publication Data
US 2023/0254660 A1   Aug. 10, 2023

Related U.S. Application Data

(60) Provisional application No. 63/305,646, filed on Feb. 1, 2022.

(30) Foreign Application Priority Data

Feb. 11, 2022   (EP) ..................................... 22156273

(51) Int. Cl.
*H04S 7/00* (2006.01)
*G06T 7/73* (2017.01)
(Continued)

(52) U.S. Cl.
CPC ................ *H04S 7/304* (2013.01); *G06T 7/73* (2017.01); *G06V 20/647* (2022.01); *G06V 40/10* (2022.01);
(Continued)

(58) Field of Classification Search
None
See application file for complete search history.

(56) References Cited

U.S. PATENT DOCUMENTS 10,038,966 B1    7/2018  Mehra
11,523,244 B1 *  12/2022 Meade .................. H04R 3/005
(Continued)

FOREIGN PATENT DOCUMENTS

EP    3544321 A1    9/2019
KR   102057393 B1  12/2019
(Continued)

OTHER PUBLICATIONS

Meshram, Alok et al., "P-HRTF: Efficient Personalized HRTF Computation for High-Fidelity Spatial Sound", IEEE International Symposium on Mixed and Augmented Reality 2014 Science and Technology Proceedings, Sep. 12, 2014, pp. 53-61.
(Continued)

*Primary Examiner* — Kenny H Truong

(57) ABSTRACT

Images of a user's head are acquired at a plurality of different orientational angles through image sensors operating in conjunction with a media consumption system. The acquired images of the user's head are used to select or predict a specific personalized head related transfer function for the user. Spatial audio rendered by audio speakers operating in conjunction with the media consumption system is adjusted or modified based at least in part on the specific personalized HRTF selected for the user.

11 Claims, 23 Drawing Sheets

(51) Int. Cl.
  *G06V 20/64* (2022.01)
  *G06V 40/10* (2022.01)
  *H04R 5/02* (2006.01)
  *H04R 5/033* (2006.01)
  *H04R 5/04* (2006.01)

(52) U.S. Cl.
  CPC ............... *H04R 5/02* (2013.01); *H04R 5/04* (2013.01); *H04S 7/307* (2013.01); *G06T 2207/20081* (2013.01); *H04R 5/033* (2013.01); *H04S 2400/11* (2013.01); *H04S 2400/13* (2013.01); *H04S 2420/01* (2013.01)

(56) References Cited

U.S. PATENT DOCUMENTS

| | | |
|---|---|---|
| 2012/0165964 A1 | 6/2012 | Flaks |
| 2012/0183161 A1* | 7/2012 | Agevik ............... H04S 7/302 381/303 |
| 2012/0311444 A1 | 12/2012 | Chaudhri |
| 2013/0259238 A1 | 10/2013 | Xiang |
| 2014/0108928 A1 | 4/2014 | Mumick |
| 2015/0055783 A1 | 2/2015 | Luo |
| 2017/0220120 A1 | 8/2017 | Westbrook |
| 2017/0316186 A1 | 11/2017 | Breitenfeld |
| 2017/0322632 A1 | 11/2017 | Kovach |
| 2018/0018965 A1 | 1/2018 | Daley |
| 2018/0091921 A1 | 3/2018 | Silva |
| 2019/0014431 A1 | 1/2019 | Lee |
| 2019/0045317 A1 | 2/2019 | Badhwar |
| 2019/0278802 A1 | 9/2019 | Casimiro Ericsson |
| 2019/0303090 A1 | 10/2019 | Milne |
| 2019/0349702 A1 | 11/2019 | Miller |
| 2020/0275232 A1 | 8/2020 | Villanueva-Barreiro |
| 2021/0099826 A1 | 4/2021 | Hassager |

FOREIGN PATENT DOCUMENTS

| | | |
|---|---|---|
| KR | 2020042874 A | 1/2021 |
| WO | 2012028906 A1 | 3/2012 |
| WO | 2016162416 A1 | 10/2016 |
| WO | 2020167309 A1 | 8/2020 |
| WO | 2020209840 A1 | 10/2020 |

OTHER PUBLICATIONS

Torres-Gallegos, Edgar A. et al., Personalization of head-related transfer functions (HRTF) based on automatic photo-anthropometry and inference from a database, Applied Acoustics, 97, 2015, pp. 84-95.

Churnside et al., "Musical Movements—Gesture Based Audio Interfaces," AES Convention: 131 (Oct. 2011) Paper No. 8496 Permalink, New York, NY, <http://www.aes.org/e-lib/browse.cfm?elib=16022.>.

U.S. Appl. No. 62/484,131, "Passive Multi-Wearable-Devices Tracking,", filed Apr. 11, 2017.

U.S. Appl. No. 63/137,084, "Head Tracked Rendering and Control Features for Spatial Audio,", filed Jan. 13, 2021.

U.S. Appl. No. 62/327,857, "Head Tracked Spatial Audio And/Or Video Rendering,", filed Nov. 16, 2021.

U.S. Appl. No. 63/305,623, "Device and Rendering Environment Tracking,", filed Feb. 1, 2022.

U.S. Appl. No. 18/161,645, "Device and Rendering Environment Tracking,", filed Jan. 30, 2023.

U.S. Appl. No. 63/305,628, "Gesture Controlled Audio And/Or Visual Rendering,", filed Feb. 1, 2022.

Schacher, Jan C., "Gesture control of sounds in 3D space," Proceedings of the 7th International Conference on New Interfaces for Musical Expression, NIME '07 (Dec. 1, 2007): 358-362, New York, NY., <http://dx.doi. org/10.1145/1279740.1279819>.

Wakefield et al., "LAMI: A Gesturally Controlled Three-Dimensional Stage Leap (Motion-Based) Audio Mixing Interface," AES Convention: 142 (May 2017) Paper No. 9785, Berlin, Germany, <http://www.aes.org/e-lib/browse.cfm?elib=18661>.

* cited by examiner acquire images through one or more sensors 402 use the acquired images to determine a user's position and/or orientation 404 adjust sound fields/images based on the user's position and/or orientation 406

*FIG. 4* acquirie images through image sensors 402 use the acquired images to determine a user's movement 404 adjust sound images based at least in part on the user's movement 406

*FIG. 9A* acquire images of a user's head at a different angles 422 use the images of the user's head to select a specific personalized HRTF for the user 424 adjust spatial audio based at least in part on the selected HRTF 426

FIG. 9B acquire images of an actual rendering environment 442 use the images to predict audio characteristics of objects present in the actual rendering environment 444 adjust spatial audio based at least in part on the audio characteristics of the objects 446

*FIG. 9C* acquire images of a user's head through image sensors 462 analyze the acquired images of the user's head to determine an orientation angle of the user's head 464 use the orientation angle of the user's head to cause a change in a user-perceptible aspect of an audiovisual rendering 466

*FIG. 9D*

HEAD TRACKING AND HRTF PREDICTION

CROSS-REFERENCE TO RELATED APPLICATIONS

This application claims priority of the following priority application: U.S. Provisional Patent Application No. 63/305,646 filed Feb. 1, 2022 and European Patent Application No. 22156273.9 filed Feb. 11, 2022.

TECHNOLOGY

The present invention relates generally to processing and rendering of audio and/or video data, and in particular, to head tracking and head related transfer function (HRTF) prediction.

BACKGROUND

Wearable and non-wearable devices may be used in a wide variety of media consumption applications such as those related to virtual reality (VR) and augmented reality (AR), mixed reality (MR), internet based teleconferencing, gaming, telepresence, telemedicine, 3D video, omnidirectional video, etc. Such a media consumption application can render an audio or audiovisual image depicting a virtual or augmented world to a user (e.g., listener, viewer, etc.).

However, it can be difficult to accurately, reliably and responsively track spatial information about objects or users in media rendering environments. Some or all of these objects or users may change locations and/or orientations from time to time in three degrees/dimensions of freedom (3DoF) or even up to six degrees/dimension of freedom (6DoF). Components used for tracking purposes should be miniaturized into relatively tiny footprints and mechanically, electrically or optically incorporated into overall relatively small form factors in devices. Complex tracking algorithms should be designed, perfected, and implemented with minimal real time latency. Given these challenges, it can be especially difficult to process and render audio and/or video data in a manner responsive to the spatial information tracked in the media rendering environments.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 4 illustrates an example process flow;

FIG. 9A through FIG. 9D illustrate example process flows.

DESCRIPTION OF EXAMPLE EMBODIMENTS

Figure 1:
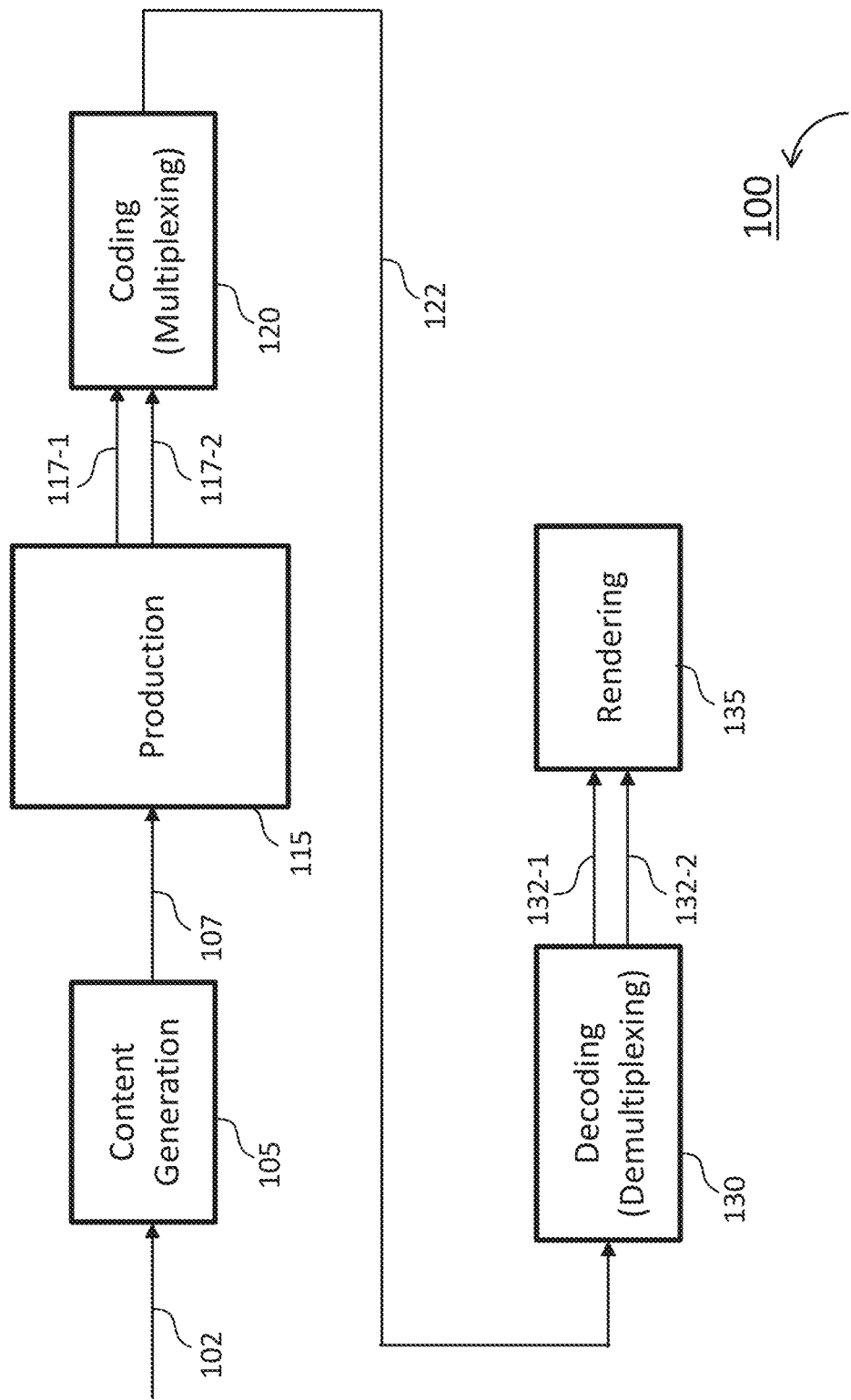
FIG. 1 depicts an example process of a media data processing and consumption pipeline.

Example embodiments, which relate to, but are not necessarily limited to only, head tracking and HRTF prediction, are described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1. GENERAL OVERVIEW
2. MEDIA CONTENT PROCESSING AND CONSUMPTION PIPELINE
3. MEDIA RENDERING ENVIRONMENT
4. CAMERA AND SENSOR-BASED HEAD TRACKED RENDERING AND CONTROL
5. USER AND USER DEVICE TRACKING WITH MEDIA CONSUMPTION SYSTEM
6. USING FACE MESH TO TRACK USER AND USER DEVICES
7. USING LIGHT SOURCES TO TRACK USER AND USER DEVICES
8. HRTF AND USER PREFERENCE FOR RENDERING SPATIAL AUDIO
9. TRACKING RENDERING ENVIRONMENT
10. CONTROLLING MEDIA RENDERING
11. EXAMPLE PROCESS FLOWS
12. IMPLEMENTATION MECHANISMS—HARDWARE OVERVIEW
13. EQUIVALENTS, EXTENSIONS, ALTERNATIVES AND MISCELLANEOUS

1. GENERAL OVERVIEW

This overview presents a basic description of some aspects of an example embodiment of the present invention. It should be noted that this overview is not an extensive or exhaustive summary of aspects of the example embodiment.

Moreover, it should be noted that this overview is not intended to be understood as identifying any particularly significant aspects or elements of the example embodiment, nor as delineating any scope of the example embodiment in particular, nor the invention in general. This overview merely presents some concepts that relate to the example embodiment in a condensed and simplified format, and should be understood as merely a conceptual prelude to a more detailed description of example embodiments that follows below. Note that, although separate embodiments are discussed herein, any combination of embodiments and/or partial embodiments discussed herein may be combined to form further embodiments.

Techniques as described herein can be implemented with a media consumption system to apply image processing techniques to track users, rendering systems, audio speakers, headphones when media or audio content is being contemporaneously processed and rendered. Information from user tracking, rendering environment tracking, audio speaker and/or headphone tracking, etc., can be used to provide better audio spatial rendering and support better control of media consumption applications such as display applications, AR applications, VR applications, gaming applications, teleconferencing applications, and so forth. Some or all of tracking data generated by tracking techniques as described herein and/or some or all of derived data or analytical results generated from the tracking data can be saved, stored, updated, used from one media consumption session to the next, etc.

In some operational scenarios, the rendition of video images on an image display can be time synchronized with the rendition of sound fields/images. While an image rendering system (which may be a part of an overall media consumption system) processes image data and renders the video images represented by the image data, an audio spatial rendering system (which may be also a part of an overall media consumption system) may process audio data and renders the sound images corresponding to the time synchronized video images.

In various operational scenarios, the media consumption system, or the image rendering system and/or the audio spatial rendering system therein, may be implemented with one or more of: a single computing device, multiple computing devices, distributed computing systems, networked computing systems, and so on.

The sound fields/images can be rendered by sound waves emitted from headphone or non-headphone audio speakers operating in conjunction with the audio spatial rendering system. Time varying sound (or audio) sources depicted in the sound fields/images may relatively accurately correspond to respective visual objects and/or characters of visual scenes depicted (occluded or disoccluded) in the corresponding video images.

The audio spatial rendering refers to audio rendering by way of sound waves emitted from the audio speakers to render or depict some or all sound sources in sound fields/images to spatially coincide (e.g., within an error or tolerance of less than 2 angular degrees, 5 angular degrees, 10 angular degrees, etc.) with their respective corresponding visual objects and/or characters visually rendered or depicted in the corresponding video images.

Example audio speakers operating with the media consumption system or the audio spatial rendering system therein may include, but are not necessarily limited to only, some or all of: binaural speakers, headphones, computing device speakers, mobile phone speakers, laptop speakers, speaker bars, speaker arrays, 5.1 audio speakers, 7.1 audio speakers, directional speakers, omnidirectional speakers, stationary speakers that are deployed stationarily in a rendering environment, near field speakers (e.g., in-ear speakers, etc.) located close to the user's ears, far field speakers (e.g., cinema speakers, etc.) located at a distance to the user's ears, ambisonic speaker arrays, and so forth.

In some operational scenarios, the media consumption system can first identify what headphones a user is wearing/using or what non-headphone audio speakers with which the system is operating or driving. Based on (e.g., prior, established, dynamically fetched, etc.) audio speaker profiles for the headphones and/or audio speakers, the media consumption system can determine, select, generate and/or implement optimized (e.g., specific, best possible, etc.) audio equalization (EQ) operations for some or all of the audio speakers (e.g., headphones, non-headphone audio speakers, etc.).

Example audio EQ operations as described herein may include, but are not necessarily limited to only, any, some or all of: tone control that adjusts sounds or sound waves to suit the user's auditory and/or audio consumption profile and preferences and compensate for frequency responses (e.g., bass, treble, midrange, etc.) of the user's ears and/or the audio rendering environment, loudness control, musical instrument amplifiers, magnitude-only equalization, phase equalization, room equalization, headphone equalization used to emulate or imitate frequency responses of headphones of another type, make, model and/or manufacturer, (e.g., shelf, peak, notch, etc.) filter based equalization, parametrized equalization used to control boost/cut, central equalization frequency, equalization band, modeling a specific head-related transfer functions (HRTF), audio separation or isolation to prevent or cancel audio leaks and unwanted ambient sound or noise, etc. As used herein, leak or audio leak refers to sound specifically generated for one (e.g., left ear, etc.) of the user's two ears may be leaked to or heard by the other (e.g., right ear, etc.) of the user's two ears.

In some operational scenarios, when the user is detected through user tracking to be moving with 3DoF or even up to 6DoF in front of or in relation to an image display that is rendering time-synchronized video images, sound fields/images (or spatial images of sound fields) can be generated by audio speakers and/or headphones in a rendering environment in response to the user's contemporaneous movements. The sound fields/images generated in response to changes in the user's positions and/or orientations allows for an enhanced Dolby Dimension style media or audio consumption experience to be provided with any set of commercially available headphones implementing some or all techniques as described herein.

Additionally, optionally or alternatively, the user's positions and/or orientations may be determined or detected by the media consumption system by way of determining or detecting positions and/or orientations of the user's headphones or headset through device tracking. The media consumption system can create corresponding (e.g., perfect, optimized, specifically adjusted, etc.) sound fields/images in audio spatial rendering in response to the user's head's positions and/or orientations or changes thereof.

In some embodiments, specific head or body gestures of the user can be dynamically captured or determined through user tracking while media or audio is being rendered to the user. Head or body gestures such as leaning in may be used by the media consumption system to increase or turn up volume of the rendered audio. Head or body gestures such as moving left or gazing at a teleconference speaker depicted or rendered on an image display/screen may be used by the media consumption system (e.g., a computing device running an online teleconferencing application, etc.) to amplify or make more legible of audio originated from that teleconference speaker.

These and other such head or body tracking based techniques can be applied to a wide variety of media applications. For example, a gamer engaging in an online gaming application may not have hands free or readily available to perform audio or video controls in the online gaming application. Head or body gestures detected through user tracking as described herein can be used in a hands free manner to change audio of the gamer relative to audio of a game, to select or resize rendered windows such as a chat window or a specific window portion in the online gaming application, and so forth. These and other such features based on user tracking can be extremely useful to gamers who do not have their hands readily available to control the features of the game.

Tracking techniques as described herein can also be used to correct drift errors in sensors such as inertial measurement units (IMUs) deployed with wearable devices, headsets, head-mounted displays, eyewear computing devices, wearable VR or AR devices, headphones, etc.

In some operational scenarios, a pair of headphones worn by a user may comprise or operate with an IMU to detect changes in the user's head orientations. IMU measurements indicating the user's head orientations or changes thereof may be used by a media consumption system to render sound fields/images in response to changes in the user's head orientations.

As the IMU measurements may contain or accumulate ever increasing drift errors, the user's detected (head) positions and/or orientations as indicated by the IMU measurements may be very different from the user's actual (head) positions and/or orientations. For example, there may be a relatively large angular difference (or large movement in orientation) between the user's detected orientations and the user's actual orientations, as well as a relatively large spatial difference or distance (or large movement in position) between the user's detected positions and the user's actual positions. Minimum angular difference thresholds and/or minimum distance thresholds may be configured and used to compared with the detected angular difference and/or the detected spatial difference. In response to determining that the detected angular difference and/or the detected spatial difference exceeds the minimum angular difference thresholds and/or minimum distance thresholds, the detected angular difference and/or the detected spatial difference may be deemed by the media consumption system as large angular difference and/or large spatial difference (or large distance).

The sound fields/images rendered in response to the IMU measurements with significant accumulated drift errors may be readily and audibly perceived by the user as incorrect to the extent the user's media consumption experience can be significantly impacted. For example, spatial locations and/or positions of sound sources or audio depicted in the sounds fields/images can mismatch or significantly deviate from spatial locations and/or positions of visual objects/characters—corresponding to the sound or audio sources depicted in the sound fields/images—that are depicted by contemporaneous video images rendered to the user.

In some operational scenarios, camera sensors deployed with a media consumption system such as a camera sensor on a mobile computing device that is rendering the time synchronized video images can acquire images of the user from time to time. Through image analysis, the media consumption system can determine whether the user (e.g., largely, substantially, within an error tolerance of a few angular degrees or inches, etc.) remains in a previous position (or positional range) and/or orientation (or orientational range). In response to determining that the user remains in the previous position (or positional range) and/or orientation (or orientational range), the media consumption system may correct, reset or reorient the IMU measurements or override/ignore the changes indicated in the IU measurements. As a result, unnecessary rotations of sound fields/images caused by the drift errors in sensors such as IMUs can be prevented or significantly reduced.

To reduce power consumption, camera sensors as described can be turned on to acquire tracking images at a relatively low sampling or frame rate, for example every second instead of every millisecond.

In some operational scenarios, the camera sensors can be turned on to acquire tracking images in response to a trigger or event. For example, in response to detecting a large rotation or movement (e.g., caused by a sudden turning of a bus—but there is no or little relative motion detected between the user and the image display—on which the user is located instead of drift errors, etc.) by an IMU, a camera sensor on a mobile computing device that is rendering video images can be turned on to acquire tracking images. Through image analysis, the media consumption system can determine whether the user (e.g., largely, substantially, within an error tolerance of a few angular degrees or inches, etc.) remains in a previous position (or positional range) and/or orientation (or orientational range). In response to determining that the user remains in the previous position (or positional range) and/or orientation (or orientational range), the media consumption system may correct, reset or reorient the IU measurements or override/ignore the changes indicated in the IMU measurements. As a result, unnecessary rotations of sound fields/images caused by the sudden movements/rotations of the user's rendering environment can be prevented or significantly reduced.

Various modifications to the preferred embodiments and the generic principles and features described herein will be readily apparent to those skilled in the art. Thus, the disclosure is not intended to be limited to the embodiments shown, but is to be accorded the widest scope consistent with the principles and features described herein.

2. MEDIA CONTENT PROCESSING AND CONSUMPTION PIPELINE

FIG. 1 depicts an example process of a media data processing and consumption pipeline 100 showing various stages from media content capture/generation to media consumption systems such as media rendering devices, playback devices, mobile or desk computing devices, headphones, A/V systems, combinations of the foregoing, etc. Some or all processing blocks of the media data processing and consumption pipeline (100) may be implemented with one or more computer devices, in hardware, in software, in a combination of hardware and software, and so forth.

Example media consumption systems as described herein may include, but are not limited to, mobile devices, theater-based devices, augmented reality (AR) devices, virtual reality (VR) devices, computer game devices, TVs, home theaters, headmounted devices, wearable devices, etc.

Under techniques as described herein, a media consumption system may comprise, or may operate in conjunction with, an audio spatial rendering system that incorporates information from user tracking in generating sound fields (or sound images) by way of sound waves emitted from audio speakers driven by the audio spatial rendering system.

As illustrated in FIG. 1, audiovisual data 102 is captured or generated using a media content generation block 105. The audiovisual data (102) may be digitally captured (e.g. by digital camera and/or digital audio recorder, etc.) or generated by a computer (e.g. using computer animation and/or computer authoring/synthesis, using image rendering models, etc.) to provide initial media content 107 in realtime or non-realtime operations. Additionally, optionally or alternatively, the audiovisual data (102) may be captured and stored as analog signals recorded on tangible media. The captured or recorded analog signals is optionally read and converted to a digital format to provide at least a part of the initial media content (107). Additionally, optionally or alternatively, the audiovisual data (102) may be captured in or from live broadcasts, live events, live performance venues, etc., to provide at least a part of the initial media content (107). Additionally, optionally or alternatively, the audiovisual data (102) may be uploaded or aggregated from user devices (e.g., mobile phones, etc.) to a media content aggregator or a media streaming server to provide at least a part of the initial media content (107).

Example audiovisual data and/or initial media content as described herein may include, but is not necessarily limited to only, any of: audio data only such as audio samples or transform coefficients in audio frames/blocks, video data only such as image pixel values or transform coefficients in image frames/blocks, a combination of audio and video data, with or without audio metadata separate from audio data, with or without image metadata separate from video data, with or without other multimedia and/or text data, etc.

In some operational scenarios, as shown in FIG. 1, the initial media content (107) is provided to and (e.g., optionally, etc.) transformed by a media production block 115 in accordance with the creator's intent into a release version before being passed to the next processing stage/phase in the video delivery pipeline (100). The release version comprises media metadata 117-1 and corresponding media content 117-2. Machine learning (ML) and artificial intelligence (AI) based system may also be used to (e.g., fully automatically, with no or minimal user input or manual manipulation, etc.) generate the release version.

Some or all of these devices may, but are not limited to, operate and interact with the creator (or creatives) in a movie studio, a commercial media production system, a home-based media production system, a mobile computing device, etc.

The media content (117-2) in the release version may include, but is not necessarily limited to only, any of: audio data only such as audio samples or transform coefficients in audio frames/blocks, video data only such as image pixel values or transform coefficients in image frames/blocks, a combination of audio and video data, with or without audio metadata separate from audio data, with or without image metadata separate from video data, with or without other multimedia and/or text data, etc. Example media content may include, but are not necessarily limited to only, one or more of: TV shows, media programs, audiovisual programs, live broadcasts, media streaming sessions, movies, etc.

As a part of generating the release version from the initial media content (107), the media production block (115) also generates or produces the media metadata (117-1) corresponding to the media content (117-2). The media metadata (117-1) includes, but is not limited to only, some or all of: audio metadata, image metadata, etc.

Values set for some or all the operational parameters in the audio and/or image metadata may be content specific. For example, operational parameters included in the audio or image metadata (respectively) for audio or image processing operations to be performed in relation to a specific image, a specific visual scene, a specific audio frame, a specific audio scene, etc., may be set with values that are dependent on (respectively) specific pixel values, specific audio sample values, specific distributions of pixel values and/or audio sample values, etc., in the specific image, specific visual scene, specific audio frame, specific audio scene, etc.

Additionally, optionally or alternatively, values set for some or all the operational parameters may be device specific. For example, operational parameters included in the audio or image metadata (respectively) for audio or image processing operations to be performed by a specific media consumption system (or devices operating therewith) may be set with values that are dependent on the specific media consumption system, its system configuration, its image display or audio rendering capabilities, its operational, rendering and/or reproduction environment, other devices operating in conjunction with the specific media consumption system, etc.

The release version may be made available to media consumption systems operating in various audio or audiovisual rendering/reproduction environments. The media production block (115) may operate with a reference rendering environment different from an actual rendering environment with which a media consumption system operates. Some or all of the media content (117-2) and the media metadata (117-1) may be specified in reference to the reference and/or zero or more other (e.g., target, etc.) rendering environments. A media consumption system operating with a specific (or actual) rendering environment different from the rendering environment(s) in reference to which the release version is created can adapt some or all of the media content (117-2) and the media metadata (117-1) in the release version from a reference rendering environment to the specific rendering environment.

Corresponding media metadata and media content in a release version as described herein may be encoded (e.g., with separate metadata or data containers, etc.) in one or more coded bitstreams (e.g., a video signal, etc.), recorded on tangible computer-readable storage media, and/or transmitted or delivered to a recipient device (e.g., a recipient media consumption system, a recipient device operating with one or more media consumption systems, etc.).

As illustrated in FIG. 1, a media coding block 120 receives the release version comprising media content (117-2) and the media metadata (117-1) from the media production block (115); encodes the release version into a coded bitstream 122. As used herein, a coded bitstream may refer to an audio signal, a video signal, an audiovisual signal, a media data stream comprising one or more sub-streams, and so forth. The media coding block (120) comprises one or more audio and video encoders, such as those defined by ATSC, DVB, DVD, Blu-Ray, and other delivery formats, to generate the coded bitstream (122).

The coded bitstream (122) is delivered downstream to one or more receivers or recipient devices or media consumption systems including but not limited to decoders, media source devices, media streaming client devices, television sets (e.g., smart TVs, etc.), set-top boxes, movie theaters, mobile computing devices, or the like.

As illustrated in FIG. 1, in a media consumption system, the coded bitstream (122) is decoded by a media decoding block 130 to generate decoded media metadata 132-1 and decoded media content 132-2. The media decoding block (130) comprises one or more audio and video decoders, such as those defined by ATSC, DVB, DVD, Blu-Ray, and other delivery formats, to decode the coded bitstream (122).

The decoded media metadata (132-1) may include and may be identical to some or all of the media metadata (117-1) encoded (e.g., with lossless compression, etc.) into the coded bitstream (122) by the media coding block (120). The decoded media content (132-2) may be identical, or correspond, to the media content (117-2) subject to quantization and/or coding errors caused by (e.g., lossy, etc.) compression performed by the media coding block (120) and decompression performed by the media decoding block (130).

The decoded media metadata (132-1) can be used together with the decoded media content (132-2) by the media consumption system, or audio and/or image rendering device(s) 135 operating in conjunction with the media consumption system, to perform audio processing, video processing, audio reproduction/transduction, image rendering/reproduction, and so forth.

3. MEDIA RENDERING ENVIRONMENT

Figure 2:
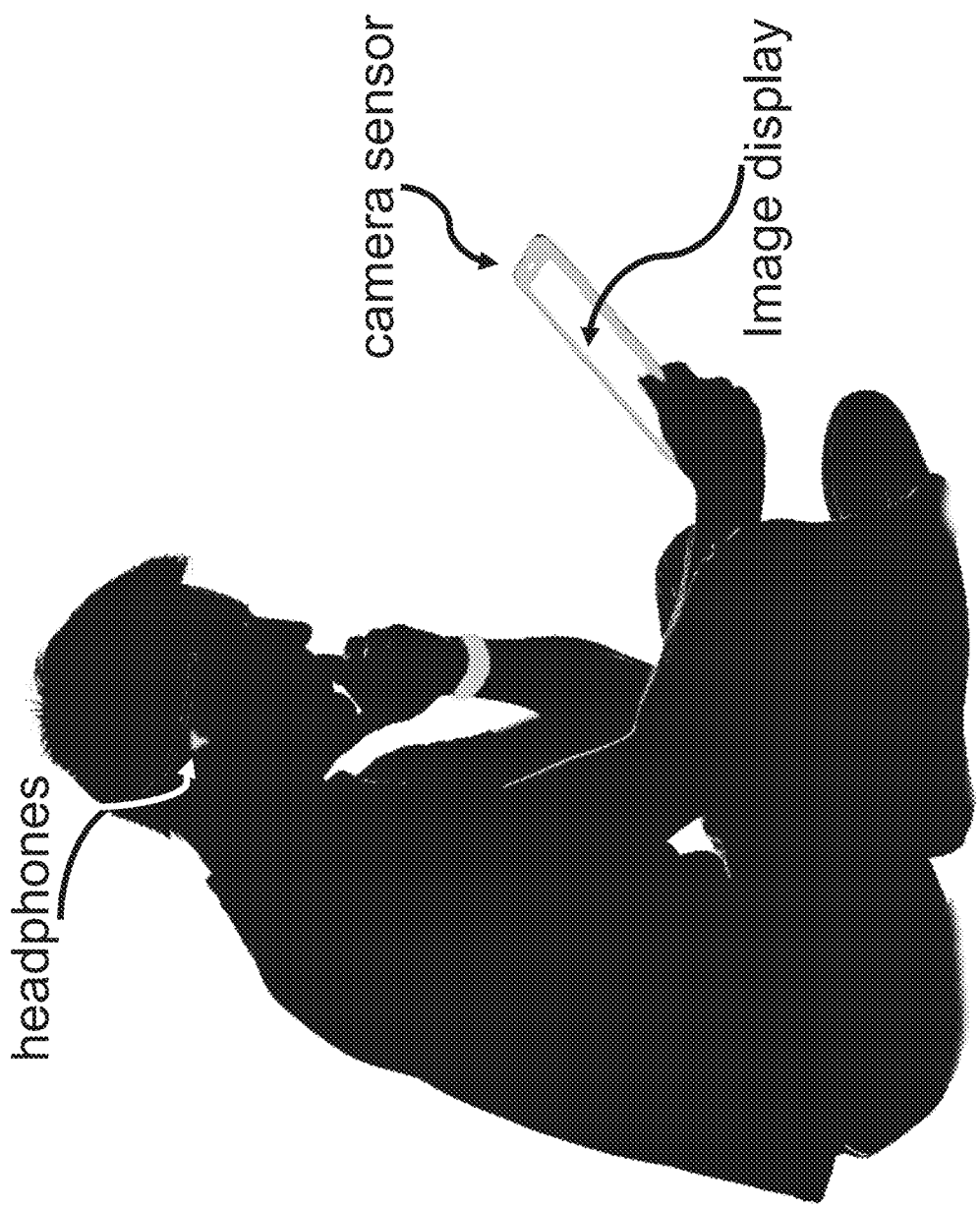
FIG. 2 illustrates an example rendering environment.

FIG. 2 illustrates an example rendering environment. Any of these devices and components therein may be implemented with hardware, software, a combination of hardware and software, etc. These devices may include a media decoding block (e.g., 130 of FIG. 1, etc.) and audio and/or image rendering device(s) (e.g., 135 of FIG. 1, etc.) including but not limited to any of: an audio rendering control device, an audio spatial rendering device, etc.

As shown, a user—operating with a media consumption system (which may be either a monolithic system or a distributed computing system) comprising headphones and a mobile computing device—is watching images rendered based on media content (e.g., 117-2 of FIG. 1, etc.) on an image display of the media consumption system such as a display of a tablet computer and listening to audio (corresponding to or accompanying or time synchronized with the rendered images) rendered based on the media content (117-2) through a headphone device. One or more user tracking components may include one or more camera sensors that capture images relating to the user or the rendering environment in which the user operates. Image analysis software may be deployed with the media consumption system, camera sensors and/or other sensors deployed with the media consumption system, etc. These components may be deployed for tracking the user's identity, locations, movements, rendering environments, etc., while the media content (117-2) is being processed, adjusted and rendered to the user. Content rendering on the image display, audio speakers (e.g., headphones, non-headphone speakers, speakers on a laptop computer or a mobile computing device, etc.), etc., may be adjusted or modified based on media metadata (e.g., 117-1 of FIG. 1, etc.) received by the media consumption system with the media content (117-2) and the user tracking (e.g., including tracking of the rendering environment in which the user is contemporaneously located, etc.).

It should also be noted that media consumption may involve only audio (in some operational scenarios), but distinctions between "user", "viewer" and "listener" may not be called out in all cases in this disclosure. A viewer and/or a listener may be generally referred to herein as a user.

Figure 6A:
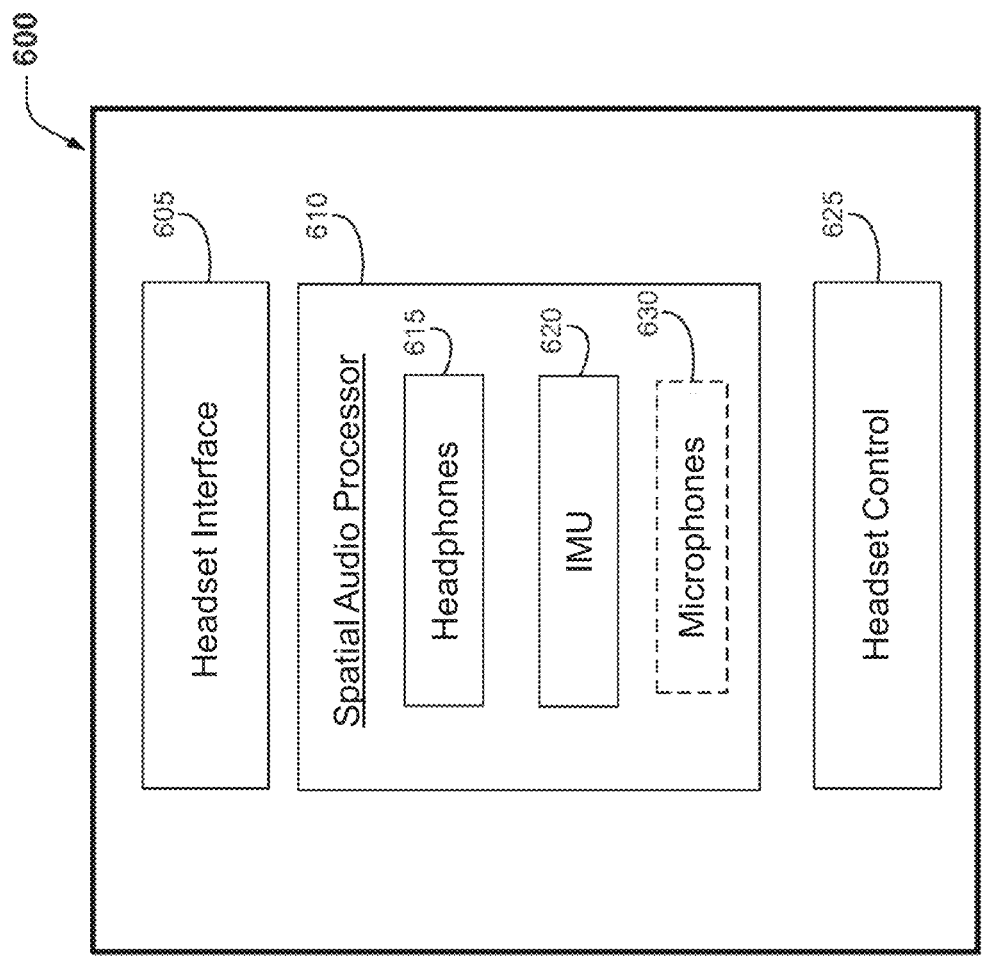
FIG. 6A illustrates an example headset system.

FIG. 6A illustrates an example headset system 600 implemented by a wearable device or a headset device. The system configuration (600) may comprise some or all of: a headset interface 605, a spatial audio processor 610, a headset control 625, etc. Any, some or all components of the system (600) may be implemented via hardware, software, firmware, any combination of the foregoing, etc. More or fewer components may be used or implemented in various operational scenarios.

In some operational scenarios, the headset interface (605) may include one or more network and/or data interfaces to support wired and/or wireless network and/or data communications (e.g., audiovisual sample data, audio sample data, control data, status information, events, triggers, probes, requests, responses, GPS signals, etc.) with other modules/devices/systems (e.g., laptop computers, mobile computing devices, A/V systems, media streaming systems, etc.) in a media consumption system as described herein. Example network and/or data communications as described herein may include, but are not necessarily limited to only, any or some of: radio frequency communications, satellite communications, infrared communications, universal serial bus (USB) based communications, optical communications, and so forth.

Additionally, optionally or alternatively, the headset system (600) or the headset interface (605) therein may comprise or implement user interfaces to interact with a user operating with or wearing the headset system (600) or headset.

The headset control (625) may be implemented with one or more of: a specifically designed processor, a general purpose single- or multi-chip processor, a digital signal processor (DSP), an application specific integrated circuit (ASIC), a field programmable gate array (FPGA) or other programmable logic device, discrete gate or transistor logic, discrete hardware components, transitory or non-transitory media, random access memory (RAM) devices, read-only memory (ROM) devices, etc.

In some operational scenarios, the spatial audio processor (610) comprises or operates with headphones 615, orientation sensors such as an IMU (620), etc. In various operational scenarios, a headset system such as 600 as described herein may operate with internal or external orientation sensors including any, some or all of: IMUs, accelerometers, magnetometers, gyroscopes, etc.

For example, motion or acceleration vectors (e.g., gravitational vector, g-force, velocity, etc.) may be computed or derived from IMU measurements generated by the IMU (620). These vectors can be additively accumulated or superimposed with the user's previous (e.g., head, measured, etc.) orientation or position at a previous time point to obtain the user's current or new (e.g., head, measured, etc.) orientation or position at a current time point (e.g., immediately following the previous time point, etc.). As a result, drift errors occurred in the IMU measurements can be additively accumulated or superimposed as well. Over time, the drift errors may deviate sufficiently (e.g., over 5 angular degrees, over 10 angular degrees, etc.) to the point the user may audibly perceive audio objects rendered in sound fields/scenes/images in response to the user's measured orientation or position (or changes thereof) are different from corresponding visual objects rendered in time synchronized video images corresponding to the sound fields/scenes/images.

The headphones (615) may be controlled or driven to generate or reproduce soundwaves, for example by the spatial audio processor (610) and/or the headset control (625) using audio (sample and/or metadata) data received by the headset system (600) via the headset interface (605).

In some operational scenarios, the soundwaves may be generated or reproduced based at least in part on the user's current (e.g., head, measured, reset, corrected, reoriented, etc.) orientation or position. As a result, spatial audio depicting sound fields/scenes/images may be rendered with the soundwaves generated or reproduced by the headphones (615).

In some operational scenarios, the headset system (600) or the spatial audio processor (610) therein may be implemented to support (e.g., ambient, wind, environmental etc.) noise cancellation, including but not limited to adaptively and/or dynamically attenuating (e.g., ambient, wind, environmental etc.) noise at runtime based on (e.g., ambient, wind, environmental etc.) noise measurements. For example, the spatial audio processor (610) may adaptively attenuate noise based, at least in part, on microphone data generated from one or more microphones 630. In some operational scenarios, at least one microphone in the one or more microphones (630) is disposed or located in the headset.

A media consumption system as described herein can be used to simultaneously drive sound scene/image rendering operations and/or video image rendering operations. In various operational scenarios, the media consumption system can support media content consumption by a single user or concurrent media content consumption by multiple users.

User(s) present in a media rendering environment (e.g., a home, a vehicle, a cinema, a movie theater, etc.) may register headset(s) and/or other wearable device(s) with the media consumption system for the purpose of listening to spatial audio and/or viewing video images rendered by the media consumption system.

In some operational scenarios, the headset(s) and/or the other wearable device(s) can be automatically registered. For example, tracking sensors (e.g., cameras, etc.) operating with the media consumption system can be deployed in the media rendering environment to track or monitor spatial positions and spatial directions of the headset(s) and/or the wearable device(s) and/or the head(s) of the user(s) in the media rendering environment. Additionally, optionally or alternatively, the tracking sensors can be used to obtain or identify device ID information for the headset(s) and/or the wearable device(s) such as MAC addresses, network addresses, IP addresses, etc. The device ID information, spatial positions and spatial directions of the headset(s) and/or the wearable device(s) may be used to register t the headset(s) and/or the wearable device(s) and to deliver (spatial) audio data and/or image data to the registered headset(s) and/or the wearable device(s) at the correct MAC addresses, network addresses, IP addresses, etc. Example device tracking can be found in U.S. Provisional Application No. 62/484,131, titled "PASSIVE MULTI-WEARABLE-DEVICES TRACKING," filed on Apr. 11, 2017, the entire contents of which are incorporated by reference in its entirety as if fully set forth herein.

Under techniques as described herein, in multi-user operational scenarios, multiple sound scenes or images can be simultaneously rendered on multiple headsets or other wearable devices of multiple users. Each of the sound scenes or images may be individually adjusted depending on respective tracked spatial information (e.g., positions, locations, orientations, etc.) of a respective user among the multiple users.

4. CAMERA AND SENSOR-BASED HEAD TRACKED RENDERING AND CONTROL

In some operational scenarios, in a media rendering environment, one or more cameras or sensors (e.g., laser-based ranging sensors, Light Detection and Ranging sensors or LIDARs, etc.) can be used—in place of or in conjunction with an IMU—in or with a media consumption system to control the processing and/or rendering of audio (e.g., audio content, audio signal, audio data, audio samples, audio essence, audio part of a media signal/program, etc.) by the media consumption system.

A number of different approaches may be implemented to track a user and modify sound fields generated by audio speakers operating in conjunction with an audio spatial rendering system in the media consumption system. In some operational scenarios, IMU may be used with a user's headphones (e.g., Dolby Dimension headphones commercially available from Dolby Laboratories, Inc., California) to perform user tracking. The IMU can provide accurate rotational (or orientational) information (three dimensions/degrees of freedom or 3DoF) about the user but may not provide translational (or positional) information about the user. The rotational information may be sufficient for the audio spatial rendering system implemented (e.g., in Dolby Dimension headphones, etc.) to use it to change, vary or adjust the rendering of a binaural audio signal (or audio represented therein) in response to the user's rotational position changes. A disadvantage to an IMU-only user tracking system is that IMU measurements may contain drift errors and may only provide 3DoD information rather than six dimensions/degrees of freedom (6DoF) information.

Under (sensor fusion) techniques as described herein, non-IMU sensors including but not limited to camera sensors or other visual/image based techniques (e.g., radar, light based ranging sensors, LIDAR, ML-based techniques, AI-based techniques, etc.) may be used in place of or in conjunction with IMU to perform user tracking and modify/adjust sound or audio rendering in response to changes in the user's spatial positions and/or orientations up to 6DoF.

In some operational scenarios, as illustrated in FIG. 2, a camera sensor on a mobile computing device (e.g., laptop, mobile phone, etc.) can be used to find or acquire time sequential images of the user's face. The media consumption system can receive the images in real time (e.g., within a strict real time delay such as less than one millisecond, contemporaneously, etc.) and fit a face mesh to—or superimpose/overlay a mesh over—the user's face captures in the images. The media consumption system, or an audio rendering control system therein, can apply image processing filters or object segmentation/detection operations/algorithms/methods (including but not limited to those based on AI, ML, artificial neural networks, etc.) over image data and detect or recognize image features representing ears, eyes (e.g., 694-1 and 694-2 of FIG. 6D with an interpupil distance 696, etc.), headphones, etc. The media consumption system, or an audio rendering control system therein, can detect track coordinates of facial parameters (e.g., individual coordinates of mesh vertices/points, individual coordinates of image features representing eyes or ears, individual coordinates of image features representing headphones, etc.) with the face mesh in real time to determine or identify where the user's eyes are, where the user's ears are, where the user's head is in spatial (e.g., positional, orientational, a combination of positional and orientational, etc.) relationship to the camera sensor. The spatial relationship between the user and the camera sensor can be used to adjust or change the rendering of spatial audio (e.g., sound fields, sound images, audio sources depicted in the sound fields/images, etc.) in accordance with spatial location and/or orientation of the user's head in the 3D physical space (or rendering environment) in which the user is contemporaneously located.

There may be a wide variety of system configurations in which user tracking based audio spatial rendering techniques can be implemented. For the purpose of illustration only, a couple of example system configurations are depicted in FIG. 3A and FIG. 3B.

Figure 3A:
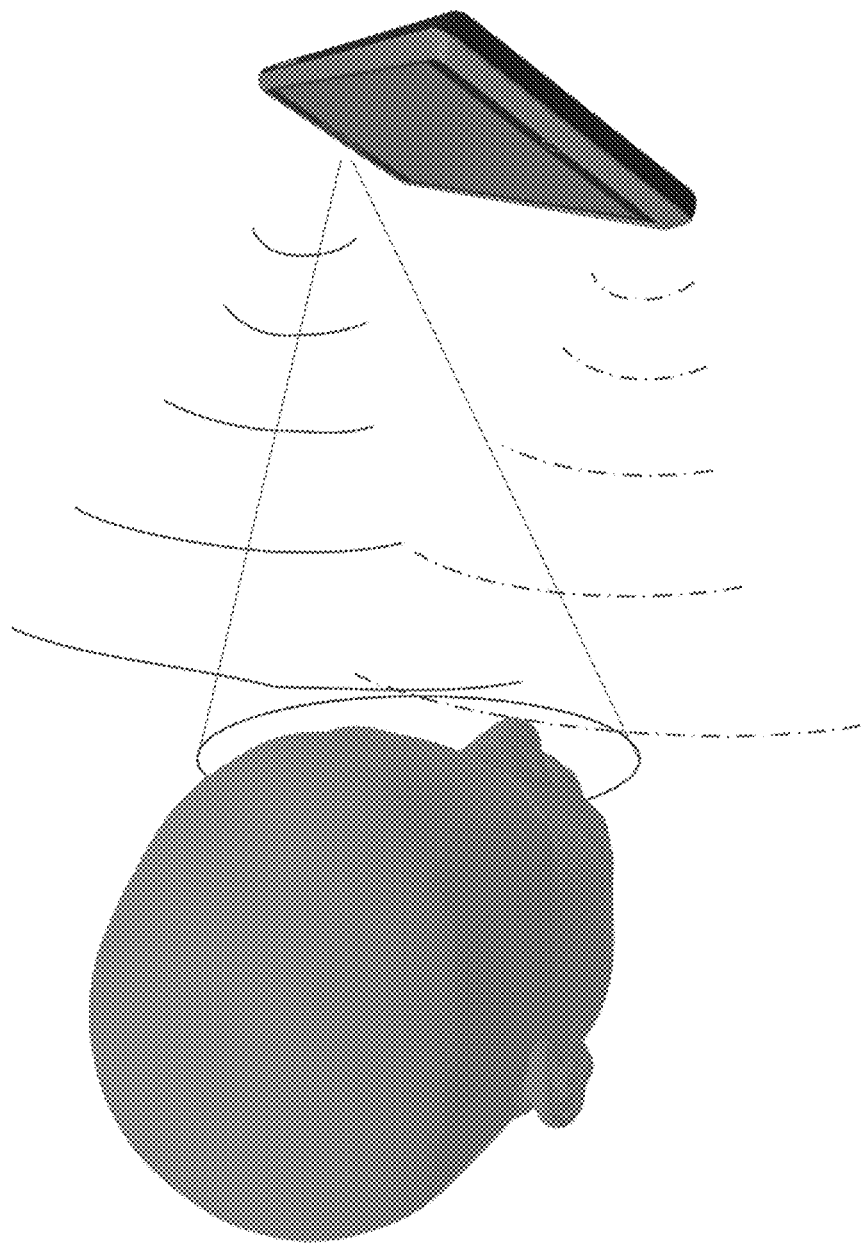
FIG. 3A and FIG. 3B illustrate example audio spatial rendering.

In a first example system configuration as illustrated in FIG. 3A, user tracking based audio spatial rendering techniques may be at least in part implemented with the user's headphones. Spatial audio can be rendered by the user's headphones by way of binauralized audio. The binauralized audio may be generated in response to changes in the user's spatial information (e.g., the user's locations and/or orientations, etc.) by the user's headphones or by an audio spatial rendering system external to the headphones based on a head related transfer function (HRTF) applicable to or selected for the user. As a result, sound images depicted in the binauralized (or binaural) audio change, depending on locations and/or orientations of the user determined or tracked by the media consumption system.

Figure 3B:
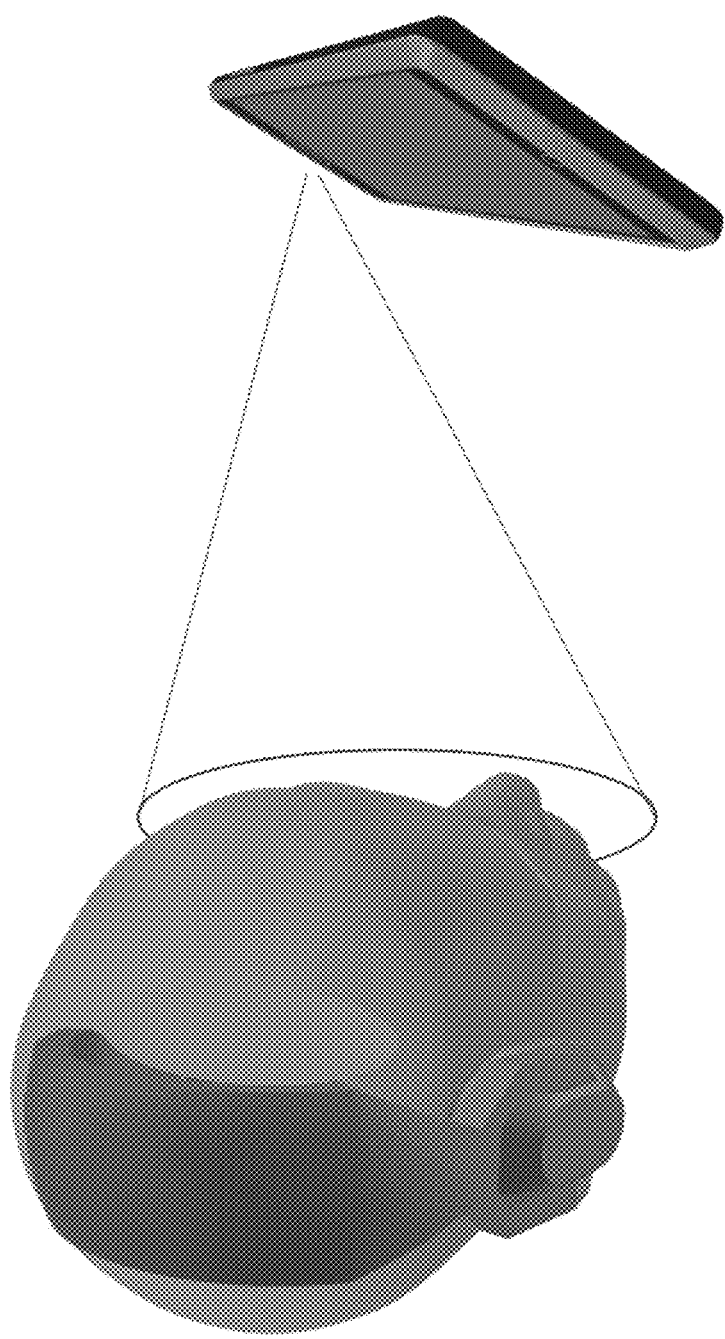

In a second example system configuration as illustrated in FIG. 3B, user tracking based audio spatial rendering techniques may be at least in part implemented with (non-headphone) audio speakers of the user's computing device. Spatial audio can be rendered by the audio speakers by way of sound waves emitted by the audio speakers to the user's ears. The sound waves (with resultant sound fields/images) may be generated in response to changes in the user's spatial information (e.g., the user's locations and/or orientations, etc.) by the audio speakers. As a result, sound images depicted in the audio (or sound waves emitted from the audio speakers) change, depending on locations and/or orientations of the user determined or tracked by the media consumption system. In some operational scenarios, the audio speakers form a phased array. Magnitudes and/or phases of sound waves emitted from each of some or all the audio speakers can be adjusted based on the user's spatial positions and/or orientations as determined or estimated through user tracking. The adjusted audio can make the user's ears to be sweet spots (e.g., specifically optimized locations for intended audio reception, etc.) for receiving optimized (e.g., ideal, specifically selected, etc.) sound images (or stereo images) depicted by the sound waves. Additionally, optionally or alternatively, advanced modeling can be used or implemented to cancel out audio leakage (e.g., from one speaker to the other, etc.) for the purpose of providing or supporting relatively high quality audio separation. For example, distances or sound transmission times from audio speakers to the user's ear (e.g., left ear, right ear, or both) may be computed or modeled by a media consumption system as described herein to time or trigger the emission of sound waves of opposite phase (e.g., with a new audio signal portion generated by the audio spatial rendering system; the new audio signal portion not necessarily provided in received audio signal, etc.) from another audio speaker to cancel sound waves leaked from an audio speaker to the user's ear.

In some operational scenarios, a combination of headphones and non-headphone audio speakers can be used to implement at least in part user tracking based audio spatial rendering techniques as described herein. In an example, in a cinema rendering environment (with multiple users), non-headphone (or far field) audio speakers can emit sound waves independent of changes in any particular user's spatial position and/orientation, while headphones (including but not limited to near field audio speakers near or at the user's ears) can emit sound waves adjusted in response to changes in any particular user's spatial position and/orientation. In another example, in a single-user rendering environment, both non-headphone (or far field) audio speakers and headphones (including but not limited to near field audio speakers near or at the user's ears) can emit sound waves adjusted in response to changes in any particular user's spatial position and/orientation.

In some operational scenarios, one or more components of a media consumption system such as some or all of an audio rendering control system, an audio spatial rendering system, non-headphone audio speakers, camera sensors, other sensors, etc., may be implemented with a mobile computing device such as a mobile phone. The mobile computing device may implement simultaneous localization and mapping (SLAM) techniques/methods/algorithms to track the mobile computing device's position and/or orientation in space (or in the rendering environment).

In some operational scenarios, a mobile computing device such as a mobile phone operated by a user may be equipped or provisioned with a front facing (e.g., camera, non-camera, LIDAR etc.) sensor and a rear facing (e.g., camera, non-camera, LIDAR, etc.) sensor. The mobile computing device can be configured to use the front facing (e.g., LIDAR/face, etc.) sensor to track real time the user's spatial information as well as spatial relationships between the user's face and the mobile computing device.

Additionally, optionally or alternatively, the mobile computing device can be configured to use the rear facing (e.g., LIDAR/face, etc.) sensor to track real time a rendering environment in which the user is contemporaneously located and spatial relationships between the rendering environment and the mobile computing device. The rear facing sensor can image and create a visual representation of the environment (e.g., room, bus, car, venue, outdoors, objects therein, etc.) to track the environment and provide accurate positional and rotational information relating to the rendering environment, the mobile computing device, or the user.

In some operational scenarios, a combination of image/sensor information (including but not limited to orientational information) acquired by multiple sensors (in place of or in combination with IMU) provides relatively complete positional information relating to the user, audio speakers, mobile computing devices, the rendering environments, etc.

To lessen power consumption (e.g., to comply with power constraint when a device is not plugged in, etc.) or save battery power, sampling or frame rates of acquisition of image/sensor information may be limited or capped. Instead of using a relatively fast or high sampling or frame rates, one or more (e.g., non-IMU, etc.) sensors can operate with a relatively slow or low sampling or frame rates by making use of an IU deployed with headphones (e.g., headphones implementing Dolby Dimension technologies commercially available from Dolby Laboratories, Inc., California) or mobile computing devices.

Image/sensor information acquired by the former (e.g., non-IMU, etc.) sensors can be used to complement or combine with IU data or measurements generated by the IMU to track the user, rendering environment, any present non-headphone audio speakers, a mobile computing device which renders video images (time synchronized with the spatial audio as described herein) on an image display, etc.

An IU only tracking solution may lack the ability to tell or determine if the user is relatively slowly rotating or whether the position of the head is relatively slowly changing in relationship to the mobile computing device or components (e.g., image display, audio speakers, etc.) therewith. For example, in operational scenarios in which the user is on a moving vehicle such as a bus, sound fields/images depicted by sound waves emitted by headphones or non-headphone audio speakers may (e.g., relatively slowly, etc.) rotate or change in response to rotational changes as indicated in IU measurements acquired by an IMU deployed with the headphones or the mobile computing device with which the user is operating, even though spatial relationships between or among the user and the mobile computing device (e.g., rendering time synchronized video images, etc.) stay the same.

Under techniques as described herein, other sensors such as one or more camera sensors other than the IMU can generate image/sensor data that can be fused or combined with IMU measurements generated by the IMU. As a result, a mobile consumption device—or an audio rendering control system, an audio spatial rendering system, etc., thereof—can relatively accurately and robustly determine spatial relationships between or among the user and the mobile computing device. Thus, in the previous example in which IMU indicates rotations, the mobile consumption device can use the fused sensor data to determine the spatial relationships between or among the user and the mobile computing device (e.g., rendering time synchronized video images, etc.) stay the same and to prevent rotating or changing the sound fields generated by the headphones and/or non-headphone audio speakers.

As previously mentioned, sampling or frame rates of (e.g., non-IMU, etc.) sensors that generate image/sensor information to be combined or fused with IMU measurements generated by an IMU does not have to be at a higher or comparable temporal resolution as compared with a temporal resolution of the IMU in sampling or generating the IMU measurements. In some operational scenarios, the non-IMU sensors such as a camera sensor can operate at a sampling or frame rate much lower (e.g., twice, five times, ten times, every second instead of every millisecond, etc.) than a sampling or frame rate with which the IMU generates the IMU data or measurements. The relatively slowly acquired image/sensor data from the non-IMU sensors may be used to correct drift errors or inability (to detect 6DoF spatial information) caused by the IMU and generate relatively accurate sound fields/images for the user, for example in relation to time synchronized video images rendered by the media consumption system.

5. USER AND USER DEVICE TRACKING WITH MEDIA CONSUMPTION SYSTEM

In some operational scenarios, the media consumption system implements some or all tracking techniques as described herein to receive, identify, and/or generate device ID information (e.g., MAC addresses, network addresses, IP addresses, etc.) of headset(s) and/or other wearable device(s) of user(s) in the media rendering environment; register each of the headset(s) and/or other wearable device(s) of the user(s) for receiving spatial audio data and/or image data to be rendered by the headset(s) and/or other wearable device(s) of the user(s); etc.

The media consumption system can receive or access an input audiovisual or an input audio signal generated for a reference user at a reference position (e.g., a reference sweet spot, etc.) and/or a reference orientation in a reference media rendering environment (e.g., a production-studio rendering environment, etc.) via media streaming or via computer-readable media.

The media consumption system can decode reference spatial audio generated for the reference user from the received/accessed signal; receive positional and orientational data of the user(s) such as positional and orientational data of the headset(s) and/or other wearable device(s) of the user(s); create, generate, and/or adapt some or all of the reference spatial audio into, respective individualized spatial audio for each of the user(s) based at least in part on the positional and orientational data of the user(s); send the respective individualized spatial audio to a headset and/or another wearable device (e.g., 690, etc.) of each such user over one or more data communication links; etc. Example data communication links may include, but are not limited, wireless communication links, wired communication links, radio-frequency based communication links, cellular network communication links, Wi-Fi communication links, infrared-based communication links, communication links over HDMI cable, communication links over optical cable, communication links over High-Speed Serial Interface (HSSI), High-Definition Serial Digital Interface (HD-SDI), 12G-SDI, USB cable, etc.

Individualized spatial audio as described herein may be binauralized audio generated by the media consumption system or an audio spatial rendering system therein in response to changes in a respective user's spatial information (e.g., the user's locations and/or orientations, etc.) based on a head related transfer function (HRTF) applicable to or selected for the user. As a result, sound images depicted in the binauralized (or binaural) audio change, depending on locations and/or orientations of the user determined or tracked by the media consumption system.

In some operational scenarios, the media consumption system can first identify what headphones a user is wearing/using or what non-headphone audio speakers with which the system is operating or driving. Based on (e.g., prior, established, dynamically fetched, etc.) audio speaker profiles for the headphones and/or audio speakers, the media consumption system can determine, select, generate and/or implement optimized (e.g., specific, best possible, etc.) audio equalization (EQ) operations for some or all of the audio speakers (e.g., headphones, non-headphone audio speakers, etc.). These EQ operations can be applied or performed by the media consumption system or the audio spatial rendering system therein to generate individualized spatial audio for a corresponding user.

The headset and/or the wearable device of each such user can use the respective individualized spatial audio to drive headphones of the headset and/or the wearable device to generate soundwaves depicting respective individualized sound fields/scenes/images for the user.

In some operational scenarios in which external or non-headphone audio speakers (e.g., cinema audio speakers, entertainment room audio speakers, etc.) operate with the media consumption system to support media consumption by multiple users with multiple user devices/headsets, the media consumption system can extract or generate device-general (e.g., not specific to any particular headset or wearable device, etc.) spatial audio from the reference spatial audio received with the input signal; use the device-general spatial audio to drive the non-headphone audio speakers in the media rendering environment; etc. The device-general spatial audio rendered by the external or non-headphone audio speakers can be used to complement individual device-specific spatial audio portions that are rendered by the respective individual user devices/headsets using headphones. Examples of device-general spatial audio include, but are not necessarily limited to only, spatial audio to be rendered by the non-headphone audio speakers in an audio speaker configuration such as a stereo speaker configuration, 5.1 speaker configuration, 7.1 speaker configuration, etc.

In some operational scenarios in which non-headphone audio speakers (e.g., laptop built-in audio speakers, etc.) operate with the media consumption system to support media consumption by a single user with or without a headset or another wearable device, as illustrated in FIG. 3A, the media consumption system can create, generate and/or adapt user-specific (e.g., specific to the user's spatial position and/or orientation in real time, etc.) spatial audio from the reference spatial audio received with the input signal; use the user-specific spatial audio to drive the non-headphone audio speakers in the media rendering environment; etc. Examples of user-specific spatial audio include, but are not necessarily limited to only, spatial audio to be rendered by the non-headphone audio speakers in an audio speaker configuration such as a stereo speaker configuration, 5.1 speaker configuration, 7.1 speaker configuration, etc.

Figure 6B:
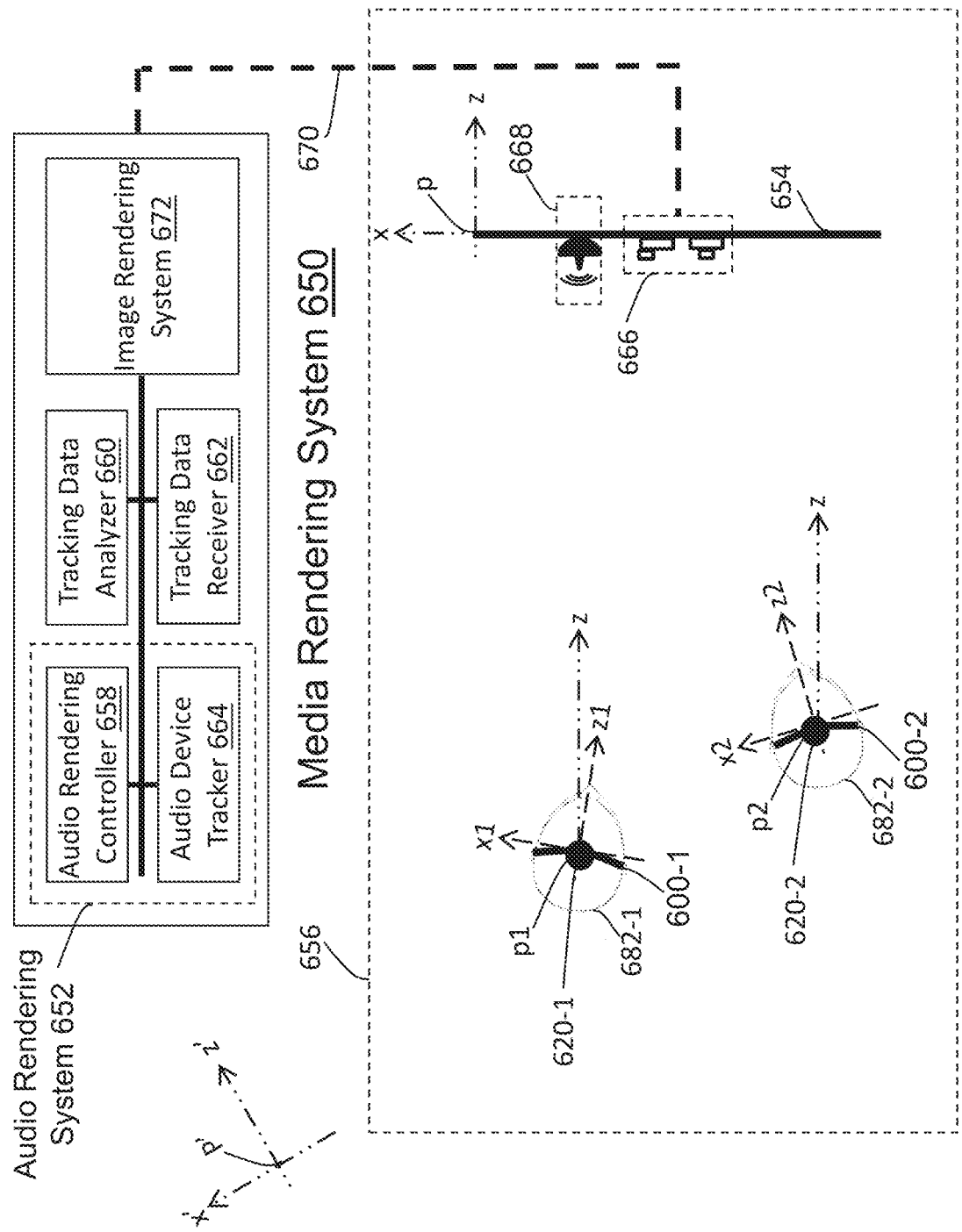
FIG. 6B illustrates an example media consumption system.

In some operational scenarios in which headphones (e.g., in-ear or near-ear audio speakers, in headset(s), in wearable device(s), etc.) operate with the media consumption system to support media consumption by a single user as illustrated in FIG. 3B or multiple users as illustrated in FIG. 6B, the media consumption system can create, generate, and/or adapt user-specific (e.g., specific to the user's spatial position and/or orientation in real time, etc.) spatial audio from the reference spatial audio received with the input signal; use the user-specific spatial audio to drive the headphones of the single user or the multiple users respectively in the media rendering environment; etc.

In some operational scenarios in which headphones (e.g., in-ear or near-ear audio speakers, in headset(s), in wearable device(s), etc.) operate with the media consumption system to support media consumption by a single user as illustrated in FIG. 3B or multiple users as illustrated in FIG. 6B, the media consumption system can perform user device (or headphone) tracking; identify individual make and/or model of each pair in some or all pairs of headphones used by the user(s); use individual makes and/or models of the pairs of headphones to determine corresponding audio related rendering capabilities for each pair in some or all pairs of headphones used by the user(s); etc.

For those pairs of headphones that are capable of creating, generating, and/or adapting user-specific (e.g., specific to the user's spatial position and/or orientation in real time, etc.) spatial audio from the reference spatial audio, the media consumption system may send the reference spatial audio received with the input signal to those headphones (or user headsets/devices); send, provide and/or supply correct spatial information along with the reference spatial audio to some or all of these pairs of headphones (or user headsets/ devices) to cause the headphones (or user headsets/devices) to use the received correct spatial information (which may be self-sufficient or alternatively which may be combined with or used to correct IMU measurements/data collected by IMUs with the headphones) to create, generate, and/or adapt user-specific (e.g., specific to the user's spatial position and/or orientation in real time, etc.) spatial audio from the reference spatial audio; use the user-specific spatial audio to drive the headphones of the single user or the multiple users respectively in the media rendering environment; etc.

The media consumption system may be used to support real time audiovisual or audio applications, near-real-time audiovisual or audio applications, non-real-time audiovisual or audio applications, virtual reality (VR) applications, augmented reality (AR) applications, remote presence applications, automobile entertainment applications, helmet mounted display applications, heads up audiovisual or audio applications, games, 2D audiovisual or audio applications, 3D audiovisual or audio applications, multi-view audiovisual or audio applications, etc. Some or all of spatial audio data as described herein can be received, generated or accessed by the media consumption system in real time, in near real time, in non-real time, etc.

Techniques as described herein can be implemented in a variety of system architectures. Some or all audiovisual or audio processing operations as described herein can be implemented by one or more of cloud-based media streaming servers, media streaming servers collocated with or incorporated into wearable devices, media streaming clients, A/V receivers, etc. Based on one or more factors such as types of audiovisual or audio applications, bandwidth or bitrate budgets, computing capabilities, resources, loads, etc., of recipient devices, computing capabilities, resources, loads, etc., of media streaming servers, A/V receivers, underlying computer networks, etc., some audiovisual or audio processing operations can be performed by a headset or wearable device, while some other audiovisual or audio processing operations can be performed by a non-wearable device such as a tablet computer, a desktop computer, a home-based entertainment system, a commercial entertainment system, a cinema based system, etc.

FIG. 6B illustrates an example media consumption system 650 in which spatial positions and/or spatial orientations of headsets (e.g., 600 of FIG. 6A, 600-1, 600-2, etc.) in a media rendering environment (e.g., 656, etc.) may be tracked or monitored (e.g., in real time while media content is being rendered to or consumed by user(s), etc.) by the media consumption system (650) therein. As illustrated, the media consumption system (650) comprises an audio spatial rendering system 652, an image rendering system 672, an image display 654 (e.g., which is used by the image rendering system (672) to render time-synchronized video scenes/images corresponding to sound scenes/images, etc.), a tracking data analyzer 660, a tracking data receiver 662, an external sensor assembly 666, etc. In some embodiments, the audio spatial rendering system (652) comprises an audio rendering controller 658, an audio device tracker 664, etc. In some operational scenarios, the external sensor assembly (666) comprises one or more external sensors (e.g., camera sensors, non-camera sensors, etc.). The media consumption system (650) may communicate with headsets such as 600-1, 600-2, etc., over one or more second data communication links 668.

Some or all of the components and/or devices as depicted in FIG. 6B may be implemented by one or more mechanical components, one or more electrooptical components, one or more computing devices, modules, units, etc., in software, hardware, a combination of software and hardware, etc. Some or all of the components and/or devices as depicted in FIG. 6B may be communicatively (e.g., wirelessly, with wired connections, etc.) coupled with some other components/devices as depicted in FIG. 6B or with other components/devices not depicted in FIG. 6B.

Some or all of the media consumption system (650), or the audio spatial rendering system (652) and/or the image rendering system (672) therein, can be collocated, or even integrated as a single device (e.g., a smart TV, a tablet computer, a mobile phone, etc.), with the external sensor assembly (666) and/or the image display (654). Additionally, optionally or alternatively, in some operational scenarios, one or both of the audio spatial rendering system (652) and the image rendering system (672) can be remote from the external sensor assembly (666). One or both of the audio spatial rendering system (652) and the image rendering system (672) can be operatively linked with the external sensor assembly (666) over one or more (internal and/or external) data communication links 670. Example data communication links as described herein may include, but are not necessarily limited to only, any combination of one or more of: wireless connections, wired connections, local network connections, wide area network connections, etc.

In some operational scenarios, the external sensor assembly (666) is deployed (e.g., with a smart TV, a tablet computer, a mobile phone, etc.) in the media rendering environment (656) in which one or more headsets (e.g., 600 of FIG. 6A, 600-1, 600-2, etc.) used by one or more users (e.g., 682-1, 682-2, etc.) are located. The media consumption system (650) operates with the external sensor assembly (666) to track/monitor spatial positions and/or spatial orientations of each headset in the one or more headsets (e.g., 600 of FIG. 6A, 600-1, 600-2, etc.) in the media rendering environment (656) in real time or in near real time.

Examples of the media rendering environment (656) may include, but are not necessarily limited to only, any of: a personal space, a shared space, a bus, a car, a ship, a vehicle, a cinema, a theater, a concert hall, an auditorium, an amusement park, a bar, a home, a room, an exhibition hall, a venue, a bar, an airplane, a production-studio media rendering environment, a post-production media rendering environment, etc. The media rendering environment (656) may represent a three-dimensional (3D) space or volume (e.g., a stationary space such as a room in a building, a moving space such as a space inside a moving vehicle, etc.) in which the users (e.g., 682-1, 682-2, etc.) listen to spatial audio rendered at least in part through the users' headsets (e.g., 600-1, 600-2, etc.) operating with or driven by the audio spatial rendering system (652), while viewing time-synchronized video scenes/images rendered by the image rendering system (672) on the image display (654).

In some operational scenarios, the media rendering environment (656) such as a room, a building, a bar, a hall, etc., may be stationary or have a fixed time constant spatial relationship to an earth-stationary coordinate system such as an earth-stationary Cartesian coordinate system comprising x', y', etc., as coordinate axes/dimensions and p' as the origin or reference point. In some operational scenarios, the media rendering environment (656) such as a car, bus, ship, airplane, train, etc., may be non-stationary or have time varying spatial relationships to the earth-stationary coordinate system such as the earth-stationary Cartesian coordinate system with the coordinate axes x', y', etc., and the origin or reference point p'.

In some operational scenarios, a display-stationary three-dimensional coordinate system may be used to represent spatial positions in the media rendering environment (656). The display-stationary three-dimensional coordinate system refers to a coordinate system (and its accompanying axes or dimensions) that is stationary to the image display (654).

By way of illustration but not limitation, the display-stationary three-dimensional coordinate system may be a Cartesian coordinate system (e.g., a world coordinate system, etc.) stationary to the image display (654). FIG. 6B depicts only two example spatial dimensions, namely an x-axis and a z-axis, of the display-stationary Cartesian coordinate system. It should be noted that the display-stationary Cartesian coordinate system may comprise another spatial dimension, namely a y-axis orthogonal to both the x and z axes, that points out from FIG. 6B. The display-stationary Cartesian coordinate system may comprise a coordinate system origin at a display-stationary spatial position denoted as "p" as shown in FIG. 6B. The display-stationary spatial position may be selected from spatial positions stationary to the image display (654).

Each of some or all of the headsets (e.g., 600 of FIG. 6A, 600-1, 600-2, etc.) tracked/monitored by the audio spatial rendering system (652) may, but is not necessarily limited to only, to be a rigid-body or near rigid-body device in operation. Spatial positions on the headsets (e.g., 600 of FIG. 6A, 600-1, 600-2, etc.) can be represented in headset-stationary three-dimensional headset-stationary coordinate systems that are respectively stationary relative to the headsets (e.g., 600 of FIG. 6A, 600-1, 600-2, etc.).

For example, a first headset-stationary Cartesian coordinate system stationary to a first headset 600-1 can be used to represent spatial positions on the first headset (600-1). The first headset-stationary Cartesian coordinate system comprises three spatial dimensions represented by respective axes including an x1-axis and a z1-axis as shown in FIG. 6B, and a y1-axis orthogonal to both the x1 and z1 axes that is not depicted in FIG. 6B. The first headset-stationary Cartesian coordinate system may comprise a coordinate system origin at a first spatial position denoted as "p1" as shown in FIG. 6B. The first spatial position "p1" may be selected from spatial positions stationary to the first headset (600-1). In some embodiments, if there is a spatial location that is a point of symmetry on the first headset (600-1), such as a first IMU 620-1 (represented as a solid black circle) disposed with or included by the first headset (600-1), then such spatial location may be selected as the first position "p1" to serve as the coordinate origin to the first headset-stationary Cartesian coordinate system.

More than one headset may be used by more than one user in some operational scenarios. In these scenarios, a second headset-stationary Cartesian coordinate system stationary to a second headset 600-2 can likewise be used to represent spatial positions on the second headset (600-2). The second headset-stationary Cartesian coordinate system comprises three spatial dimensions represented by respective axes including an x2-axis and a z2-axis as shown in FIG. 6B, and a y2-axis orthogonal to both the x2 and z2 axes that is not depicted in FIG. 6B. The second headset-stationary Cartesian coordinate system may comprise a coordinate system origin at a second spatial position denoted as "p2" as shown in FIG. 6B. The second spatial position "p2" may be selected from spatial positions stationary to the second headset (600-2). In some embodiments, if there is a spatial location that is a point of symmetry on the second headset (600-2), such as a first IMU 620-1 (represented as a solid black circle) disposed with or included by the first headset (600-1), then such spatial location may be selected as the first position "p2" to serve as the coordinate origin to the second headset-stationary Cartesian coordinate system.

6. USING FACE MESH TO TRACK USER AND USER DEVICES

Figure 6C:
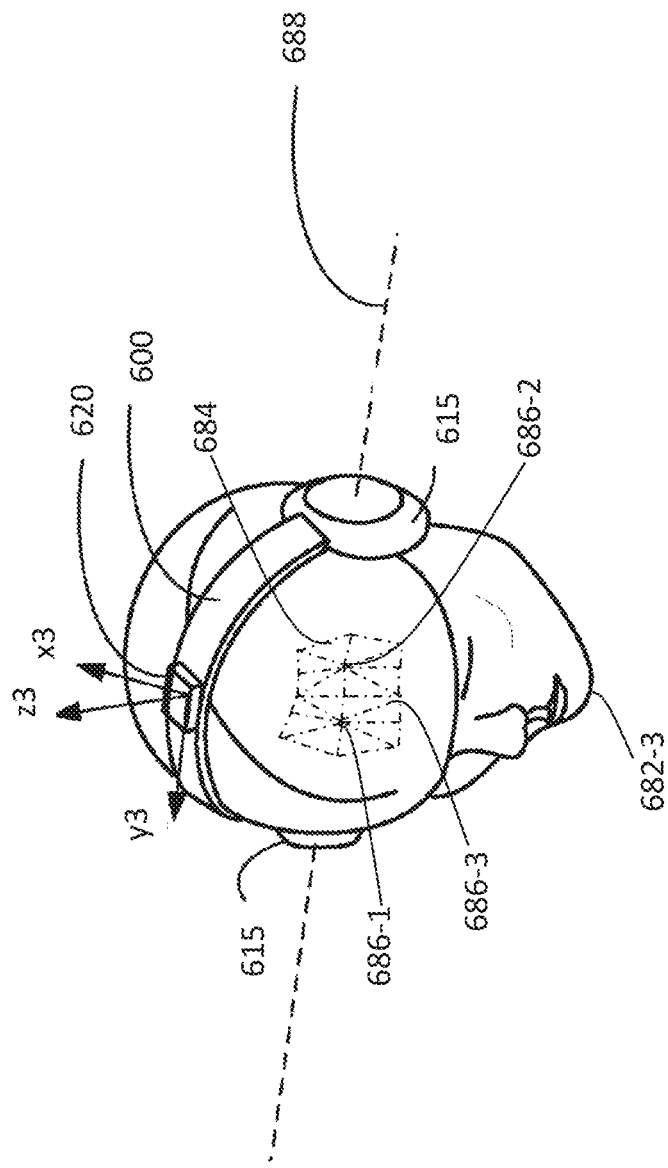
FIG. 6C illustrates an example user operating a headset.

FIG. 6C illustrates an example user (e.g., 682-3, etc.) operating a headset (e.g., 600, etc.) for the purpose of listening to rendered audio sounds in a media consumption session. Time synchronized video images corresponding to the rendered audio sounds may be rendered with an image display (e.g., 654 of FIG. 6B, etc.) external to the headset (600) and/or a device display of a wearable device (not shown) of the user (682-3).

In various operational scenarios, the headset (600) may or may not comprise spatial location or orientation sensors to estimate or determine (user device) spatial information such as spatial location and orientation of the headset (600) and/or of the user (682-3) or the user's head. For the purpose of illustration only, as illustrated in FIG. 6C, the headset (600) is equipped with an IMU (e.g., 620, etc.).

In some operational scenarios, IMU measurements generated by the IMU (620) can be used by the headset (600) to determine or derive accelerations or velocities. These accelerations or velocities can be integrated or summed by the headset (600) to generate or estimate (real time or near-real-time) spatial information such as positions, orientations, and/or positional or oriental displacements of the headset (600) and/or of the user (682-3) or the user's head.

As the spatial information is obtained through integration or summation, drift errors in individual IMU measurements over time can accumulate or add up to a relatively large extent in the spatial information after a relatively long time period (e.g., one minute, five minutes, ten minutes, etc.). In operational scenarios in which the headset (600) renders spatial audio such as sound scenes/images based on the spatial information derived from the IMU measurements, the spatial audio may present or depict sound/audio sources in rendered sound scenes/images that spatially deviate significantly from corresponding visual objects in the rendered video scenes/images.

In some operational scenarios, a media consumption system (e.g., 650 of FIG. 6B, etc.) as described herein may implement software and/or hardware (e.g., CPU, GPU, ASIC, FPGA, firmware, browser software package, mobile application package, AI, ML, neural network, etc.) based face detection and analysis procedures, processed, methods, algorithms and/or program logic in a tracking data analyzer (e.g., 660 of FIG. 6B, etc.) to detect and analyze (human) face(s) in tracking video images (e.g., an image or a sequence of time-consecutive images acquired by a camera sensor or camera, etc.) captured by a tracking sensor assembly (e.g., 666 of FIG. 6B, etc.) such as camera sensors, cameras, LIDAR sensors, range image sensors; to establish (e.g., 3D, etc.) face/head model(s) of corresponding user(s) for the detected/analyzed face(s); etc.

In some operational scenarios, the media consumption system (650) can overlay a face mesh—a portion of which is depicted in FIG. 6C as 684—over a detected face, for example, of the user (682-3). The face mesh may comprise a plurality of vertexes (e.g., 686-1, 686-2, 686-3, etc.) and logical (or virtual) lines connecting between neighboring vertexes.

For example, the tracking data analyzer (660) can apply image filtering to a tracking image to detect or identify a face as well as image features of the face such as eyes (e.g., 694-1 and/or 694-2 of FIG. 6D, etc.), an interpupil distance (e.g., 696 of FIG. 6D, etc.), nose, lips, ears, etc.

Additionally, optionally, the tracking data analyzer (660) can analyze image data to detect or identify any devices/accessories (e.g., one or more visible parts of eyewear, headset, headphones, etc.) on, in, or with the detected/identified face.

Based on the detected/identified face, image features and/or devices/accessories, the tracking data analyzer (660) can overlay a face mesh onto or with one or more image regions of the tracking image depicting the detected face, image features and/or devices/accessories. The overlaid face mesh may be enclosed within boundaries (e.g., contours, bounding boxes, etc.) of the detected face, image features and/or devices/accessories.

The face mesh may cover the entire or at least a substantial portion (e.g., 80%, 90%, etc.) detected/identified face. In some operational scenarios, some detected image features such as eyes, ears, etc., may be covered by one or more portions of the face mesh with denser vertexes than other image features covered by the same face mesh.

In some operational scenarios, the tracking data analyzer (660) can determine or identify locations (e.g., two dimensional coordinate values within the tracking image, etc.) of some or all of the vertexes (e.g., coinciding with or locating at or around detected image features, etc.) in the face mesh, for example without incurring an accumulation of drift errors in integrating sensor measurements over time; use the locations of the vertexes of the face mesh to deduce spatial information such as corresponding (e.g., 3D, etc.) coordinate values of the vertexes of the face mesh in a 3D coordinate system; determine, derive or generate an (e.g., predicted, approximated, estimated, etc.) 3D face/head model of the user's head from the coordinate values of the vertexes of the face mesh; etc. The 3D coordinate system may be one of: a display-stationary coordinate system (e.g., x and y of FIG. 6B, etc.), a headset-stationary coordinate system (e.g., x3, y3 and z3 of FIG. 6C, etc.), or another 3D coordinate system (e.g., a rendering environment coordinate system, an earth stationary coordinate system, etc.), etc.

As illustrated in FIG. 6C, the headset-stationary coordinate system may be a Cartesian coordinate system with three axes/dimensions (e.g., x3, y3 and z3, etc.); the axis y3 may be selected to be parallel to an axis 688 connecting left and right ears of the user (682-3) or two headphones 615.

Coordinate values of vertexes of a face mesh and/or a 3D face/head model of the user (682-3) generated free of accumulation of drift errors with one or more (e.g., consecutive, periodically polled, sequences of consecutive, etc.) tracking images can be used by the media consumption system (650) to generate or estimate (real time or near-real-time) spatial information such as positions, rotations and/or positional or oriental displacements of the headset (600) and/or of the user (682-3) or the user's head.

The positions, rotations and/or positional or oriental displacements of the headset (600) and/or of the user (682-3) or the user's head determined by the media consumption system (650) by way of the face mesh can be used by one, some or all of the media consumption system (650), the headset (600) or another wearable device of the user (682-3) for rendering (correct or corrected) spatial audio with relatively accurate sound fields/scenes/images in which audio/sound sources are depicted in relatively accurate positions and/or orientations in reference to the user's actual positions and/orientations.

Additionally, optionally or alternatively, the positions, orientations, and/or positional or oriental displacements of the headset (600) and/or of the user (682) or the user's head determined by the media consumption system (650) by way of the face mesh can be used by one, some or all of the media consumption system (650) and the headset (600) and/or another wearable device (e.g., 690 of FIG. 6D, etc.) to reset or reorient spatial sensors disposed with user device(s) such as the headset (600), the wearable device (690), etc., or to correct measurements such as IMU measurements generated by the spatial sensors on the user device(s).

For example, the positions, orientations, and/or positional or oriental displacements of the headset (600) and/or of the user (682) or the user's head determined by the media consumption system (650) by way of the face mesh can be used to establish a corrected (initial or reset) position/orientation going forward for integrating new or further IMU measurements, instead of reusing an accumulatively determined position/orientation from the past measurements with a relatively significant accumulation of drift errors. This correction, initialization or resetting of the position/orientation for integrating new or further IMU measurements can be performed from time to time such as periodically to prevent a relatively large accumulation of drift errors.

Referring back to FIG. 6B, when the headset (e.g., 600 of FIG. 6C. 6D, 600-1, 600-2, etc.) is in operation, the external sensors (e.g., cameras or camera sensors, etc.) generate tracking sensor/image data such as one or more tracking images containing the faces of the users (e.g., 682-3 of FIG. 6C, 682-1, 682-2, etc.) in the media rendering environment (656). For example, the tracking sensor/image data may be taken at a time resolution of a millisecond or a fraction of millisecond, at a time resolution of every hundredth second, at a time resolution of every tenth second, every second, etc.

The media consumption system (650) can detect and analyze the faces in the tracking sensor/image data; overlay the faces with respective face meshes; determine locations of vertexes of the respective face meshes; use the locations of vertexes of the respective face meshes to predict, derive and/or generate (e.g., 3D, etc.) coordinates values of the vertexes in each of the face meshes in a device-specific Cartesian coordinate system and/or in a display-stationary Cartesian coordinate system; use the coordinates values of the vertexes in each of the face meshes to determine spatial positions and/or spatial orientations of the headset (e.g., 600 of FIG. 6C, 600-1, 600-2, etc.) in real time or in near real time; etc.

In some operational scenarios, the media consumption system (650) repeatedly (e.g., in real time, in near real time, within a strict timing budget, every 1 millisecond, every 2 milliseconds, etc.) tracks or determines spatial coordinates of some or all vertexes of a respective face mesh for each of the users (e.g., 682 of FIG. 6C, 682-1, 682-2, etc.) at a given time point in the display-stationary Cartesian coordinate system based on the tracking sensor/image data captured at the given time point by the external sensors and collected by the tracking data receiver (662) over the data communication links (670).

The foregoing operations can be applied to determining spatial coordinates of spatial locations (e.g., "p1", "p2", etc.) of a headset (e.g., 600 of FIG. 6C, 600-1, 600-2, etc.) of a user (e.g., 682-3 of FIG. 6C, 682-1, 682-2, etc.) and/or of the head of the user (e.g., 682-3 of FIG. 6C, 682-1, 682-2, etc.) at any given time. These spatial coordinates over time constitute a spatial trajectory of the headset (e.g., 600 of FIG. 6C, 600-1, 600-2, etc.) or the head of the user (e.g., 682-3 of FIG. 6C, 682-1, 682-2, etc.). The spatial trajectory may be represented as one or more functions of time. Any combination of one or more motion characteristics of a headset (e.g., 600 of FIG. 6C, 600-1, 600-2, etc.) and/or of the head of a user (e.g., 682-3 of FIG. 6C, 682-1, 682-2, etc.) may be (e.g., further, optionally, etc.) determined from these functions of time representing the spatial trajectory of the headset (e.g., 600 of FIG. 6C, 600-1, 600-2, etc.) and/or of the head of the user (e.g., 682-3 of FIG. 6C, 682-1, 682-2, etc.).

For example, linear positions/displacements (over time) of the headset (e.g., 600 of FIG. 6C, 600-1, 600-2, etc.) and/or of the head of the user (e.g., 682-3 of FIG. 6C, 682-1, 682-2, etc.) in relation to a reference point stationary to the image display (654)—such as the origin "p" of the display-stationary Cartesian coordinate system—may be determined or derived (e.g., as a vector difference, etc.) from the spatial trajectory (represented by the functions of time as previously mentioned) of the headset (e.g., 600 of FIG. 6C, 600-1, 600-2, etc.) or of the user (e.g., 682-3 of FIG. 6C, 682-1, 682-2, etc.). Additionally, optionally or alternatively, linear velocities, speeds, accelerations, etc., (over time) of the headset (e.g., 600 of FIG. 6C, 600-1, 600-2, etc.) and/or of the head of the user (e.g., 682-3 of FIG. 6C, 682-1, 682-2, etc.) in relation to the reference point may be determined or derived (e.g., as a first-order derivative, as a second-order derivative, etc.) from the spatial trajectory of the headset (e.g., 600 of FIG. 6C, 600-1, 600-2, etc.) and/or of the head of the user (e.g., 682-3 of FIG. 6C, 682-1, 682-2, etc.).

Similarly, angular positions/displacements (e.g., over time, at any given time, etc.) of the headset (e.g., 600 of FIG. 6C, 600-1, 600-2, etc.) and/or of the head of the user (e.g., 682-3 of FIG. 6C, 682-1, 682-2, etc.) in relation to a reference rigid geometric structure stationary to the image display (654)—such as the display-stationary Cartesian coordinate system—may be determined or derived from the spatial locations of the headset (e.g., 600 of FIG. 6C, 600-1, 600-2, etc.) and/or of the head of the user (e.g., 682-3 of FIG. 6C, 682-1, 682-2, etc.).

For example, the spatial coordinates of the rigid geometric structure of the headset (e.g., 600 of FIG. 6C, 600-1, 600-2, etc.) and/or of the head of the user (e.g., 682-3 of FIG. 6C, 682-1, 682-2, etc.) may be used to deduce or derive the angular positions/displacements (over time) of the headset (e.g., 600 of FIG. 6C, 600-1, 600-2, etc.) and/or of the head of the user (e.g., 682-3 of FIG. 6C, 682-1, 682-2, etc.) in relation to the display-stationary Cartesian coordinate system. The first headset-stationary Cartesian coordinate system of the first headset (600-1) may have a deterministic spatial relationship with the geometric structure of the headset (600-1) and/or of the head of the user (e.g., 682-3 of FIG. 6C, 682-1, 682-2, etc.).

This deterministic spatial relation between the first headset-stationary Cartesian coordinate system of the first headset (600-1)—and/or of the head of the user (e.g., 682-3 of FIG. 6C, 682-1, 682-2, etc.)—and the geometric structure of the headset (600-1) and/or of the head of the user (e.g., 682-3 of FIG. 6C, 682-1, 682-2, etc.) may be used to deduce angular displacements (e.g., pitch, yaw, roll, etc.) of the first headset-stationary Cartesian coordinate system of the first headset (600-1) and/or of the head of the user (e.g., 682-3 of FIG. 6C, 682-1, 682-2, etc.), at the given time point in relation to the display-stationary Cartesian coordinate system, once spatial coordinates, of the two, three, four or more light sources on the first headset (600-1) and/or of the head of the user (e.g., 682-3 of FIG. 6C, 682-1, 682-2, etc.), at the given time point in the display-stationary Cartesian coordinate system, are determined (thereby determining the orientation of the geometric structure in relation to the display-stationary Cartesian coordinate system).

Additionally, optionally or alternatively, linear or angular velocities, speeds, accelerations, etc., (over time) of the headset (e.g., 600 of FIG. 6C, 600-1, 600-2, etc.) and/or of the head of the user (e.g., 682-3 of FIG. 6C, 682-1, 682-2, etc.) in relation to the reference point stationary to the image display (654) or in relation to the display-stationary Cartesian coordinate system may be determined or derived (e.g., as a first-order derivative, as a second-order derivative, etc.) from the linear or angular positions/displacements (e.g., p1, p2, etc.) of the headset (e.g., 600 of FIG. 6C, 600-1, 600-2, etc.) and/or of the head of the user (e.g., 682-3 of FIG. 6C, 682-1, 682-2, etc.).

In some operational scenarios, the media consumption system (650) (e.g., at the beginning of a media consumption session, based at least in part on tracking histories saved from a previous media consumption session, based at least in part on user face recognition and/or user device recognition, repeatedly, triggered by device discovery events, in real time, in near real time, within a strict timing budget, every few milliseconds, every second, every few seconds, etc.) tracks or determines device ID information of each of the headsets (e.g., 600 of FIG. 6C, 600-1, 600-2, etc.) based on tracking sensor/image data such as one or more tracking images captured by the media consumption system.

For example, the tracking images may contain partial or complete device image portions with unique or distinct device-specific shapes, textures, colors, textual information, model numbers or letterings on the devices relating to the headsets (e.g., 600 of FIG. 6C, 600-1, 600-2, etc.).

The media consumption system (650)—or an audio device tracker (e.g., 664, etc.) and/or an audio rendering controller (e.g., 658, etc.) therein—can generate or determine the device ID information of the headset (e.g., 600 of FIG. 6C, 600-1, 600-2, etc.) based at least in part on unique or distinct device-specific shapes, textures, colors, textual information, model numbers or letterings on the devices relating to the headsets (e.g., 600 of FIG. 6C, 600-1, 600-2, etc.). Additionally, optionally or alternatively, at least a portion of the device ID information may be derived or completed based on user input and/or (e.g., automatic, etc.) device discovery operations and/or (e.g., automatic, etc.) device configuration/provisioning operations. Examples of device ID information of the headset (e.g., 600 of FIG. 6C, 600-1, 600-2, etc.) and/or another wearable device (e.g., 690 of FIG. 6D, etc.) of the user (e.g., 682-3 of FIG. 6C, 682-1, 682-2, etc.) may include, but are not necessarily limited to only, a computer network address, a MAC address, an IP address, a unique device code, vendor identification information, model number, manufacturing information, etc., of the headset (e.g., 600 of FIG. 6C, 600-1, 600-2, etc.), other device-specific information, non-device-specific information, etc.

7. USING LIGHT SOURCES TO TRACK USER AND USER DEVICES

Figure 6D:
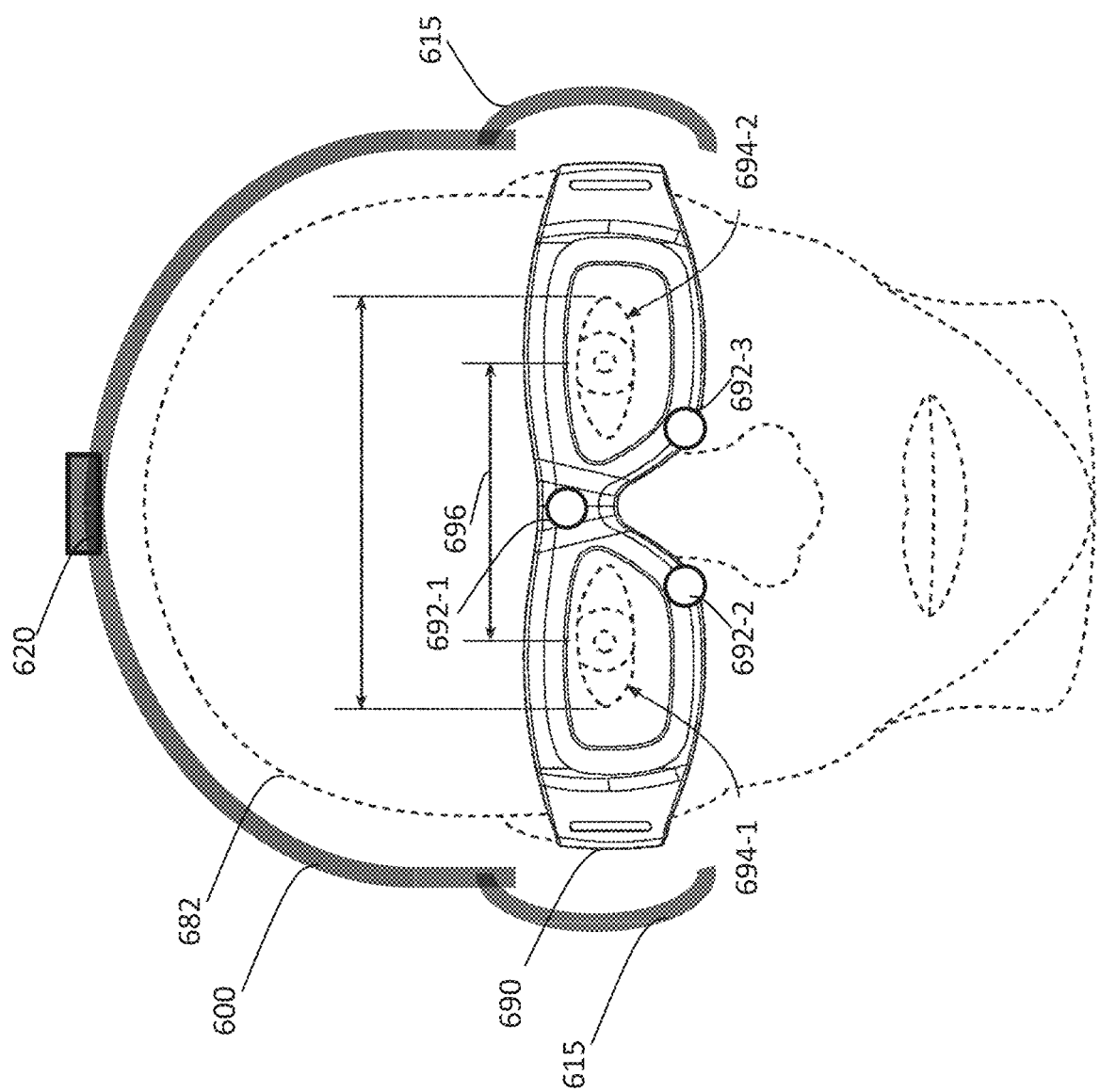
FIG. 6D illustrates an example user operating a headset and another wearable device.

FIG. 6D illustrates an example user (e.g., 682, etc.) operating a headset (e.g., 600, etc.) and another wearable device 690 for the purpose of viewing rendered video images, listening to (corresponding) rendered audio sounds in a media consumption session. The video images—which can be time synchronized with the rendered audio sounds—may be rendered with or on an image display (e.g., 654 of FIG. 6B, etc.) external to the headset (600) and the wearable device (690) and/or a device display that is a part of the wearable device (690).

In various operational scenarios, none, one or both of the headset (600) and the wearable device (690) may comprise spatial location or orientation sensors to estimate or determine (user device) spatial information such as spatial location and orientation of the headset (600) and/or of the wearable device (690) and/or of the user (682) or the user's head.

For the purpose of illustration only, as illustrated in FIG. 6D, the headset (600) is equipped with an IMU (e.g., 620, etc.). It should be noted that a user device (e.g., 690, etc.) operated by the user (682)—in addition to or in place of the headset (600)—can additionally, alternatively, or optionally include spatial location or orientation sensors to estimate or determine (user device) spatial information.

In some operational scenarios, IMU measurements generated by the IMU (620) can be used by the headset (600) to determine or derive accelerations or velocities. These accelerations or velocities can be integrated or summed by the headset (600) to generate or estimate (real time or near-real-time) spatial information such as positions, orientations, and/or positional or oriental displacements of the headset (600) and/or of the wearable device (690) and/or of the user (682) or the user's head.

As the spatial information is obtained through integration or summation, drift errors in individual IMU measurements over time can accumulate or add up to a relatively large extent in the spatial information after a relatively long time period (e.g., one minute, five minutes, ten minutes, etc.). In operational scenarios in which the headset (600) and/or of the wearable device (690) renders spatial audio based on the spatial information derived from the IMU measurements, the spatial audio may present or depict sound/audio sources in rendered sound scenes/images that deviate significantly from corresponding visual objects in rendered video scenes/images.

In various operational scenarios, none, one or both of the headset (600) and the wearable device (690) may comprise, or may be disposed with, one or more light sources removably or irremovably installed on, or otherwise attached to, designated spatial positions on one or more rigid parts of the headset (600) and/or the wearable device (690). These light sources can be tracked by a media consumption system (e.g., 650, etc.) as described herein to determine or derive spatial information of the light sources such as positions or orientations of the light sources, for example without incurring an accumulation of drift errors in integrating sensor measurements over time. These positions or orientations of the light sources that are free of accumulation of drift errors can be used by the media consumption system (650) to generate or estimate (real time or near-real-time) spatial information such as positions, orientations, and/or positional or oriental displacements of the headset (600) and/or of the wearable device (690) and/or of the user (682) or the user's head.

The positions, orientations, and/or positional or oriental displacements of the headset (600) and/or of the wearable device (690) and/or of the user (682) or the user's head determined by the media consumption system (650) by way of the light sources can be used by one, some or all of the media consumption system (650) and the headset (600) and/or the wearable device (690) for rendering (correct or corrected) spatial audio with relatively accurate sound fields/scenes/images in which audio/sound sources are depicted in relatively accurate positions and/or orientations in reference to the user's actual positions and/orientations.

Additionally, optionally or alternatively, the positions, orientations, and/or positional or oriental displacements of the headset (600) and/or of the wearable device (690) and/or of the user (682) or the user's head determined by the media consumption system (650) by way of the light sources can be used by one, some or all of the media consumption system (650) and the headset (600) and/or the wearable device (690) to reset or reorient spatial sensors disposed with user device(s) such as the headset (600), the wearable device (690), etc., or to correct measurements such as IMU measurements generated by the spatial sensors on the user device(s).

For example, the positions, orientations, and/or positional or oriental displacements of the headset (600) and/or of the wearable device (690) and/or of the user (682) or the user's head determined by the media consumption system (650) by way of the light sources can be used to establish a corrected (initial or reset) position/orientation going forward for integrating new or further IMU measurements, instead of reusing an accumulatively determined position/orientation from the past measurements with a relatively significant accumulation of drift errors. This correction, initialization or resetting of the position/orientation for integrating new or further IMU measurements can be performed from time to time such as periodically to prevent a relatively large accumulation of drift errors.

For the purpose of illustration only, as illustrated in FIG. 6D, the wearable device (690) is attached, equipped or disposed with one or more light sources (e.g., 692-1, 692-2, 692-3, etc.). The light sources (e.g., 692-1, 692-2, 692-3, etc.) can be tracked by the media consumption system (650) to determine or derive (real time or near-real-time) positions, orientations, and/or positional or oriental displacements of the wearable device (690), etc. The positional or orientational displacements of the wearable device (690) can be deemed as, or used as a proxy of, the user's (real time or near-real-time) positions and orientations and/or of the headset (600).

Some or all of the one or more light sources on the headset (600) may represent, or may be deemed as, point light sources. A point light source may refer to a light source that emits or reflects/redirects light rays from a relatively defined spatial point or from within a spatial area size whose diameter is much smaller (e.g., less than 10%, less than 5%, etc.) than an interaural distance between left and right ears of a user of the headset (600). For a non-point light source that may have a spatial size comparable (e.g., more than 20%, more than 10%, etc.) to the interaural distance, a specific point such as a center point on the light source may be selected or used to represent the spatial location of the light source.

Referring back to FIG. 6B, when the headset (e.g., 600 of FIG. 6A or FIG. 6D, 600-1, 600-2, etc.) is in operation, the light sources (e.g., 692-1, 692-2, 692-3 of FIG. 6D, etc.) may be stationary to the headset (e.g., 600 of FIG. 6A or FIG. 6D, 600-1, 600-2, etc.) and located at respective designated spatial positions on the headset (e.g., 600 of FIG. 6A or FIG. 6D, 600-1, 600-2, etc.). These designated spatial positions of the headset (e.g., 600 of FIG. 6A or FIG. 6D, 600-1, 600-2, etc.) may be represented with spatial coordinate values in a headset-stationary Cartesian coordinate system stationary to the headset (e.g., 600 of FIG. 6A or FIG. 6D, 600-1, 600-2, etc.). The coordinate values of the designated spatial positions of the light sources (e.g., 692-1, 692-2, 692-3 of FIG. 6D, etc.) on the headset (e.g., 600 of FIG. 6A or FIG. 6D, 600-1, 600-2, etc.) may be stored as a part of device configuration information for the headset (e.g., 600 of FIG. 6A or FIG. 6D, 600-1, 600-2, etc.) and made accessible to the media consumption system (650).

The media consumption system (650) can use the coordinates values (e.g., static values, etc.) of the designated spatial positions of the light sources (e.g., 692-1, 692-2, 692-3 of FIG. 6D, etc.) in the device-specific Cartesian coordinate system in combination with coordinate values (e.g., dynamic values, acquired in real time or in near real time, etc.) of the designated spatial positions of the light sources in the display-stationary Cartesian coordinate system to determine spatial positions and/or spatial orientations of the headset (e.g., 600 of FIG. 6A or FIG. 6D, 600-1, 600-2, etc.) in real time or in near real time.

The light sources (e.g., 692-1, 692-2, 692-3 of FIG. 6D, etc.) on the headset (e.g., 600 of FIG. 6A or FIG. 6D, 600-1, 600-2, etc.) may emit or reflect off light rays such as light rays of visible light wavelengths, light rays of invisible light wavelengths, infrared lights, etc. Examples of light sources may include, but are not necessarily limited to only, any of: light emitters, light emitting diodes (LEDs), non-LED lights, light regenerators, light reflectors, light scattering devices, retroreflectors, etc. By way of example but not limitation, light sources on the headset (e.g., 600 of FIG. 6A or FIG. 6D, 600-1, 600-2, etc.) emit or reflect off invisible light such as infrared light, etc., for tracking purposes.

In some operational scenarios, the external sensors (e.g., cameras or camera sensors, etc.) generate tracking sensor data generated by sensor-captured light rays from light sources (e.g., 692-1, 692-2, 692-3 of FIG. 6D, etc.) placed on each headset in the one or more headsets (e.g., 600 of FIG. 6A or FIG. 6D, 600-1, 600-2, etc.) in the media rendering environment (656). These light rays may be emitted, reflected, redirected, and/or scattered by the light sources on the headsets (e.g., 600 of FIG. 6A or FIG. 6D, 600-1, 600-2, etc.) toward the external sensor assembly (666). These light rays may be captured continuously, at a set time schedule, etc. For example, the tracking sensor data may be taken at a time resolution of a millisecond or a fraction of millisecond, at a time resolution of every hundredth second, at a time resolution of every tenth second, every second, etc.

In some operational scenarios, the media consumption system (650) repeatedly (e.g., in real time, in near real time, within a strict timing budget, every 1 millisecond, every 2 milliseconds, etc.) tracks or determines one or more spatial coordinates of one or more light sources (e.g., 692-1, 692-2, 692-3 of FIG. 6D, etc.) on each of the headsets (e.g., 600 of FIG. 6A or FIG. 6D, 600-1, 600-2, etc.) at a given time point in the display-stationary Cartesian coordinate system based on tracking sensor data captured at the given time point by the external sensors from light rays from the light sources (e.g., 692-1, 692-2, 692-3 of FIG. 6D, etc.) of the headsets (e.g., 600 of FIG. 6A or FIG. 6D, 600-1, 600-2, etc.).

For example, the tracking data receiver (662) can collect the tracking sensor data captured at the given time point by the external sensors over the data communication links (670). The tracking data analyzer (660) can track or determine one or more specific spatial coordinates of each light source of the light sources (e.g., 692-1, 692-2, 692-3 of FIG. 6D, etc.) on the headset (e.g., 600 of FIG. 6A or FIG. 6D, 600-1, 600-2, etc.) at the given time point in the display-stationary Cartesian coordinate system based on specific image portions generated with light rays from such each light source in tracking sensor data.

The spatial coordinates, of the light sources (e.g., 692-1, 692-2, 692-3 of FIG. 6D, etc.) on the headset (e.g., 600 of FIG. 6A or FIG. 6D, 600-1, 600-2, etc.), at the given time point in the display-stationary Cartesian coordinate system, may be used to derive spatial coordinates, at the given time point in the display-stationary Cartesian coordinate system, of any given spatial location that is stationary to the headset (e.g., 600 of FIG. 6A or FIG. 6D, 600-1, 600-2, etc.) or the head of the user (e.g., 682 of FIG. 6D, 682-1, 682-1, etc.).

In an example, a first light source (e.g., 692-1 of FIG. 6D, etc.) on a first headset (600-1) may be located at the first coordinate origin "p1" (e.g., coinciding with the IMU (620-1), not coinciding with the INIU (620-1), etc.) in the first headset-stationary Cartesian coordinate system; the first coordinate origin "p1" may be used to represent the spatial location of the first headset (600-1) or the IMU (620-1) or the head of the user (682-1). Thus, spatial coordinates of the spatial location of the first headset (600-1), or the first coordinate origin "p1", at the given time point in the display-stationary Cartesian coordinate system, are derived as soon as spatial coordinates of the first light source on the first headset (600-1), at the given time point in the display-stationary Cartesian coordinate system, are derived.

In another example, two, three, four or more light sources (e.g., 692-1, 692-2, 692-3 of FIG. 6D, etc.) may be installed on or otherwise attached to the first headset (600-1) or another wearable device (e.g., 690, etc.) of the user (682-1) (e.g., AR device, VR device, etc.). Designated spatial locations of these light sources (e.g., 692-1, 692-2, 692-3 of FIG. 6D, etc.) on the first headset (600-1) may form an imaginary rigid geometric structure (e.g., a line, a triangle, a tetrahedron, etc.) stationary to the first headset (600-1) or the head of the user (682-1). A representative spatial location such as "p1" of the first headset (600-1) may have a deterministic spatial relationship with the geometric structure formed by the designated spatial locations of the light sources (e.g., 692-1, 692-2, 692-3 of FIG. 6D, etc.) on the headset (600-1) and/or of the wearable device (690) of the user (682-1).

This deterministic spatial relation between the representative spatial location "p1" of the first headset (600-1) and the geometric structure formed by the designated spatial locations of the light sources (e.g., 692-1, 692-2, 692-3 of FIG. 6D, etc.) on the headset (600-1) and/or of the wearable device (690) of the user (682-1) may be used to deduce spatial coordinates of the representative spatial location "p1" of the first headset (600-1) and/or of the wearable device (690) of the user (682-1), at the given time point in the display-stationary Cartesian coordinate system, once spatial coordinates, of the two, three, four or more light sources on the first headset (600-1) and/or of the wearable device (690) of the user (682-1), at the given time point in the display-stationary Cartesian coordinate system, are determined.

The foregoing operations applied to determining the spatial coordinates of spatial locations such as "p1" of the first headset (600-1) and/or of the wearable device (690) of the user (682-1) and/or of the head of the user (682-1) at any given time point in the display-stationary Cartesian coordinate system can also be applied to determining spatial coordinates of spatial locations of any other headset (e.g., 600-2, etc.) of another user (e.g., 682-2, etc.) and/or of another wearable device (e.g., 690, etc.) of the other user (e.g., 682-2, etc.) and/or of the head of the other user (e.g., 682-2, etc.) at any given time point in the display-stationary Cartesian coordinate system.

Additionally, optionally or alternatively, spatial coordinates of spatial locations (e.g., "p1", "p2", etc.) of a headset (e.g., 600 of FIG. 6A or FIG. 6D, 600-1, 600-2, etc.) of a user (e.g., 682-1, 682-2, etc.) and/or of another wearable device (e.g., 690, etc.) of the user (e.g., 682-1, 682-2, etc.) and/or of the head of the user (e.g., 682 of FIG. 6D, 682-1, 682-2, etc.) over time constituting a spatial trajectory of the headset (e.g., 600 of FIG. 6A or FIG. 6D, 600-1, 600-2, etc.) or the head of the user (e.g., 682 of FIG. 6D, 682-1, 682-2, etc.) can be determined using tracking techniques as described herein, and may be represented as one or more functions of time. Any combination of one or more motion characteristics of a headset (e.g., 600 of FIG. 6A or FIG. 6D, 600-1, 600-2, etc.) and/or of another wearable device (e.g., 690, etc.) and/or of the head of a user (e.g., 682 of FIG. 6D, 682-1, 682-2, etc.) may be (e.g., further, optionally, etc.) determined from these functions of time representing the spatial trajectory of the headset (e.g., 600 of FIG. 6A or FIG. 6D, 600-1, 600-2, etc.) and/or of the wearable device (e.g., 690, etc.) of the user (e.g., 682 of FIG. 6D, 682-1, 682-2, etc.) and/or of the head of the user (e.g., 682 of FIG. 6D, 682-1, 682-2, etc.).

For example, linear positions/displacements (over time) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) in relation to a reference point stationary to the image display (654)—such as the origin "p" of the display-stationary Cartesian coordinate system—may be determined or derived (e.g., as a vector difference, etc.) from the spatial trajectory (represented by the functions of time as previously mentioned) of the headset (e.g., 600 of FIG. 6A or FIG. 6D, 600-1, 600-2, etc.) or of the user (e.g., 682 of FIG. 6D, 682-1, 682-2, etc.). Additionally, optionally or alternatively, linear velocities, speeds, accelerations, etc., (over time) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) in relation to the reference point may be determined or derived (e.g., as a first-order derivative, as a second-order derivative, etc.) from the spatial trajectory of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.).

Similarly, angular positions/displacements (e.g., over time, at any given time, etc.) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) in relation to a reference rigid geometric structure stationary to the image display (654)—such as the display-stationary Cartesian coordinate system—may be determined or derived from the spatial locations of the light sources of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.).

For example, the spatial coordinates of the rigid geometric structure as defined by the designated spatial locations of the light sources on the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) may be used to deduce or derive the angular positions/displacements (over time) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) in relation to the display-stationary Cartesian coordinate system. The first headset-stationary Cartesian coordinate system of the first headset (600-1) may have a deterministic spatial relationship with the geometric structure formed by the designated spatial locations of the light sources on the headset (600-1) and/or of the wearable device (690) of the user (e.g., 682 of FIG. 6D, 682-1, 682-2, etc.) and/or of the head of the user (e.g., 682 of FIG. 6D, 682-1, 682-2, etc.).

This deterministic spatial relation between the first headset-stationary Cartesian coordinate system of the first headset (600-1)—and/or of the wearable device (690) of the user (e.g., 682 of FIG. 6D, 682-1, 682-2, etc.) and/or of the head of the user (e.g., 682 of FIG. 6D, 682-1, 682-2, etc.)—and the geometric structure formed by the designated spatial locations of the light sources on the headset (600-1) and/or of the wearable device (690) of the user (e.g., 682 of FIG. 6D, 682-1, 682-2, etc.) and/or of the head of the user (e.g., 682 of FIG. 6D, 682-1, 682-2, etc.) may be used to deduce angular displacements (e.g., pitch, yaw, roll, etc.) of the first headset-stationary Cartesian coordinate system of the first headset (600-1) and/or of the wearable device (690) of the user (e.g., 682 of FIG. 6D, 682-1, 682-2, etc.) and/or of the head of the user (e.g., 682 of FIG. 6D, 682-1, 682-2, etc.), at the given time point in relation to the display-stationary Cartesian coordinate system, once spatial coordinates, of the two, three, four or more light sources on the first headset (600-1) and/or of the wearable device (690) of the user (e.g., 682 of FIG. 6D, 682-1, 682-2, etc.) and/or of the head of the user (e.g., 682 of FIG. 6D, 682-1, 682-2, etc.), at the given time point in the display-stationary Cartesian coordinate system, are determined (thereby determining the orientation of the geometric structure in relation to the display-stationary Cartesian coordinate system).

Additionally, optionally or alternatively, linear or angular velocities, speeds, accelerations, etc., (over time) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.) in relation to the reference point stationary to the image display (654) or in relation to the display-stationary Cartesian coordinate system may be determined or derived (e.g., as a first-order derivative, as a second-order derivative, etc.) from the linear or angular positions/displacements (e.g., p1, p2, etc.) of the headset (e.g., 600 of FIG. 6A or FIG. 6D, 600-1, 600-2, etc.) and/or of the wearable device (690) of the user (e.g., 682 of FIG. 6D, 682-1, 682-2, etc.) and/or of the head of the user (e.g., 682 of FIG. 6D, 682-1, 682-2, etc.).

In some operational scenarios, the media consumption system (650) (e.g., at the beginning of a media consumption session, based at least in part on tracking histories saved from a previous media consumption session, based at least in part on user face recognition and/or user device recognition, repeatedly, triggered by device discovery events, in real time, in near real time, within a strict timing budget, every few milliseconds, every second, every few seconds, etc.) tracks or determines device ID information of each of the headsets (e.g., 600 of FIG. 6A or FIG. 6D, 600-1, 600-2, etc.) and/or of the wearable devices (e.g., 690 of FIG. 6D, etc.) based on one or more device ID signals captured by the media consumption system over the one or more second data communication links (668) from the headsets (e.g., 600 of FIG. 6A or FIG. 6D, 600-1, 600-2, etc.).

For example, the one or more device ID signals may be digitally encoded with device ID information of the headsets (e.g., 600 of FIG. 6A or FIG. 6D, 600-1, 600-2, etc.) and/or of the wearable devices (e.g., 690 of FIG. 6D, etc.) and transmitted by the headsets and/or the wearable devices (e.g., 690 of FIG. 6D, etc.) to the media consumption system (650) over the one or more second data communication links (668).

In some operational scenarios, a light source may be disposed with a headset (e.g., 600 of FIG. 6A or FIG. 6D, 600-1, 600-2, etc.) or another wearable device (e.g., 690, etc.) of a user (e.g., 682 of FIG. 6D, 682-1, 682-2, etc.) may be a light emitter (instead of a light reflector). Light ray emission by the light emitter may be specifically modulated such that light rays emitted by the light emitters not only provide device location information but also carry or represent a device ID signal digitally encoded with the device ID information of the headset (e.g., 600 of FIG. 6A or FIG. 6D, 600-1, 600-2, etc.) and/or the wearable device (690) of the user (e.g., 682 of FIG. 6D, 682-1, 682-2, etc.).

Sensor data can be captured by the one or more second data communication links (668) in response to the light rays emitted by the light emitters and sent to the media consumption system (650) or an audio device tracker (e.g., 664, etc.) therein over one or more (internal or external) data communication links (e.g., 670, etc.). The audio device tracker (664) can generate or retrieve the device ID signal from the sensor data. The audio device tracker (664) or an audio rendering controller (e.g., 658, etc.) operating with the audio device tracker (664) can further track or determine the device ID information of the headset (e.g., 600 of FIG. 6A or FIG. 6D, 600-1, 600-2, etc.) and/or the wearable device (690) of the user (e.g., 682 of FIG. 6D, 682-1, 682-2, etc.) by decoding the modulated/coded device ID signal. Examples of device ID information of the headset (e.g., 600 of FIG. 6A or FIG. 6D, 600-1, 600-2, etc.) and/or the wearable device (690) of the user (e.g., 682 of FIG. 6D, 682-1, 682-2, etc.) may include, but are not necessarily limited to only, a computer network address, a MAC address, an IP address, a unique device code, vendor identification information, model number, manufacturing information, etc., of the headset (e.g., 600 of FIG. 6A or FIG. 6D, 600-1, 600-2, etc.), other device-specific information, non-device-specific information, etc.

It has been described that spatial positions and spatial orientations of a headset (e.g., 600 of FIG. 6A or FIG. 6D, 600-1, 600-2, etc.) and/or another wearable device (e.g., 690, etc.) of a user (e.g., 682 of FIG. 6D, 682-1, 682-2, etc.) in a media rendering environment (e.g., 656, etc.) can be monitored by a media consumption system (e.g., 650, etc.) operating in conjunction with an external sensor assembly (e.g., 666, cameras, optical communication transceivers, etc.). It should be noted that this is for illustration only. In other embodiments, spatial positions and spatial orientations of other types of devices in a media rendering environment (e.g., 656, etc.) can be monitored by a media consumption system (e.g., 650, etc.) operating in conjunction with an external sensor assembly (e.g., 666, etc.). For example, spatial positions and spatial orientations of objects such as mobile phones, tablet computers, non-headphone audio speakers, cars, vehicles, ships, airplanes, unmanned aerial vehicles, stationary physical objects, etc., in a media rendering environment (e.g., 656, etc.) can be monitored by a media consumption system (e.g., 650, etc.) operating in conjunction with an external sensor assembly (e.g., 666, etc.).

It has been described that device ID signals can be light-based signals digitally encoded in light rays emitted or reflected off from light sources of a headset or a wearable device. It should be noted that this is for illustration only. In other embodiments, device ID signals may be received from a headset or a wearable device in other types of signals transmitted by the headset. For example, a headset or a wearable device may send or transmit device ID signals as described herein in the form of any combination of one or more of: light signals, RF signals, Wi-Fi signals, acoustic signals, etc.

It has been described that device ID signals can be sent or transmitted from a headset or a wearable device. It should be noted that this is for illustration only. In other embodiments, device ID signals may be received from a device operating in conjunction with a headset or a wearable device on behalf of the headset and/or the wearable device. In an example, a device fixed at a seat in which a user of a headset or a wearable device sits may send or transmit device ID signals as described herein on behalf of the headset and/or the wearable device. In another example, a device (e.g., a mobile device, etc.) carried with a user of a headset and/or a wearable device may send or transmit device ID signals as described herein on behalf of the headset and/or the wearable device.

A media consumption system (e.g., 650, etc.) as described herein can operate in conjunction with a single external sensor assembly deployed in a media rendering environment (e.g., 656, etc.), or multiple tracking sensor assemblies deployed in different spatial locations in a media rendering environment (e.g., 656, etc.), to efficiently monitor spatial positions and spatial orientations of a single headset, a single wearable device or a multitude of headsets and/or wearable devices in the media rendering environment (656). Additionally, optionally or alternatively, a media consumption system (e.g., 650, etc.) as described herein can operate in conjunction with multiple tracking sensor assemblies deployed in multiple media rendering environments (e.g., 656, etc.) to efficiently monitor spatial positions and spatial orientations of multiple headsets and/or multiple wearable devices in the multiple media rendering environments (e.g., 656, etc.). Thus, a media consumption system (e.g., 650, etc.) as described herein may be scaled to a large capacity to concurrently track or monitor spatial positions and/or spatial orientations of numerous devices in a large media rendering environment. Tracking techniques as described herein can be implemented with a system among a wide variety of systems, including but not limited to VR systems, AR systems, remote presence systems, game systems, cinema 3D systems, omnidirectional video systems, etc. to monitor spatial positions and spatial orientations of a single device or a multitude of devices in one or more media rendering environments (e.g., 656, etc.).

8. HRTF AND USER PREFERENCE FOR RENDERING SPATIAL AUDIO

In some operational scenarios, a media consumption system may operate with headphone audio speakers and/or non-headphone audio speakers in a media rendering environment to render (user-specific) spatial audio to a user, who may be a single user or any of multiple users located in the media rendering environment. The spatial audio may depict 2D or 3D sound scenes/images in which audio/sound sources are depicted as locating at specific positions and/or specific orientations, for example coinciding with specific positions and/or specific orientations of corresponding visual elements/objects (or visual elements/objects corresponding to the audio/sound sources) in video scenes/images/depicted by time synchronized video images rendered on one or more image displays of the media consumption system.

For the purpose of providing a relatively immersive media consumption experience, when the user makes body or head motions to change the user's positions and orientations, visual elements/objects as rendered in the video scenes/images as perceived by the user can change according to (or in response to) the user's changed positions and orientations. Under techniques as described herein, the spatial audio such as the rendered sound scenes/images may be—concurrently or synchronized with the visual changes—translated, rotated, adjusted, adapted, modified or otherwise rendered by the audio speakers based at least in part on (time constant or time varying) positions and/or orientations of the user as tracked by the media consumption system. The positions and/or orientations of the user can be tracked at least using sensors such as camera sensors external to the user or the user's device(s).

Sound fields/scenes/images may be generated with the headphones or non-headphone audio speakers based at least in part an HRTF applicable to or specifically selected for a user as described herein. The HRTF characterizes how each of the user's ears (e.g., the user's left ear, the user's right ear, etc.) receives (or perceives) a sound from a point in space. The HRTF may comprise a first component (HRTF function) for the user's left ear and a second component (HRTF function) for the user's right ear. As sound strikes the user, spatial and physical characteristics such as size and shape of the user's head, ear, ear canal, density of the user's head, size nasal and oral cavities, and so on, alter magnitudes and/or phases in various frequencies of the sound in the entire audible frequency spectrum/range/broadband, the influence how the sound is received or audibly perceived by the user. These spatial and physical characteristics that determines or influences an actual HRTF for the user can vary significantly from person to person.

In some operational scenarios, user tracking as described herein can be used to track a user's face or generate face tracking data in various different positions and orientations of the user's face. The face tracking data acquired through (e.g., camera, ranging, LIDAR, etc.) sensors such as images of the user's face in various different positions and/or orientations can be used to (e.g., gradually, relatively slowly, surreptitiously with no or little user input or user awareness, with little or no abrupt/sudden change in the HRTF selected for the user, etc.) build a (e.g., 360-degree three-dimensional, partial three-dimensional, 50-degree three-dimensional, etc.) model of the user's face, and to create or select a customized HRTF specifically for the user based on model of the user's face. For example, the model of the user's face or simply images acquired for the user's face can be used as input (e.g., to extract features or feature vectors for prediction, etc.) to a ML- or AI-based HRTF predictive model to select, predict or estimate the customized HRTF specifically for the user. The HRTF predictive model may be (e.g., previously, continuously, etc.) trained by images or (3D or mesh) models of multiple users' faces in training dataset to optimize prediction of HRTF models and to minimize prediction errors.

In some operational scenarios, a user can do or make a full or partial rotation (e.g., 360 degree or less rotation, etc.) in front of a camera (or camera sensor). The camera can acquire images of the user's face. The images acquired while the user performs the full or partial rotation may be used by a media consumption device—or an HRTF predictive model operating in conjunction therewith—to build, identify and/or improve a customized (e.g., detailed, personalized, etc.) HRTF specifically for the user or the type thereof, for example starting from a generic HRTF for the user initially.

In some operational scenarios, a user's head or face characteristics can be built relatively slowly or gradually as compared with a deliberate full or partial rotation or a focused scan—which may take a couple of minutes—of the user's head or face in front of a camera specifically tasked to acquire a model of the user's face.

For example, images of the user's head or face can be acquired gradually while the user is using a media consumption system to consume media content or listen to spatial audio with or without time synchronized video images. A (e.g., sufficiently, iterative improvements less than an improvement threshold, etc.) high quality or gradually improving model of the user's head or face may be achieved when the images gradually acquired cover a relatively large variation in positions and/or orientations of the user's head or face. As a result, a corresponding HRTF may be continuously created, predicted, estimated and/or updated for the user to result in a relatively high quality customized or personalized HRTF specifically for the user.

In these operational scenarios, as the media consumption system is being naturally used by the user, the system learns or selects a dynamically improving HRTF for the user, for example in real time. A better HRTF can be obtained and applied over the time in generating spatial audio for the user. you it dynamically improves the quality by applying a better HRTF. A database comprising training dataset can be used by the HRTF predictive model in combination with gradually collected model information of the user's face or head to (e.g., continuously, using user breaks, between playbacks of different contents, etc.) learn, adjust or optimize the customized or personalized HRTF for the user.

Additionally, optionally or alternatively, images, models, or updates thereof can be used to identify the user among different users. In some operational scenarios, a personal or individual media consumption profile or preferences may be determined or selected based on the identity of the user as established with the images, models or updates thereof. The profile or preferences can be applied in media consumption sessions. Additionally, optionally or alternatively, aspect of the user such as age, race, auditory characteristics (e.g., how good the user's hearing is as compared with an average listener, etc.), vision characteristics (e.g., how good the user's vision is as compared with an average viewer, etc.), wearing or not wearing glasses, etc., can be determined or estimated based on images, models, or updates thereof acquired for the user. Some or all of these aspects may be used to influence on customizing or personalizing the HRTF for the user and/or change the rendering of spatial audio as described herein.

Figure 7A:
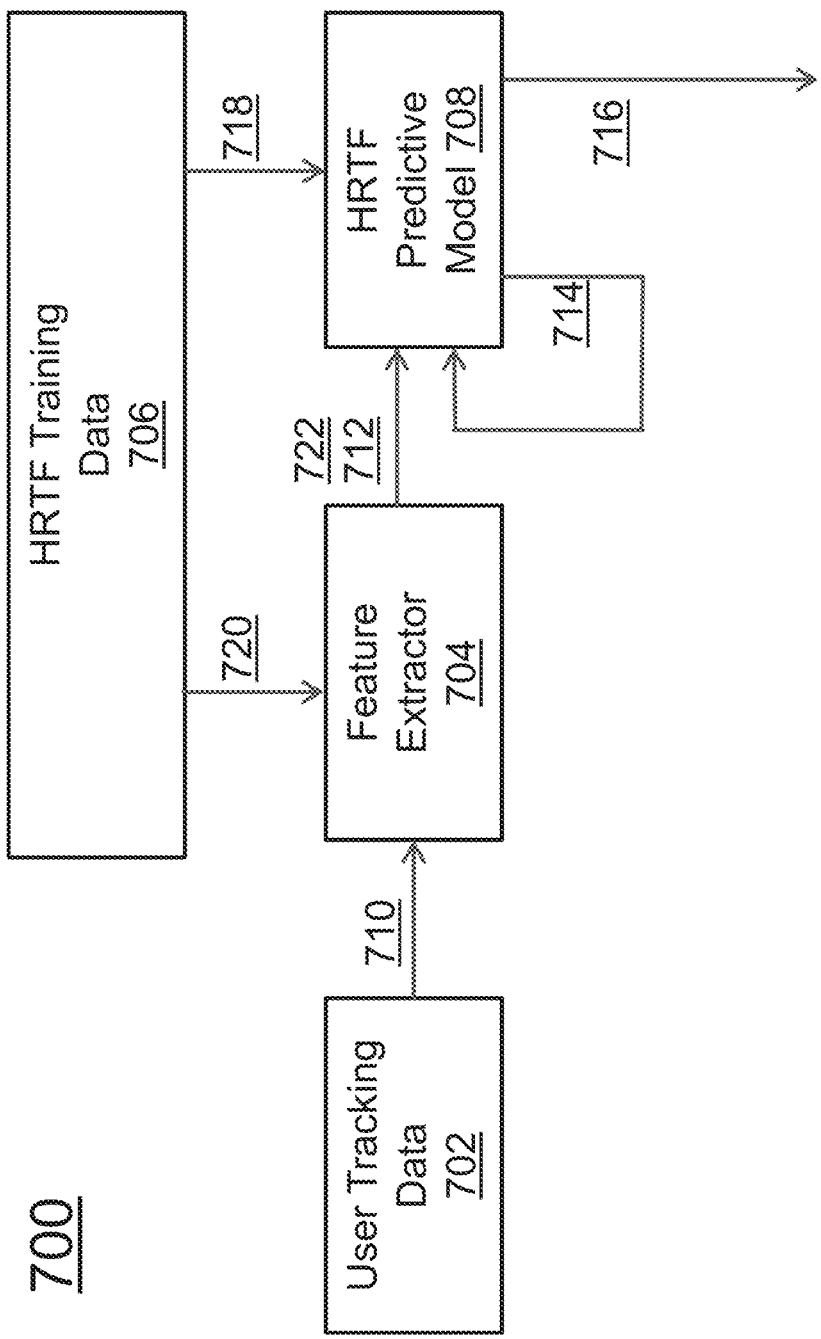
FIG. 7A illustrates an example HRTF prediction system.

FIG. 7A illustrates an example HRTF prediction system 700, which may be implemented in part by a media consumption system as described herein or may be implemented by a system separate but operating in conjunction with the media consumption system. One or more computing devices including hardware, software, or a combination of hardware and software may be used to implement some or all components of the HRTF prediction system (700).

The HRTF prediction System (700) generates, accesses or receives HRTF training data 706 comprising a plurality of HRTF training data instances. The plurality of HRTF training data instances comprises a plurality of sets of training image data 720 for a plurality of reference users represented in the HRTF training data (706) and a plurality of ground truths 718 for the plurality of reference users. The plurality of ground truths (718) may comprise or specify a plurality of applicable (e.g., different, similar, etc.) reference HRTFs for the plurality of reference users.

Each HRTF training data instance in the plurality of HRTF training data instances comprise (a) a respective set of training image data, in the plurality of sets of training image data (720), for a respective user in the plurality of reference users, and (b) a respective ground truth, in the plurality of ground truths, for the respective user. The respective set of training image data may comprise training images depicting the reference user's head from different positions and/or different orientations. The respective ground truth may comprise or specify a respective applicable reference HRTF, in the plurality of applicable (e.g., different, similar, etc.) reference HRTFs, for the respective user. Additionally, optionally or alternatively, the respective ground truth may comprise or specify a respective reference user preference— e.g., in a plurality of reference preferences for the plurality of reference users—for the reference user.

Some or all of the plurality of sets of training image data (720) can be provided to components of the HRTF prediction system (700) such as a feature extractor 704.

In response to receiving a (e.g., each, etc.) set of the training image data in the plurality of training image data (720), the feature extractor (704) extracts (low level or high level) features of one or more feature types from the set of training image data. For example, the extracted features may be generated or extracted by the feature extractor (704) from training images depicting a respective user in different positions and/or different orientations. Additionally, optionally or alternatively, the feature extractor (704) may store or represent the extracted features in a training feature vector (or matrix) 722 for the user.

The extracted features may be of one or more specific feature types used by the HRTF prediction system (700) to make predictions of HRTFs for various users. Example high level feature types as described herein may include but not necessarily limited to only, any, some or all of: spatial and/or physical characteristics of the user such as size, shapes of face, ears, etc. Example low level feature types as described herein may include but not necessarily limited to only, any, some or all of: image data such as color values of pixel or group of pixels represented in the tracking images, etc.

The training feature vector (722) can be directly or indirectly fed, for example by the feature extractor (704), as input into a HRTF predictive model 708.

The HRTF predictive model (708) may be implemented in the HRTF prediction system (700) for predicting or generating a (e.g., optimized, selected, etc.) HRTF and/or user preference specifically selected for a reference or non-reference user using an input feature vector relating to the user. In some operational scenarios, the HRTF predictive model (708) may be implemented using techniques related to one or more of: linear or non-linear regression, artificial neural networks or ANNs, and so on.

In a model training phase (which may precede or overlap at least in part with a model application phase in various operational scenarios), the HRTF predictive model (708) may be first trained or optimized to predict HRTFs 714 and/or user preferences from input training vectors generated from the training image data (720). The predicted HRTFs (714) and/or user preferences may be compared with reference HRTFs and/or reference user preferences indicated in the ground truths (718). Operational parameters (and even configurations) of the HRTF predictive model (708) may be (e.g., repeatedly, iteratively, recursively, etc.) adjusted or improved to minimize errors or differences between the predicted HRTFs (714) and/or user preferences as generated by the HRTF predictive model (708) for each training instance represented in the training data (706) and the reference HRTFs and/or reference user preferences indicated in the ground truths (718) of the same training data (706).

In a (non-training) model application phase, the HRTF prediction System (700) generates, accesses or receives user tracking data 702 originated from a set of tracking images depicting a user's head from different positions and/or different orientations. Some or all of the user tracking data (702) can be provided as user tracking data input 710 to components of the HRTF prediction system (700) such as the feature extractor (704).

In response to receiving the user tracking data input (710), the feature extractor (704) extracts (low level or high level) features of the same feature types as used in the training phase from the user tracking data input (710). For example, the extracted features may be generated or extracted by the feature extractor (704) from tracking images depicting the user from different positions and/or different orientations. Additionally, optionally or alternatively, the feature extractor (704) may store or represent the extracted featured in a feature vector (or matrix) 712 for the user.

The feature vectors (712) can be directly or indirectly fed, for example by the feature extractor (704), as input into the HRTF predictive model (708) to predict or generate a (e.g., optimized, non-training, etc.) HRTF 716 and/or user preference specifically selected for the user.

9. TRACKING RENDERING ENVIRONMENT

Figure 6E:
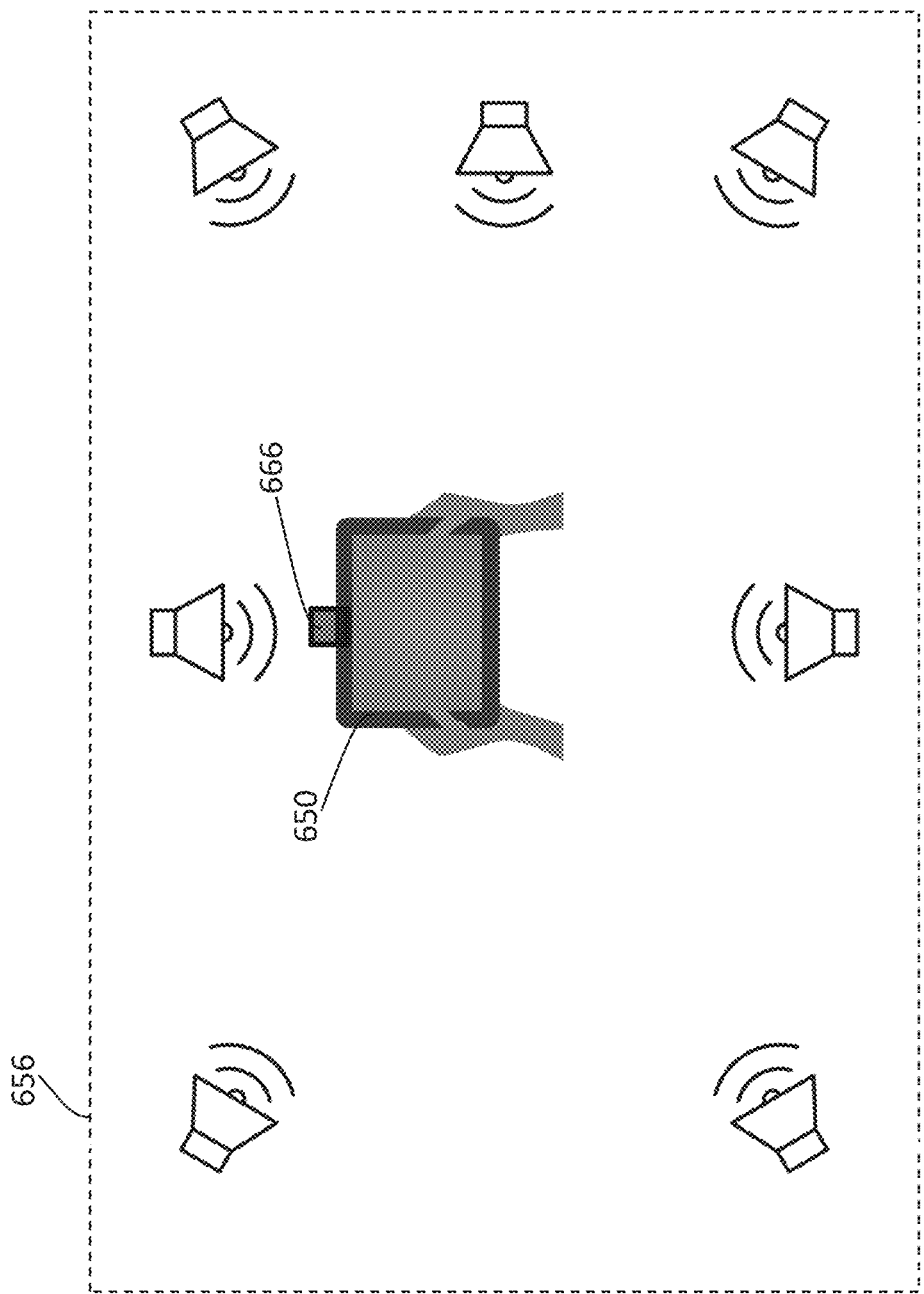
FIG. 6E illustrates an example media consumption system that uses cameras to acquire images of a media rendering environment and determine audio characteristics of objects present in the media rendering environment.

User tracking techniques as described here can be extended or enhanced to cover or support tracking a user's rendering environment. FIG. 6E illustrates an example media consumption system (e.g., 650, etc.) that uses cameras to acquire images of a media rendering environment (e.g., 656, etc.), analyzes the images acquired with the cameras, implements SLAM techniques/methods/algorithms to model, and determine audio (rendering) related characteristics of, the rendering environment (656) such as a room in which the user can be located.

As illustrated in FIG. 6E, the media rendering environment may be deployed with one or more non-headphone audio speakers (e.g., left and right front speakers, center speaker, left and right surround speakers, left and right rear speakers, etc.) controlled at least in part by the media consumption system (650) to render spatial audio. It should be noted that some or all techniques as described herein may be implemented with non-headphone speakers in various audio speaker configurations that are not necessarily limited to only what is depicted in FIG. 6E.

Example audio related characteristics pertaining to the media rendering environment (656) may include, but are not necessarily limited to only, those related to any, some or all of: headphone and/or non-headphone audio speakers, sizes; types of walls; types of materials, any presence of moderate or highly sound absorbent materials, objects or walls; any presence of moderate or highly sound diffusive or dissipative materials, objects or walls; reverberation characteristics; echo characteristics; and so forth.

When playing back spatial audio or generating sound fields/images in a room (or another type of rendering environment) of certain audio related characteristics, specific compensation may be determined or implemented for that room. In some operational scenarios, audio (e.g., audio signal, audio content, audio sample data, etc.) received by the media consumption system to reproduce or render may have been created by an upstream system to the media consumption system in an audio acquisition/recording environment with a set of specific audio (acquisition/recording) related characteristics, the specific audio (acquisition/recording) related characteristics may be represented in audio sample data generated or may be represented in audio metadata received by the media consumption system along with the audio. Audio (rendering) related characteristics of (audio speakers, objects, walls, types of materials used in an audio rendering environment, etc., in) the rendering environment may be integrated or taken into account in adjusting or modifying the rendering of the received audio such that the rendered audio is perceived by the user as coming from the same or similar audio acquisition/recording environment (e.g., a guitar player playing in a studio with audio diffusive or dissipative walls, a band playing in a crowded bar, etc.). Thus, echo or reverberation characteristics in the recording environment in which audio content is acquired/recorded may be emulated or reproduced in playing back the recorded audio content in the user's audio rendering environment. For example, when the user is located in a particular location of the rendering environment, the rendered spatial audio may contain new audio signal portions generated and rendered by the media consumption system based at least in part on the model (including but not limited to audio characteristics) of the rendering environment to emulate reflection and transmission of the recorded audio content (e.g., guitar playing soundtrack, etc.) in the recording environment. As a result, the guitar playing may be auditorily perceived by the user as present in the same room with the user. In some operational scenarios, audio characteristics of the recording environment may be determined or estimated from audio sample data (or audio essence) received by the media consumption system. Additionally, optionally or alternatively, audio metadata may optionally contain parameters or information regarding a model (including but not limited to audio characteristics) of the recording environment.

In some operational scenarios, a camera operating in conjunction with the media consumption system may acquire images of the audio rendering environments. From these images, the media consumption system can identify audio speaker locations in the audio rendering environment such as a room. Channelized audios may be adjusted or corrected for respective audio speakers based on their (e.g., actual, determined with the images, etc.) individual audio speaker locations.

In some operational scenarios, a camera operating in conjunction with the media consumption system may acquire images of audio speakers and headphones. For example, a user can hold the camera (or the device containing the camera), walk around a room (or audio rendering environment) to where audio speakers are, and capture or take images/pictures of the audio speakers in the room. From these images, the media consumption system can identify model(s) and/or make(s) of the audio speakers and/or headphones. Additionally, optionally or alternatively, the media consumption system can use SLAM or image processing methods or algorithms to build a (3D or mesh) model of the room or rendering environment including the locations of the audio speakers. Additionally, optionally or alternatively, the media consumption system can use image processing methods or algorithms to detect types of materials used in an audio rendering environment, objects or walls of specific sound reflection properties such as mirrors, windows, etc., above, below, in front of, behind or on the sides of the user. Specific EQ operational parameters can be selected by the media consumption system or an audio spatial rendering system therein for some or all of the audio speakers and/or headphones based on the identified model(s) and/or make(s) or audio rendering characteristics (of the audio speakers and/or headphones, identified objects or walls, identified materials, etc.) determined therefrom. Specific audio processing and/or rendering can be performed by the media consumption system or the audio spatial rendering system therein for some or all of the audio speakers and/or headphones based on the identified model(s) and/or make(s) or audio rendering characteristics (of the audio speakers and/or headphones) determined therefrom. In some operational scenarios, microphones, speakers, etc., can be used in combination with cameras to help build a model of a media rendering environment such as a relatively room, a relatively large room, a venue, a cinema, etc. The user can speak while one or more microphones can measure responses from the user's voice to collect audio information and use the collected audio information to determine audio characteristics (e.g., how much echo or reverberation is, etc.) of the rendering environment. Additionally, optionally or alternatively, an audio speaker can emit or playback sounds (calibration sounds or non-calibration sounds) while one or more microphones can measure responses from the user's voice to collect audio information and use the collected audio information to determine audio characteristics (e.g., how much echo or reverberation is, etc.) of the rendering environment. The information collected through the user, speakers, microphones, etc., can be combined with tracking information from camera sensors to probe the rendering environment and build a model as well as audio characteristics of the rendering environment.

For example, some or all of the specific selected EQ operational parameters and/or specific performed audio processing and/or rendering operations may control how to do bass management of each of some or all of the audio speakers and/or headphones. These speakers may not have a relatively high fidelity frequency response (e.g., in certain bands of audible frequencies, etc.). Given that it is difficult for a (human) user to identify location of bass audio portions, the bass audio portions may be shifted or fed from one speaker to one or more other speakers that support bass management.

Adjustments in the processing and/or rendering of received audio can be made dynamically by the media consumption device using the knowledge of all components including but not limited to the knowledge about audio speakers and/or headphones.

An ML/AI trained network/model—e.g., operating in conjunction with a media consumption system (e.g., 650 of FIG. 6B or FIG. 6E, etc.)—may be used to identify models and/or makes of audio speakers and headphones. The ML/AI trained network/model can be trained with images of audio speakers and/or headphones of various different models or makes in a training dataset or a training database. Images or sequences of images that capture audio speakers and/or headphones in the user's audio rendering environment can be fed or provided by the media consumption system as input (e.g., used to extract features or feature vectors for prediction, etc.) to the ML/AI trained network/model. The media consumption system retrieves or receives a prediction (or a best guess) of makes and/or models of the audio speakers and headphones from the ML/AI trained network/model in return. As in the case of gradually improving a customized or personalized HRTF for the user, identification of the makes and/or models of the audio speakers and headphones can be gradually (or subtly) improved with no or little user input. As a result, the rendering of spatial audio can be gradually (or subtly) improved over the time as the user using the media consumption system to render media content.

User experience in connection with an identification of audio speakers and/or headphones and/or objects present in a media rendering environment by a media consumption system as described herein can range from a subtle model of simply using the media consumption system and leaving to the camera to help identify the audio speakers and/or headphones and/or objects present in a media rendering environment to a more explicit model in which the audio speakers and/or headphones and/or objects present in a media rendering environment can be more proactively identified.

In an example, headphones may be disposed or equipped with specialized or specifically located LEDs that can emit light to help track a user or a user device worn by the user and reduce workload and computational cost in such device/user tracking. In addition, some or all of these LEDs can be used to help identify the model and make of the headphones. Examples of LED assisted device/user tracking are described in the previously mentioned U.S. Provisional Application Ser. No. 62/484,131.

In another example, a user can hold headphones in front of a camera/sensor such as one of a mobile computing device (as a part of a media consumption system) and cause the mobile computing device to capture or pick up images or sensor date of the headphones, to identify the model and make of the headphones from the images or sensor data, and to alert the user when the model and make of the headphones have been successfully identified.

Figure 7B:
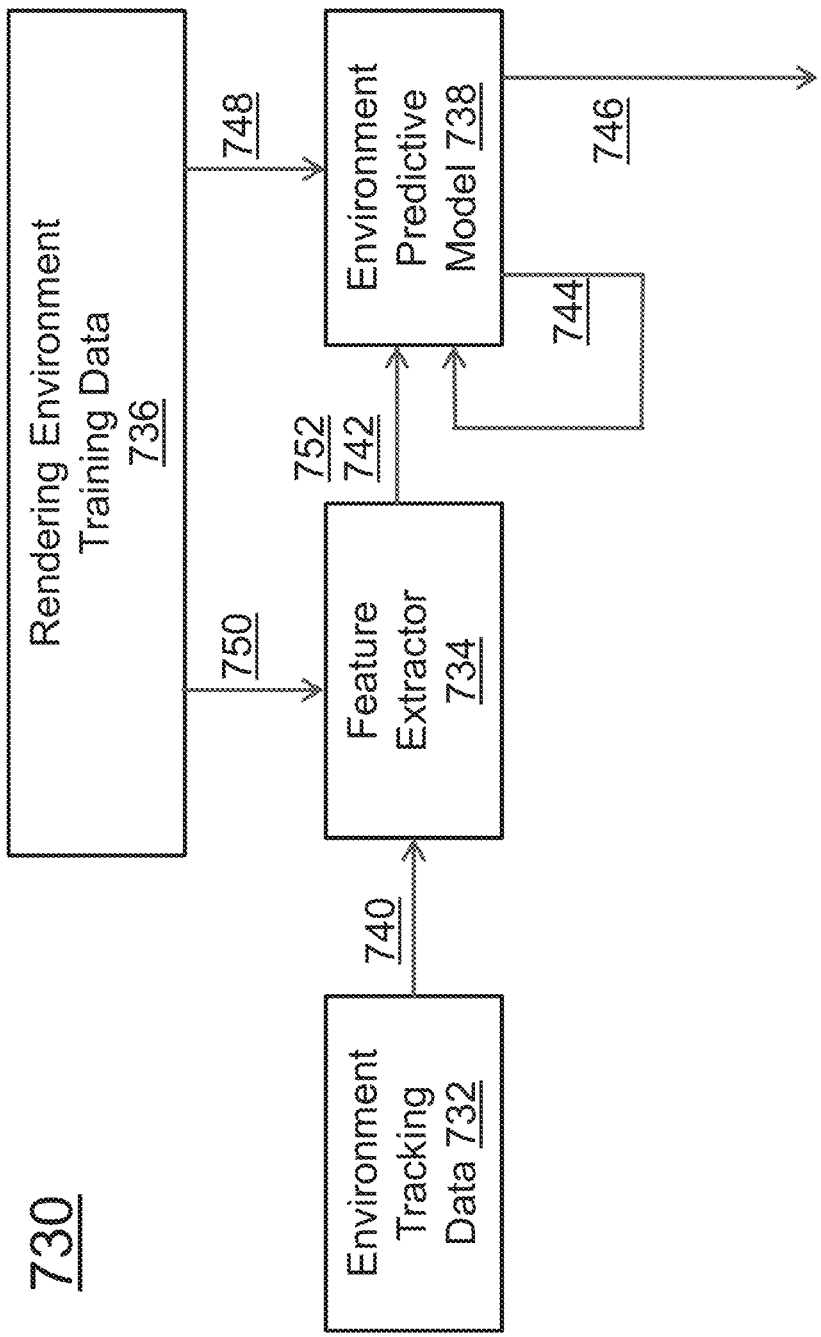
FIG. 7B illustrates an example rendering environment audio characteristics prediction system.

FIG. 7B illustrates an example rendering environment (audio characteristics) prediction system 730, which may be implemented in part by a media consumption system as described herein or may be implemented by a system separate but operating in conjunction with the media consumption system. One or more computing devices including hardware, software, or a combination of hardware and software may be used to implement some or all components of the rendering environment prediction system (730).

The rendering environment prediction System (730) generates, accesses or receives rendering environment training data 736 comprising a plurality of rendering environment training data instances. The plurality of rendering environment training data instances comprises a plurality of sets of training image data 750 for a plurality of reference audio speakers, walls, fixture objects, portable objects, etc., represented in the rendering environment training data (736) and a plurality of ground truths 748 for the plurality of reference audio speakers, walls, fixture objects, portable objects, etc. The plurality of ground truths (748) may comprise or specify a plurality of applicable (e.g., different, similar, etc.) reference audio characteristics (including but not limited to device capabilities such as frequency responses, directionality, latencies, etc., for reference audio speakers, etc.) for the plurality of reference audio speakers, walls, fixture objects, portable objects, etc.

Each rendering environment training data instance in the plurality of rendering environment training data instances comprise (a) a respective set of training image data, in the plurality of sets of training image data (750), for a respective reference audio speaker, wall, fixture object, portable object, etc., in the plurality of reference audio speakers, walls, fixture objects, portable objects, etc., and (b) a respective ground truth, in the plurality of ground truths, for the respective audio speaker, wall, fixture object, portable object, etc. The respective set of training image data may comprise training images depicting the respective reference audio speaker, wall, fixture object, portable object, etc. The respective ground truth may comprise or specify respective applicable reference audio characteristics, in the plurality of applicable (e.g., different, similar, etc.) reference audio characteristics, for the respective reference audio speaker, wall, fixture object, portable object, etc.

Some or all of the plurality of sets of training image data (750) can be provided to components of the rendering environment prediction system (730) such as a feature extractor 734.

In response to receiving a (e.g., each, etc.) set of the training image data in the plurality of training image data (750), the feature extractor (734) extracts (low level or high level) features of one or more feature types from the set of training image data. For example, the extracted features may be generated or extracted by the feature extractor (734) from training images depicting a respective reference audio speaker, wall, fixture object, portable object, etc. Additionally, optionally or alternatively, the feature extractor (734) may store or represent the extracted features in a training feature vector (or matrix) 752 for the respective reference audio speaker, wall, fixture object, portable object, etc.

The extracted features may be of one or more specific feature types used by the rendering environment prediction system (730) to make predictions of audio characteristics for various reference or non-reference audio speakers, walls, fixture objects, portable objects, etc. Example high level feature types as described herein may include but not necessarily limited to only, any, some or all of: spatial and/or physical characteristics of an audio speaker, wall, fixture object, portable object, etc., such as text label, size, shape, etc. Example low level feature types as described herein may include but not necessarily limited to only, any, some or all of: image data such as color values of pixel or group of pixels represented in the tracking images, etc.

The training feature vector (752) can be directly or indirectly fed, for example by the feature extractor (734), as input into a rendering environment predictive model 738.

The rendering environment predictive model (738) may be implemented in the rendering environment prediction system (730) for predicting or generating specifically estimated or selected for a reference or non-reference audio speaker, wall, fixture object, portable object, etc., using an input feature vector relating to the audio speaker, wall, fixture object, portable object, etc. In some operational scenarios, the rendering environment predictive model (738) may be implemented using techniques related to one or more of: linear or non-linear regression, artificial neural networks or ANNs, and so on.

In a model training phase (which may precede or overlap at least in part with a model application phase in various operational scenarios), the rendering environment predictive model (738) may be first trained or optimized to predict audio characteristics 744 from input training vectors generated from the training image data (750). The predicted audio characteristics (744) may be compared with reference audio characteristics indicated in the ground truths (748). Operational parameters (and even configurations) of the audio characteristics predictive model (738) may be (e.g., repeatedly, iteratively, recursively, etc.) adjusted or improved to minimize errors or differences between the predicted audio characteristics (744) as generated by the audio characteristics predictive model (738) for each training instance represented in the training data (736) and the reference audio characteristics indicated in the ground truths (748) of the same training data (736).

In a (non-training) model application phase, the audio characteristics prediction System (730) generates, accesses or receives rendering environment tracking data 732 originated from a set of tracking images depicting one or more audio speakers, walls, fixture objects, portable objects, etc. Some or all of the rendering environment tracking data (732) can be provided as rendering environment tracking data input 740 to components of the rendering environment prediction system (730) such as the feature extractor (734).

In response to receiving the rendering environment tracking data input (740), the feature extractor (734) extracts (low level or high level) features of the same feature types as used in the training phase from the rendering environment tracking data input (740). For example, the extracted features may be generated or extracted by the feature extractor (734) from tracking images depicting an audio speaker, wall, fixture object, portable object, etc. Additionally, optionally or alternatively, the feature extractor (734) may store or represent the extracted featured in a feature vector (or matrix) 742 for the user.

The feature vectors (742) can be directly or indirectly fed, for example by the feature extractor (734), as input into the audio characteristics predictive model (738) to predict or generate (e.g., non-training, etc.) audio characteristics 746 specifically estimated or selected for the audio speaker, wall, fixture object, portable object, etc.

10. CONTROLLING MEDIA RENDERING

The use of (e.g., user, environment, audio speaker and headphones, etc.) tracking techniques as described herein can help adjust spatial audio rendering in response to changes in spatial locations and/or orientations of the user (e.g., in relation to time synchronized video images rendered to the user) up to 6DoF. Additionally, optionally or alternatively, (e.g., user, environment, audio speaker and headphones, etc.) tracking techniques as described herein can be used to implement or perform gesture based media consumption (e.g., audio, video, etc.) control operations with a variety of media consumption systems and/or media consumption scenarios.

A media consumption system as described herein can implement or perform operations to allow hand gestures and/or body motions detected or determined from user tracking to interact with audio or audiovisual rendering such as sound field/images. In some operational scenarios, at least some of these detected hand gestures and/or body motions can be used for media rendering controls, for example with an AR headset.

A gesture based audio control system may be a part of a media consumption system as described herein. The gesture based audio control system can allow a user to control the volume, position and characteristics of sound or audio rendering based on or in response to detected (hand or body) gestures.

Figure 8A:
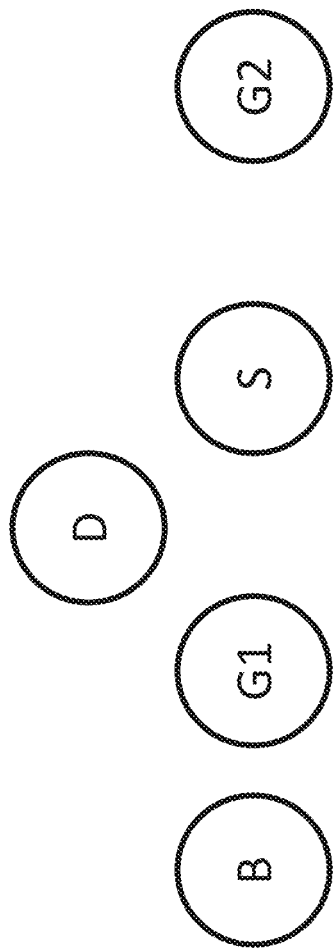
FIG. 8A and FIG. 8B illustrate example gesture based media control operations in a media rendering application.
Figure 8A:
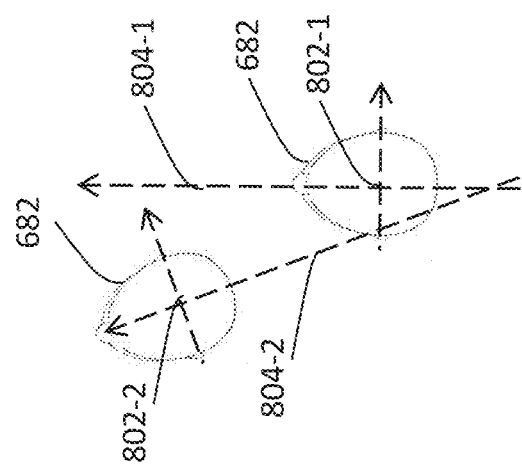
Figure 8B:
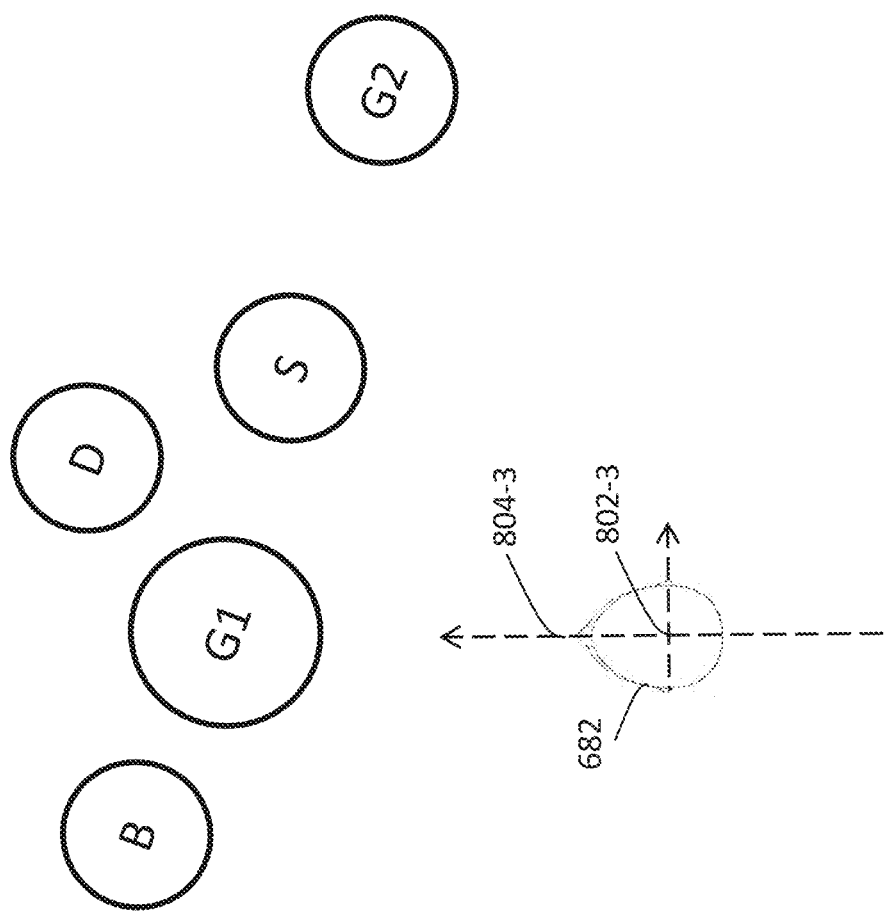

FIG. 8A and FIG. 8B illustrate example gesture based media (e.g., audio, video, etc.) control operations in a media (e.g., audio, audiovisual, etc.) rendering application. For the purpose of illustration only, spatial audio is being rendered to a user (e.g., 682, etc.) through headphone and/or non-headphone audio speakers operating in conjunction with the media consumption system.

For the purpose of illustration only, as illustrated in FIG. 8A, initially at a first time point, the user (682) may be located at a first spatial position 802-1 and a first spatial orientation 804-1 in sound scenes/images depicted by the spatial audio. In the sound scenes/images, audio or sound sources such as a first guitar (denoted with "G1" in a circle), a second guitar (denoted with "G2" in a circle), a singer (denoted with "S" in a circle), a bass guitar (denoted with "B" in a circle), a drum (denoted with "D" in a circle), and so on, are depicted or audibly perceived by the user (682). Additionally, optionally or alternatively, time synchronized video images corresponding to the spatial audio may be rendered on one or more image displays (e.g., AR display, an image display that is a part of a mobile computing device, etc.) by the media consumption system to render video scenes/images corresponding to the sound scenes/images.

In some operational scenarios, gestures are made with head or body motions greater than a distance or angular threshold. For example, the user may typically move within a small angular degree (e.g., 3 angular degrees, 5 angular degree, etc.) at any given time of media consumption. When the user makes a greater movement (e.g., greater than the angular or distance threshold, etc.), such movement may be detected by the media consumption system as a gesture for audio or audiovisual control operations.

For example, body gestures such as leaning in (or leaning forward) may be detected through user tracking by the audio control system to cause dynamically increasing volume of the rendered audio in response. Body gestures such as moving back may be detected through user tracking by the audio control system to cause dynamically decreasing volume of the rendered audio in response.

For the purpose of illustration only, as illustrated in FIG. 8A, at a second time point after the first time point, while the spatial audio is being rendered to the user (682), the user (682) may make gestures such as a leaning forward movement and a head turning movement toward the first guitar ("G1") such that the user is now located at a second spatial position 802-2 and a second spatial orientation 804-2 in the sound scenes/images depicted by the spatial audio. These gestures may be determined and detected through user tracking techniques as described herein using cameras and/or IMU and/or GPS and/or other sensors operating with the media consumption system.

In an example, a spatial positional difference between the first spatial position (802-1) and the second spatial position (802-2) may be tracked or detected to determine whether the difference exceeds normal (non-gesture) user movements as specified with a minimum spatial positional difference threshold. In response to determining that the spatial positional difference exceeds the threshold, the media consumption system may determine that this user movement qualifies, or is deemed, as a gesture.

In another example, a spatial orientational difference between the first spatial orientation (804-1) and the second spatial orientation (804-2) may be tracked or detected to determine whether the difference exceeds normal (non-gesture) user movements as specified with a minimum spatial orientational difference threshold. In response to determining that the spatial orientational difference exceeds the threshold, the media consumption system may determine that this user movement qualifies, or is deemed, as a gesture.

In some operational scenarios, one or both of a spatial positional difference and a spatial orientational difference may be used by the media consumption system to determine with the user's movement is a gesture.

Additionally, optionally or alternatively, the media consumption system may detect or track how long (e.g., from the first time point to the second time point, etc.) the user's movement lasts. In an example, a time duration during which the user initiates and completes the user's movement may be used as a (e.g., optional, etc.) factor in determining whether the user's movement is a gesture. In another example, a time duration during which the user stays or remains in the user's ending position may be used as a (e.g., optional, etc.) factor in determining whether the user's movement is a gesture. In these examples, if the time duration exceeds an applicable minimum time threshold, the user's movement may qualify, or may be deemed, as a gesture.

Lack of person detection (e.g., the system detects that no user is currently present, etc.) over a configured time interval may be detected through user tracking and used by the audio control system to mute audio in response.

The user's body or head leaning or turning to the left may be detected through user tracking and used by the audio control system to dynamically correlate with an audio source such as a teleconference speaker (among a plurality of teleconference speakers or audio sources displayed or rendered on an image display/screen) on the left side of the image display/screen, to dynamically increase or boost volume or audible legibility of the audio source or the teleconference speaker in response to the detected gesture. Likewise, gazing at a specific audio source or a teleconference speaker among a plurality of audio sources or teleconference speakers can be detected through user tracking and used by the audio control system to dynamically boost volume or audible legibility of the audio source or the teleconference speaker in response to the detected gaze. Additionally, optionally or alternatively, in some operational scenarios, (e.g., instead of just boosting volume or audible legibility of a teleconference speaker's voice, other audio sources such as other teleconferencing speakers' voices are suppressed partially or completely. Additionally, optionally or alternatively, in some operational scenarios, a detected gesture can be used by the media consumption system as a trigger to start playing out or rendering sound originated from a specific audio or sound source (e.g., a guitar, a talker, a sound or audio source to be depicted near the user, etc.), which might have been previously suppressed completely (e.g., muted, etc.) or partially before the detected gesture was made.

For example, as illustrated in FIG. 8B, the media consumption system may use the detected gesture as media (e.g., audio, video, etc.) control to adjust or adapt rendering the spatial audio such that the user (682) is given or assigned a third spatial position 802-3 and a third spatial orientation 804-3 that are much closer and much direct in relation to the first guitar ("G1"). Additionally, optionally or alternatively, the media consumption system may boost the volume of the first guitar ("G1") while maintaining or cutting the volumes of other sound/audio sources such as the second guitar ("G2"), the singer ("S"), the bass guitar ("B"), the drum ("D"), and so on.

In some operational scenarios, a combination of different gestures such as leaning forward and left can be detected through user tracking and dynamically generate corresponding control implications in response. For example, a sound/audio source depicted in sound images/scenes rendered by audio speakers operating with a media consumption system as being located behind a user may be brought in the sound images/scenes to being located in front of the user when the media consumption system detected that the user has made a gesture of head turning back movement.

Figure 8C:
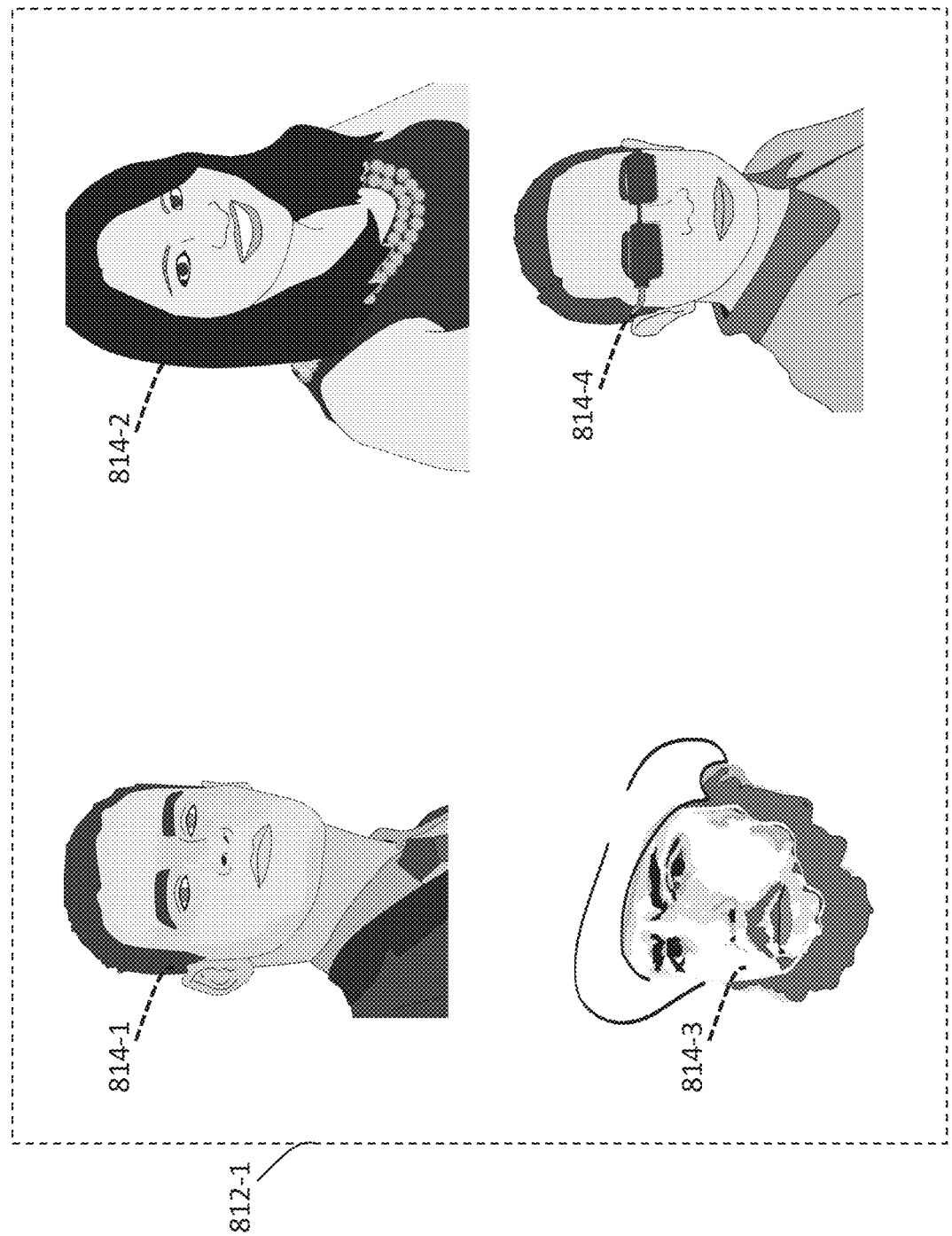
FIG. 8C and FIG. 8D illustrate example gesture based media control operations in a teleconferencing application.
Figure 8D:
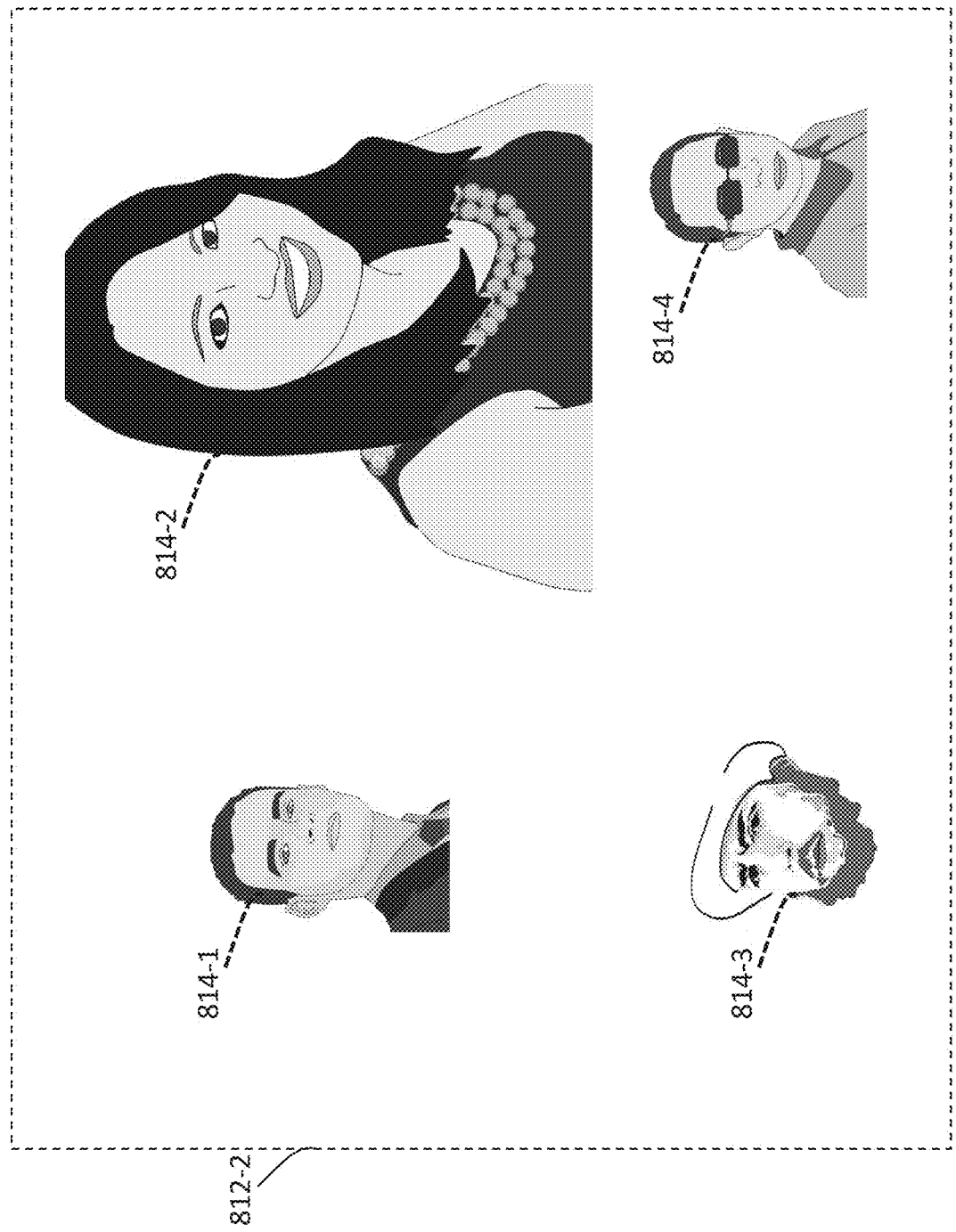

FIG. 8C and FIG. 8D illustrate example gesture based media (e.g., audio, video, etc.) control operations in a (e.g., audio, audiovisual, etc.) teleconferencing application. For the purpose of illustration only, while video images (e.g., 812-1, 812-2, etc.) depicting a plurality of talkers (or conference participants) 814-1 through 814-4 in a video conference is being rendered to a user—which may also be a talker or conference participant and which may or may not be depicted in the video images rendered to the user—on an image display operating in conjunction with the media consumption system, audio representing voices from the plurality of talkers in the video conference—which audio as rendered to the user may exclude the user's voice picked or captured by microphone operating with the media consumption system—is being rendered to the user through headphone and/or non-headphone audio speakers operating in conjunction with the media consumption system.

For the purpose of illustration only, as illustrated in FIG. 8C, initially at a first time point, the plurality of talkers 814-1 through 814-4 may be rendered in video images 812-1 on the image display with respective image portions of similar spatial sizes. Additionally, optionally or alternatively, the plurality of talkers 814-1 through 814-4 may be rendered in the audio rendered and/or controlled by the media consumption system with respective audio portions of similar loudness levels (e.g., similar gains, similar dynamic range controls, etc.).

For the purpose of illustration only, at a second time point after the first time point, while the audio captured by microphones from the plurality of talkers is being rendered to the user, the user may make gestures such as a leaning forward movement and a head turning movement toward a specific talker (e.g., 814-2, etc.) such that the user is now located at a second spatial position and a second spatial orientation in sound scenes/images depicted by the audio and/or by the video images (812-1). These gestures may be determined and detected through user tracking techniques as described herein using cameras and/or IMU and/or GPS and/or other sensors operating with the media consumption system.

As illustrated with FIG. 8A and FIG. 8B, in an example, a spatial positional difference between the first spatial position and the second spatial position may be tracked or detected to determine whether the difference exceeds normal (non-gesture) user movements as specified with a minimum spatial positional difference threshold. In response to determining that the spatial positional difference exceeds the threshold, the media consumption system may determine that this user movement qualifies, or is deemed, as a gesture.

In another example, a spatial orientational difference between the first spatial orientation and the second spatial orientation may be tracked or detected to determine whether the difference exceeds normal (non-gesture) user movements as specified with a minimum spatial orientational difference threshold. In response to determining that the spatial orientational difference exceeds the threshold, the media consumption system may determine that this user movement qualifies, or is deemed, as a gesture.

In some operational scenarios, one or both of a spatial positional difference and a spatial orientational difference may be used by the media consumption system to determine with the user's movement is a gesture.

Additionally, optionally or alternatively, the media consumption system may detect or track how long (e.g., from the first time point to the second time point, etc.) the user's movement lasts. In an example, a time duration during which the user initiates and completes the user's movement may be used as a (e.g., optional, etc.) factor in determining whether the user's movement is a gesture. In another example, a time duration during which the user stays or remains in the user's ending position may be used as a (e.g., optional, etc.) factor in determining whether the user's movement is a gesture. In these examples, if the time duration exceeds an applicable minimum time threshold, the user's movement may qualify, or may be deemed, as a gesture.

For example, as illustrated in FIG. 8D, the media consumption system may use the detected gesture as media (e.g., audio, video, etc.) control to adjust or adapt rendering the audio and/or the video images such that a volume/loudness level of the specific talker's voice in the audio is increased/boosted and/or the image portion depicting the specific talker in the video images (e.g., 812-2, etc.) is enlarged/zoomed in. Additionally, optionally or alternatively, the media consumption system may concurrently maintain or cut volumes/loudness levels of other talkers' voices in the audio and/or maintain or zoom out spatial sizes of image portions depicting the other talkers in the video images (e.g., 812-2, etc.), while boosting the voice of the specific talker in the audio and/or enlarging the spatial size of the image portion depicting the specific talker in the video images (e.g., 812-2, etc.).

Hence, these and other gesture based audio controls may be implemented as a part of a video conferencing solution/application or any audio rendering solution/application supported or implemented with a media consumption system as described herein.

In some operational scenarios, gesture based media or audio controls can be implemented in gaming applications. For example, during an online gaming session, a gamer may have hands fully occupied for playing. Specific gestures can be detected through user tracking and used by a media or audio control system operating in connection with the online gaming session to dynamically zoom in or increase the size of a specific window or a specific window portion such as a chat window or a chat window portion. Additionally, optionally or alternatively, specific gestures can be detected through user tracking and used by the media or audio control system to dynamically boost the gamer's own audio or another gamer's voice over audio of the game, for example for commentary and/or communication purposes. Eye tracking may be implemented as a part of user tracking to provide additional user interface elements or controls to boost the rendered audio, to zoom video images of specific rendered window on an image display/screen, and so on. Additionally, optionally or alternatively, in some operational scenarios, (e.g., instead of just boosting volume or audible legibility of a gamer's voice) other audio sources such as other gamers' voices or game audio are suppressed partially or completely. Additionally, optionally or alternatively, in some operational scenarios, a detected gesture can be used by the media consumption system as a trigger to start playing out or rendering sound originated from a specific audio or sound source, which might have been previously suppressed completely or partially before the detected gesture was made.

Figure 8E:
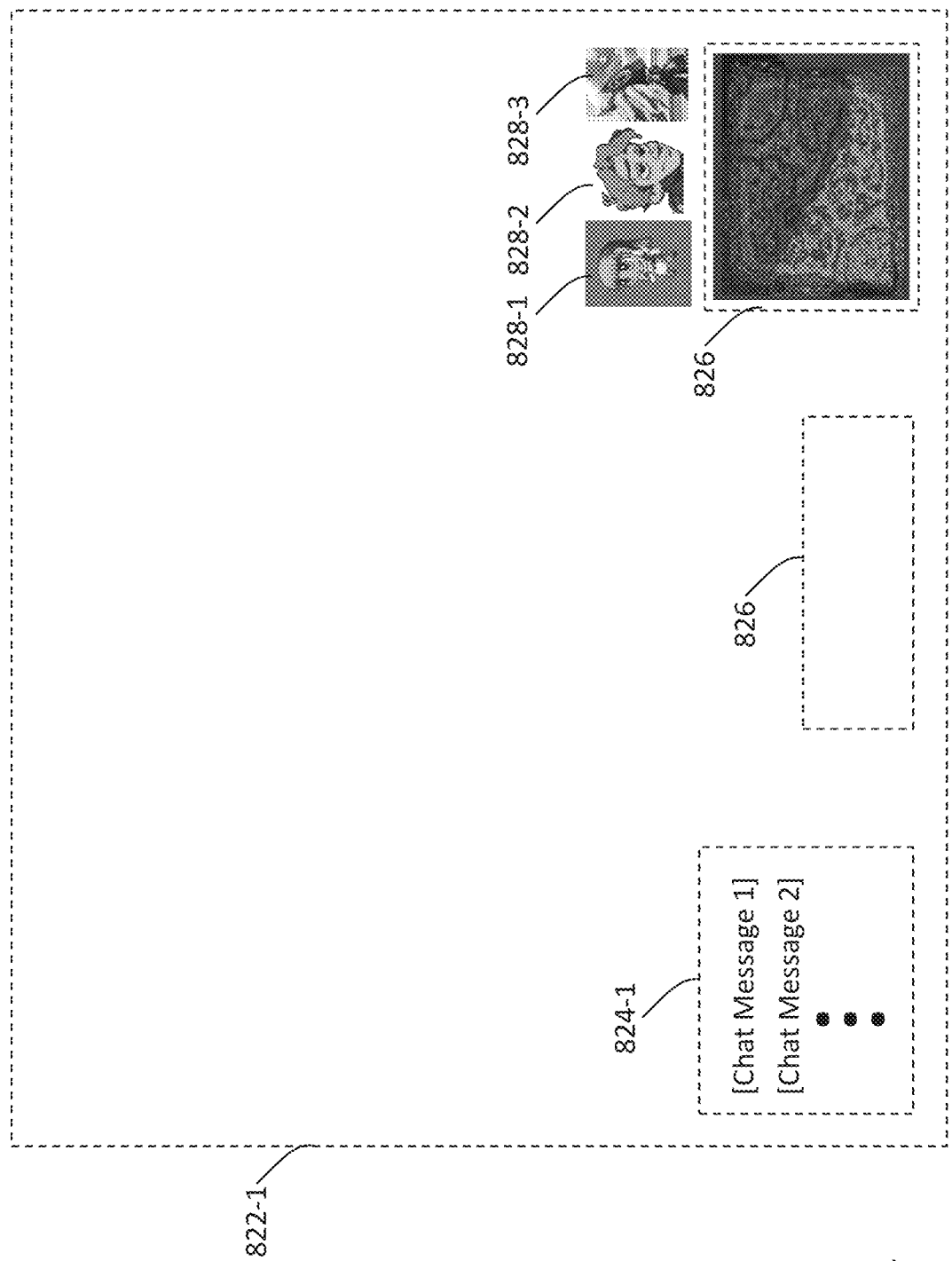
FIG. 8E and FIG. 8F illustrate example gesture based media control operations in a computer game application.
Figure 8F:
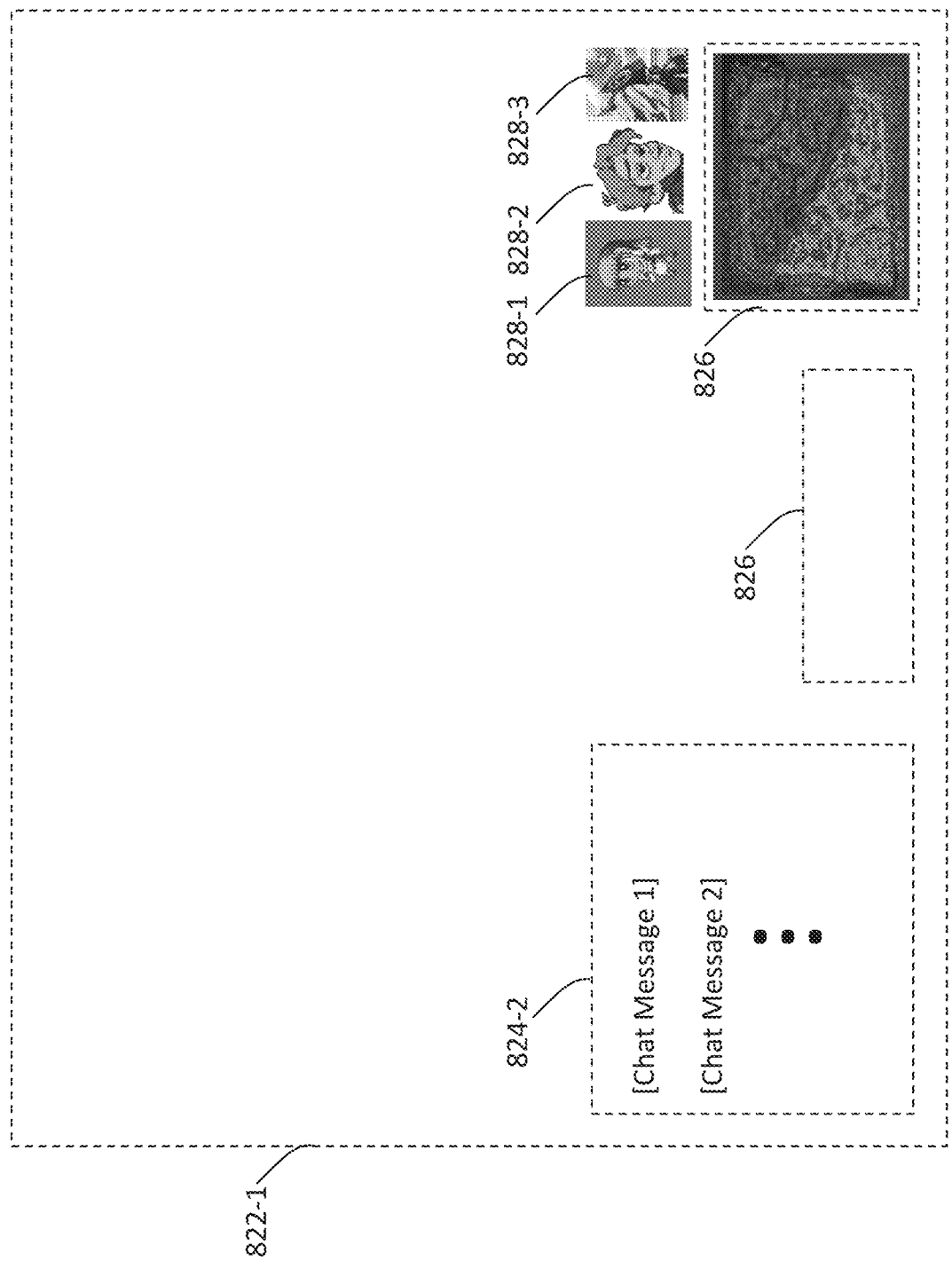

FIG. 8E and FIG. 8F illustrate example gesture based media (e.g., audio, video, etc.) control operations in a computer game application. For the purpose of illustration only, while video images (e.g., 822-1, 822-2, etc.) of a computer game is being rendered to a user (or game player) on an image display operating in conjunction with the media consumption system, audio of the video game is being rendered to the user through headphone and/or non-headphone audio speakers operating in conjunction with the media consumption system.

For the purpose of illustration only, as illustrated in FIG. 8E, initially at a first time point, visual computer game scenes may be rendered in video images 822-1 of the computer game on the image display along with auxiliary visual image portions not depicting the visual computer game scenes. The auxiliary visual image portions may comprise a chat window 824-1, a computer game head up display (HUD) area 826, a game map display 826, teammate icons (e.g., 828-1 through 828-3, etc.) representing game players who are the user's teammates, and so on. Additionally, optionally or alternatively, audio computer game scenes may be rendered in the audio of the computer game rendered and/or controlled by the media consumption system with additional audio portions (e.g., optionally, etc.) related to (or associated with) the chat window (824-1), the HUD area (826), the teammate icons (e.g., 828-1 through 828-3, etc.), and so on.

For the purpose of illustration only, at a second time point after the first time point, while the audio of the computer game is being rendered to the user, the user may make gestures such as a leaning forward movement and a head turning movement toward a specific image portion of the video images (824-1) such that the user is now located at a second spatial position and a second spatial orientation in sound scenes/images depicted by the audio and/or by the video images (822-1). These gestures may be determined and detected through user tracking techniques as described herein using cameras and/or IMU and/or GPS and/or other sensors operating with the media consumption system.

As illustrated with FIG. 8A and FIG. 8B as well as with FIG. 8C and FIG. 8D, in an example, a spatial positional difference between the first spatial position and the second spatial position may be tracked or detected to determine whether the difference exceeds normal (non-gesture) user movements as specified with a minimum spatial positional difference threshold. In response to determining that the spatial positional difference exceeds the threshold, the media consumption system may determine that this user movement qualifies, or is deemed, as a gesture.

In another example, a spatial orientational difference between the first spatial orientation and the second spatial orientation may be tracked or detected to determine whether the difference exceeds normal (non-gesture) user movements as specified with a minimum spatial orientational difference threshold. In response to determining that the spatial orientational difference exceeds the threshold, the media consumption system may determine that this user movement qualifies, or is deemed, as a gesture.

In some operational scenarios, one or both of a spatial positional difference and a spatial orientational difference may be used by the media consumption system to determine with the user's movement is a gesture.

Additionally, optionally or alternatively, the media consumption system may detect or track how long (e.g., from the first time point to the second time point, etc.) the user's movement lasts. In an example, a time duration during which the user initiates and completes the user's movement may be used as a (e.g., optional, etc.) factor in determining whether the user's movement is a gesture. In another example, a time duration during which the user stays or remains in the user's ending position may be used as a (e.g., optional, etc.) factor in determining whether the user's movement is a gesture. In these examples, if the time duration exceeds an applicable minimum time threshold, the user's movement may qualify, or may be deemed, as a gesture.

The media consumption system may use the detected gesture as media (e.g., audio, video, etc.) control to adjust or adapt rendering the audio and/or the video images. For example, the media consumption system may detect that the user is leaning toward and/or that the user is turning to and/or that the user's gaze is being directed to, the chat window (824-1) of FIG. 8E.

In response, the media consumption system may enlarge the chat window (e.g., now 824-2 as illustrated in FIG. 8F, etc.) and/or boost/increase a volume/loudness level related to or associated with the chat window (824-2). Additionally, optionally or alternatively, the media consumption system may concurrently maintain or cut volumes/loudness levels of other audio portions in the audio of the computer game and/or maintain or zoom out spatial sizes of other image portions in the video images (e.g., 822-2, etc.) of the computer game, while enlarging the chat window (824-2) of FIG. 8F and/or boost/increase the volume/loudness level related to or associated with the chat window (824-2).

11. EXAMPLE PROCESS FLOWS

FIG. 4 illustrates an example process flow according to an example embodiment of the present invention. In some example embodiments, one or more computing devices or components (e.g., a media consumption system, 130 and/or 135 of FIG. 1, headphones and/or computer of FIG. 2, etc.) may perform this process flow. In block 402, a media consumption system acquires images through one or more sensors of a media consumption system.

In block 404, the media consumption system uses the acquired images to determine a user's position and/or orientation.

In block 406, the media consumption system adjusts sound fields/images generated by headphones and/or non-headphone audio speakers operating in conjunction with the media consumption system based at least in part on the user's position and/or orientation.

In an embodiment, the media consumption system is configured to further perform: building a personalized HRTF for the user based at least in part on the acquired images.

In an embodiment, the media consumption system is configured to further perform: identifying one or more gestures made by the user; performing audio and/or video control operations based at least in part on the identified gestures.

In an embodiment, the media consumption system is configured to further perform: using the acquired images to identify the make and/or model of headphones and/or non-headphone speakers; selecting specific audio EQ operational parameters and/or profiles for the headphones and/or non-headphone speakers based at least in part on the identified make and/or model.

In an embodiment, the media consumption system is configured to further perform: using the acquired images to determine the user's position and/or orientation up to 6DoF.

In an embodiment, the media consumption system is configured to further perform: using the user's position and/or orientation to prevent sound fields/images from being incorrectly rotated caused by drift errors of an IMU operating with the media consumption system.

In an embodiment, the media consumption system is configured to further perform: using the user's position and/or orientation to prevent sound fields/images from being incorrectly rotated caused by movements of a rendering environment.

In an embodiment, the media consumption system is configured to further perform: turning on a camera sensor at a sampling rate lower than a sampling rate of an IMU operating with the media consumption system.

In an embodiment, the media consumption system is configured to further perform: turning on a camera sensor in response to detecting a large movement in positions and/or orientations.

FIG. 9A illustrates an example process flow according to an example embodiment of the present invention. In some example embodiments, one or more computing devices or components (e.g., a media consumption system, 130 and/or 135 of FIG. 1, headphones and/or computer of FIG. 2, etc.) may perform this process flow. In block 902, a media consumption system acquires one or more images through one or more image sensors operating in conjunction with a media consumption system.

In block 904, the media consumption system uses or analyzes the one or more acquired images to determine a user's movement in a plurality of degrees of freedom.

In block 906, the media consumption system adjusts one or more sound images depicted in spatial audio rendered by a plurality of audio speakers operating in conjunction with the media consumption system based at least in part on the user's movement in the plurality of degrees of freedom.

In an embodiment, the plurality of degrees of freedom comprises one of: three degrees of freedom (3DoF), six degrees of freedom (6DoF), at least one degree of freedom for translation, at least one degree of freedom for rotation, etc.

In an embodiment, the user's movement as determined with the one or more image sensors is used to prevent the one or more sound images from being incorrectly rotated caused by movements of a rendering environment.

In an embodiment, the one or more image sensors include a camera; wherein the camera is turned on in response to detecting a large movement by the user in reference to an earth stationary coordinate system.

In an embodiment, the plurality of audio speakers comprises one or more of: a pair of headphones, at least one non-headphone audio speaker, a combination of headphone and non-headphone audio speakers, etc.

In an embodiment, the one or more image sensors are external and outside any wearable device of the user; the media consumption system operates with a wearable device worn by the user; the wearable device includes one or more non-image sensors that generate user motion measurements; the user motion measurements generated by the one or more non-image sensors of the wearable device are integrated with drift errors over a time duration to determine the user's movement during the time duration.

In an embodiment, the user's movement determined from the user motion measurements generated by the one or more non-image sensors of the wearable device is corrected by the user's movement determined using the one or more images acquired by the one or more image sensors.

In an embodiment, the one or more non-image sensors of the wearable device is reset with the user's movement determined using the one or more images acquired by the one or more image sensors.

In an embodiment, the one or more image sensors include a camera; wherein the camera is turned on at a sampling rate lower than a sampling rate of the one or more non-image sensors.

In an embodiment, the one or more non-image sensors of the wearable device include an inertia measurement unit.

In an embodiment, time synchronized video images are rendered on an image display to the user; one or more visual objects depicted in the time synchronized video images correspond to one or more audio sources depicted in the one or more sound images; the one or more visual objects are depicted at visual spatial locations coinciding with audio spatial positions at which the one or more audio sources are depicted in the one or more sound images.

In an embodiment, the media consumption system is implemented with one or more of: a mobile phone, an augmented reality system, a virtual reality system, a home entertainment system, a cinema system, a mobile computing device, a non-mobile computing device, a combination of mobile computing device and non-mobile computing device, etc.

Example head tracked audio/visual rendering can be found in U.S. Provisional Patent Application No. 63/137,084, with an application title of "HEAD TRACKED RENDERING AND CONTROL FEATURES FOR SPATIAL AUDIO" by Ajit Ninan and William Rozzi, filed on Jan. 13, 2021, 2021; U.S. Provisional Patent Application No. 63/279,857, with an application title of "HEAD TRACKED SPATIAL AUDIO AND/OR VIDEO RENDERING" by Ajit Ninan and William Rozzi, filed on Nov. 16, 2021, the entire contents of which are hereby incorporated by reference as if fully set forth herein.

FIG. 9B illustrates an example process flow according to an example embodiment of the present invention. In some example embodiments, one or more computing devices or components (e.g., a media consumption system, 130 and/or 135 of FIG. 1, headphones and/or computer of FIG. 2, etc.) may perform this process flow. In block 922, a media consumption system acquires a plurality of images of a user's head at a plurality of different orientational angles through one or more image sensors operating in conjunction with a media consumption system.

In block 924, the media consumption system uses or analyzes the plurality of images of the user's head to select a specific personalized head related transfer function for the user.

In block 926, the media consumption system adjusts spatial audio rendered by a plurality of audio speakers operating in conjunction with the media consumption system based at least in part on the specific personalized HRTF selected for the user.

In an embodiment, the plurality of different orientational angles cover an angular range greater than a minimum angular range.

In an embodiment, the plurality of images of the user's head is acquired over a time duration; the media consumption system selects a default non-personalized HRTF in rendering audio to the user when the time duration begins.

In an embodiment, the specific personalized HRTF is used to perform audio processing on received audio data to depict an audio source with a specific spatial relationship between the audio source and the user.

In an embodiment, the specific personalized HRTF is predicted by an HRTF predictive model trained with training images of heads of a plurality of users and ground truths indicating a plurality of respective HRTFs for the plurality of users.

In an embodiment, the plurality of images of the user's head is used to determine an identity of the user.

In an embodiment, the identity of the user is used to select specific personalized user preferences for the user.

In an embodiment, the plurality of images of the user's head is used to identify the user and select specific personalized user preferences for the user.

In an embodiment, the plurality of images of the user's head is used to identify one or more visual objects spatially adjacent to the user; wherein the spatial audio is adjusted based at least in part on presences of the one or more visual objects.

In an embodiment, the plurality of images of the user's head is used to build a three-dimensional (3D) head model using face meshes logically overlaid with the user's head in the plurality of images.

In an embodiment, the 3D head model is used to select specific personalized equalization operational parameters for rendering audio to the user.

In an embodiment, a new audio portion is created and rendered by a first audio speaker to reduce an audio leakage caused by a second audio speaker in an ear of the user.

FIG. 9C illustrates an example process flow according to an example embodiment of the present invention. In some example embodiments, one or more computing devices or components (e.g., a media consumption system, 130 and/or 135 of FIG. 1, headphones and/or computer of FIG. 2, etc.) may perform this process flow. In block 942, a media consumption system acquires a plurality of images of an actual rendering environment through one or more image sensors operating in conjunction with a media consumption system.

In block 944, the media consumption system uses or analyzes the plurality of images of the actual rendering environment to predict audio characteristics of objects present in the actual rendering environment.

In block 946, the media consumption system adjusts spatial audio rendered to a user in the actual rendering environment, by a plurality of audio speakers operating in conjunction with the media consumption system based at least in part on the audio characteristics of the objects present in the actual rendering environment.

In an embodiment, the plurality of images of the actual rendering environment is used to identify a make and a model of headphones, among the objects present in the actual rendering environment, worn by the user.

In an embodiment, the plurality of images of the actual rendering environment is used to identify a make and a model of a non-headphone audio speaker among the objects present in the actual rendering environment.

In an embodiment, the plurality of images of the actual rendering environment is used to predict audio characteristics of a non-audio-speaker object among the objects present in the actual rendering environment.

In an embodiment, the plurality of images of the actual rendering environment is acquired over a time duration; the media consumption system selects default audio characteristics of at least a subset of objects, among the objects present in the actual rendering environment, in rendering audio to the user when the time duration begins.

In an embodiment, the audio characteristics are predicted by an audio characteristics predictive model trained with training images of a plurality of objects of different types in a plurality of different rendering environments and ground truths indicating respective audio characteristics for the plurality of objects of different types in the plurality of different rendering environments.

In an embodiment, a subset of audio characteristics among the audio characteristics comprises one of: a reverberation audio characteristic, an echo audio characteristic, etc., of an object present in the actual rendering environment.

In an embodiment, the spatial audio is derived from received audio data by the media consumption system; the spatial audio as adjusted reproduces a recorded rendering environment for which the received audio data is intended to be rendered.

In an embodiment, the recorded rendering environment is specified in audio metadata in a media data signal that carries the received audio data to the media consumption system.

In an embodiment, the recorded rendering environment comprises a reference audio speaker configuration that is different from an actual audio speaker configuration deployed in the actual rendering environment.

In an embodiment, the audio characteristics are used to select specific personalized equalization operational parameters for rendering audio to the user in the actual rendering environment.

In an embodiment, a new audio portion is created and rendered by a first audio speaker to reduce an audio leakage caused by a second audio speaker in an ear of the user.

Example device and rendering environment tracking can be found in U.S. Provisional Patent Application No. 63/305,623, with an application title of "DEVICE AND RENDERING ENVIRONMENT TRACKING" by Ajit Ninan and William Rozzi, filed on 1 February, 2022, the entire contents of which are hereby incorporated by reference as if fully set forth herein.

FIG. 9D illustrates an example process flow according to an example embodiment of the present invention. In some example embodiments, one or more computing devices or components (e.g., a media consumption system, 130 and/or 135 of FIG. 1, headphones and/or computer of FIG. 2, etc.) may perform this process flow. In block 962, a media consumption system acquires one or more images of a user's head through one or more image sensors operating in conjunction with a media consumption system.

In block 964, the media consumption system analyzes the one or more acquired images of the user's head to determine an orientation angle of the user's head in relation to one or more rendered images in an audiovisual rendering to the user.

In block 966, the media consumption system uses the orientation angle of the user's head to cause, by the media consumption system, a change in a user-perceptible aspect of the audiovisual rendering to the user.

In an embodiment, the audiovisual rendering relates to one of: video teleconference, computer game, audiovisual playback, augmented reality, virtual reality, etc.

In an embodiment, the user-perceptible aspect of the audiovisual rendering includes one of: boosting a loudness level of a sound source in the audiovisual rendering; cutting a loudness level of a sound source in the audio rendering; boosting a loudness level of a first sound source while concurrently cutting a loudness level of a second sound source, in the audiovisual rendering; zooming in a visual image portion of the video images in the audiovisual rendering; zooming out a visual image portion of the video image in the audiovisual rendering; zooming in a first visual image portion of the video images while concurrently zooming out a second visual image portion of the video image, in the audiovisual rendering; changing a size of a visual image portion of the video images while concurrently changing a loudness level of a sound source corresponding to the visual image portion of the video image, in the audiovisual rendering; etc.

In an embodiment, the one or more acquired images of the user's head are analyzed to determine that the user's head is leaning forward to a specific image portion of video images being rendered in the audiovisual rendering on an image display; the user-perceptible aspect of the audiovisual rendering is caused to be changed in response to determine that the user's head has reoriented toward and leaned forward to the specific image portion of the video images in excess of a specific time duration.

In an embodiment, the one or more acquired images of the user's head are analyzed to determine that the user's head is leaning backward from a specific image portion of video images being rendered in the audiovisual rendering on an image display; the user-perceptible aspect of the audiovisual rendering is caused to be changed in response to determine that the user's head has continued orienting toward but leaned backward away from the specific image portion of the video images in excess of a specific time duration.

In an embodiment, the user's hand movement is not used to cause the change of the user-perceptible aspect of the audiovisual rendering.

In an embodiment, the user's gaze is not used to cause the change of the user-perceptible aspect of the audiovisual rendering.

In an embodiment, a sound image in the audiovisual rendering is rotated as a part of the change of the audiovisual rendering.

In an embodiment, a sound source in the audiovisual rendering is relocated from a first spatial position relative to the user to a second different spatial position relative to the user.

In an embodiment, a designated position of the user in rendered images of the audiovisual rendering is changed to a new designated position different from the designated position.

In an embodiment, the one or more image sensors are external to any wearable device worn by the user.

In an embodiment, the one or more image sensors operate with one or more sensors of a wearable device worn by the user to determine the orientational angle of the user's head.

Example gesture controlled audio/visual rendering can be found in U.S. Provisional Patent Application No. 63/305,628, with an application title of "GESTURE CONTROLLED AUDIO AND/OR VISUAL RENDERING" by Ajit Ninan and William Rozzi, filed on 1 Feb. 2022, the entire contents of which are hereby incorporated by reference as if fully set forth herein.

In various example embodiments, an apparatus, a system, an apparatus, or one or more other computing devices performs any or a part of the foregoing methods as described. In an embodiment, a non-transitory computer readable storage medium stores software instructions, which when executed by one or more processors cause performance of a method as described herein.

Note that, although separate embodiments are discussed herein, any combination of embodiments and/or partial embodiments discussed herein may be combined to form further embodiments.

12. IMPLEMENTATION MECHANISMS—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
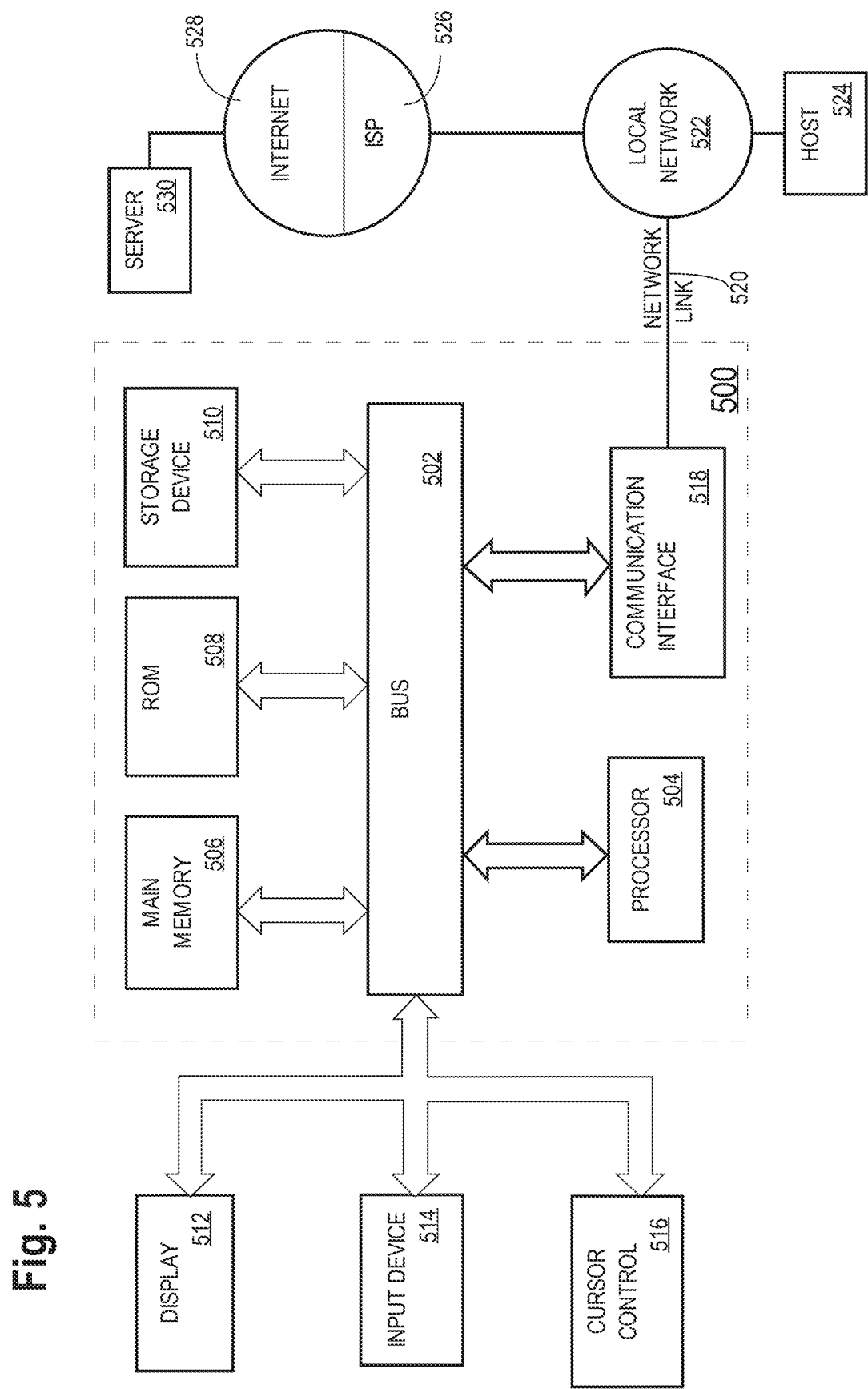
FIG. 5 illustrates an example hardware platform on which a computer or a computing device as described herein may be implemented.

For example, FIG. 5 is a block diagram that illustrates a computer system 500 upon which an example embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504.

A storage device 510, such as a magnetic disk or optical disk, solid state RAM, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

13. EQUIVALENTS, EXTENSIONS, ALTERNATIVES AND MISCELLANEOUS

In the foregoing specification, example embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

It is claimed:

1. A method comprising:
acquiring a plurality of images of a user's head at a plurality of different orientational angles through one or more image sensors operating in conjunction with a media consumption system;
using the plurality of images of the user's head to select a specific personalized head related transfer function for the user;
adjusting spatial audio rendered by a plurality of audio speakers operating in conjunction with the media consumption system based at least in part on the specific personalized HRTF selected for the user, wherein the plurality of images of the user's head is acquired over a time duration and wherein the media consumption system selects a default non-personalized HRTF in rendering audio to the user when the time duration begins.

2. The method of claim 1, wherein the plurality of different orientational angles cover an angular range greater than a minimum angular range.

3. The method of any of claim 1, wherein the specific personalized HRTF is used to perform audio processing on received audio data to depict an audio source with a specific spatial relationship between the audio source and the user.

4. The method of any of claim 1, wherein the specific personalized HRTF is predicted by an HRTF predictive model trained with training images of heads of a plurality of users and ground truths indicating a plurality of respective HRTFs for the plurality of users.

5. The method of any of claim 1, wherein the plurality of images of the user's head is used to determine an identity of the user.

6. The method of claim 5, wherein the identity of the user is used to select specific personalized user preferences for the user.

7. The method of any of claim 1, wherein the plurality of images of the user's head is used to identify the user and select specific personalized user preferences for the user.

8. The method of any of claim 1, wherein the plurality of images of the user's head is used to identify one or more visual objects spatially adjacent to the user; wherein the spatial audio is adjusted based at least in part on presences of the one or more visual objects.

9. The method of any of claim 1, wherein the plurality of images of the user's head is used to build a three-dimensional (3D) head model using face meshes logically overlaid with the user's head in the plurality of images.

10. The method of claim 9, wherein the 3D head model is used to select specific personalized equalization operational parameters for rendering audio to the user.

11. The method of any of claim 1, wherein a new audio portion is created and rendered by a first audio speaker to reduce an audio leakage caused by a second audio speaker in an ear of the user.

\* \* \* \* \*

UNITED STATES PATENT AND TRADEMARK OFFICE
CERTIFICATE OF CORRECTION

| | | |
|---|---|---|
| PATENT NO. | : 12,389,189 B2 | Page 1 of 1 |
| APPLICATION NO. | : 18/163270 | |
| DATED | : August 12, 2025 | |
| INVENTOR(S) | : Ninan et al. | |

It is certified that error appears in the above-identified patent and that said Letters Patent is hereby corrected as shown below:

In the Claims

Column 56, Line 38, in Claim 3, after "of", delete "any of"

Column 56, Line 42, in Claim 4, after "of", delete "any of"

Column 56, Line 47, in Claim 5, after "of", delete "any of"

Column 56, Line 50, in Claim 6, after "of", delete "any of"

Column 56, Line 53, in Claim 7, after "of", delete "any of"

Column 56, Line 56, in Claim 8, after "of", delete "any of"

Column 56, Line 61, in Claim 9, after "of", delete "any of"

Column 57, Line 1, in Claim 11, after "of", delete "any of"

Signed and Sealed this
Seventh Day of October, 2025

John A. Squires
*Director of the United States Patent and Trademark Office*